(12) United States Patent
Jin et al.

(10) Patent No.: US 12,449,494 B2
(45) Date of Patent: Oct. 21, 2025

(54) CHEMICAL EXCHANGE SATURATION TRANSFER (CEST) MAGNETIC RESONANCE IMAGING USING AN ASEF OR AROSE SYSTEM

(71) Applicant: UNIVERSITY OF PITTSBURGH—OF THE COMMONWEALTH SYSTEM OF HIGHER EDUCATION, Pittsburgh, PA (US)

(72) Inventors: Tao Jin, Wexford, PA (US); Julius Chung, Pittsburgh, PA (US)

(73) Assignee: University Of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 58 days.

(21) Appl. No.: 18/561,126

(22) PCT Filed: Jun. 6, 2022

(86) PCT No.: PCT/US2022/032317
§ 371 (c)(1),
(2) Date: Nov. 15, 2023

(87) PCT Pub. No.: WO2023/022778
PCT Pub. Date: Feb. 23, 2023

(65) Prior Publication Data
US 2024/0230809 A1    Jul. 11, 2024

Related U.S. Application Data

(60) Provisional application No. 63/234,464, filed on Aug. 18, 2021.

(51) Int. Cl.
*G01R 33/56* (2006.01)
*G01R 33/48* (2006.01)
*G01R 33/485* (2006.01)

(52) U.S. Cl.
CPC ..... *G01R 33/5605* (2013.01); *G01R 33/4828* (2013.01); *G01R 33/485* (2013.01)

(58) Field of Classification Search
None
See application file for complete search history.

(56) References Cited

U.S. PATENT DOCUMENTS 9,372,245 B2 * 6/2016 Singh .................. G01R 33/28
10,180,478 B2   1/2019 Van Zijl et al.
(Continued)

OTHER PUBLICATIONS

Zu Z et al., A New Method for Detecting Exchanging Amide Protons Using Chemical Exchange Rotation Transfer, Magnetic Resonance in Medicine 69:637-647 (2013).
(Continued)

*Primary Examiner* — Rodney E Fuller
(74) *Attorney, Agent, or Firm* — Philip E. Levy; Eckert Seamans Cherin & Mellow, LLC

(57) ABSTRACT

A method for chemical exchange saturation transfer (CEST) MRI using an average saturation efficiency filter (ASEF)/adjustment of rotation and saturation effects (AROSE) includes: applying a first RF pulse train including a high duty cycle, the first RF pulse causing magnetization of exchangeable protons based on saturation and/or rotation effects, transferred to a water pool of a target structure; discontinuing application of the first RF pulse train; acquiring a first water MR signal; applying a second RF pulse train including a low duty cycle, the second RF pulse train causing magnetization of the target molecules based at least in part on saturation transfer and either minimizing rotation transfer with bipolar pulses or adjusting rotation transfer with selected flip angles; discontinuing application of the second RF pulse train; acquiring a second water MR signal; and generating ASEF/AROSE signal representing a difference between the first and second water MR signals.

44 Claims, 37 Drawing Sheets

(56) References Cited

U.S. PATENT DOCUMENTS

| | | |
|---|---|---|
| 2016/0154081 A1 | 6/2016 | Chung et al. |
| 2018/0210050 A1 | 7/2018 | Rosen et al. |
| 2020/0379070 A1 | 12/2020 | Aime et al. |
| 2021/0072332 A1 | 3/2021 | Miyazaki |
| 2023/0408611 A1* | 12/2023 | Van Zijl ............... A61B 5/4519 |
| 2024/0230809 A1* | 7/2024 | Jin ....................... G01R 33/485 |

OTHER PUBLICATIONS

Xu. J et al., Variable Delay Multi-Pulse Train for Fast Chemical Exchange Saturation Transfer and Relayed-Nuclear Overhauser Enhancement MRI, Magnetic Resonance in Medicine, 71:1798, 2013.

* cited by examiner

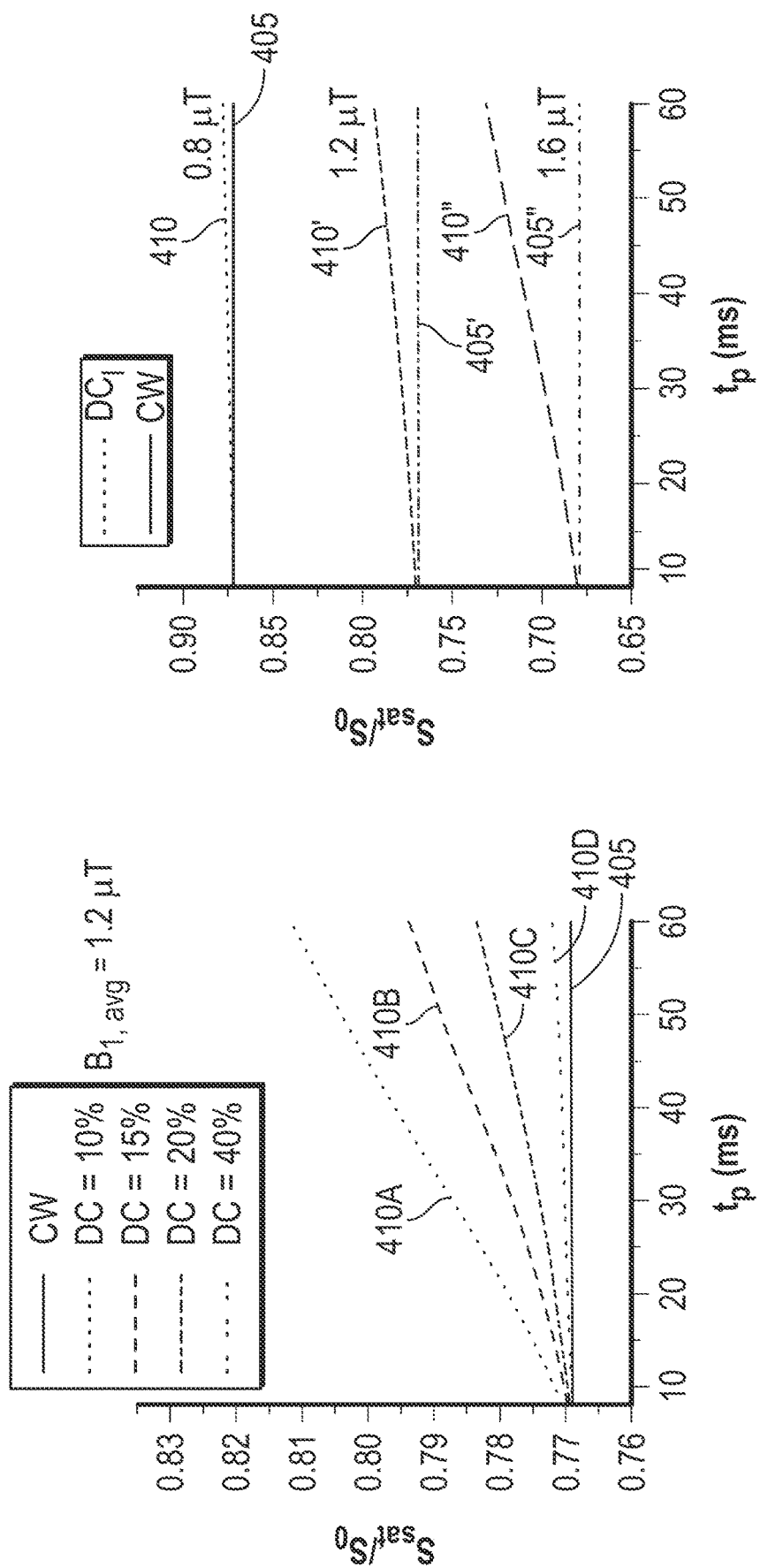

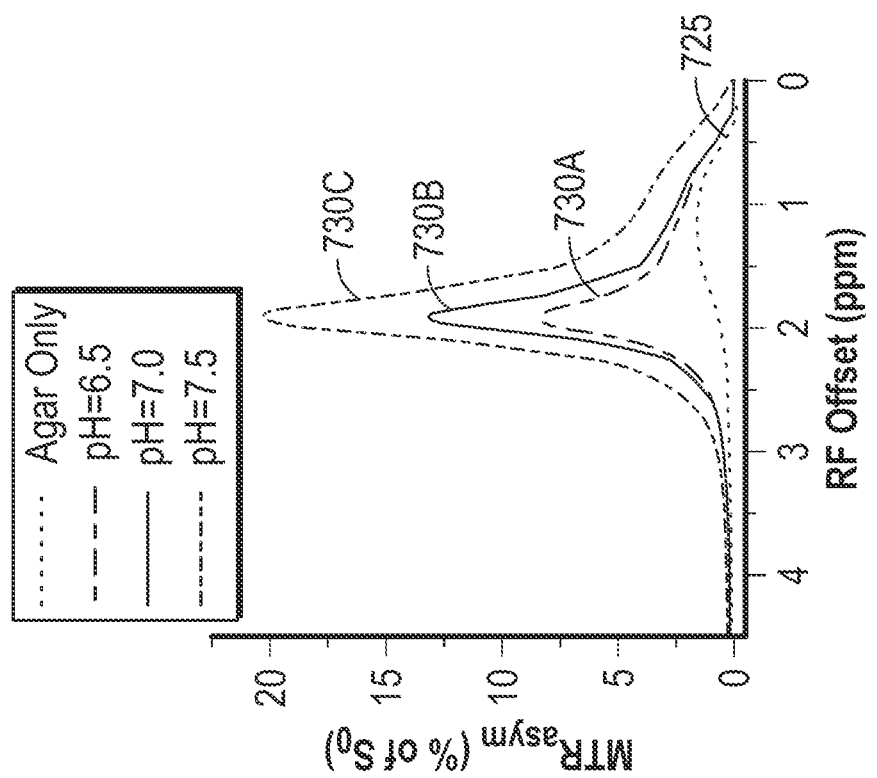
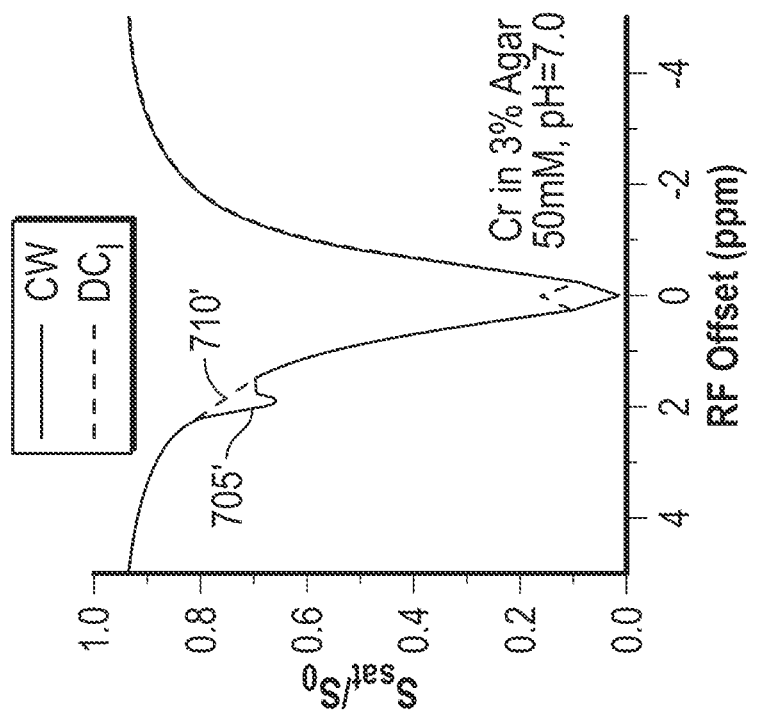
FIG. 7C
FIG. 7B

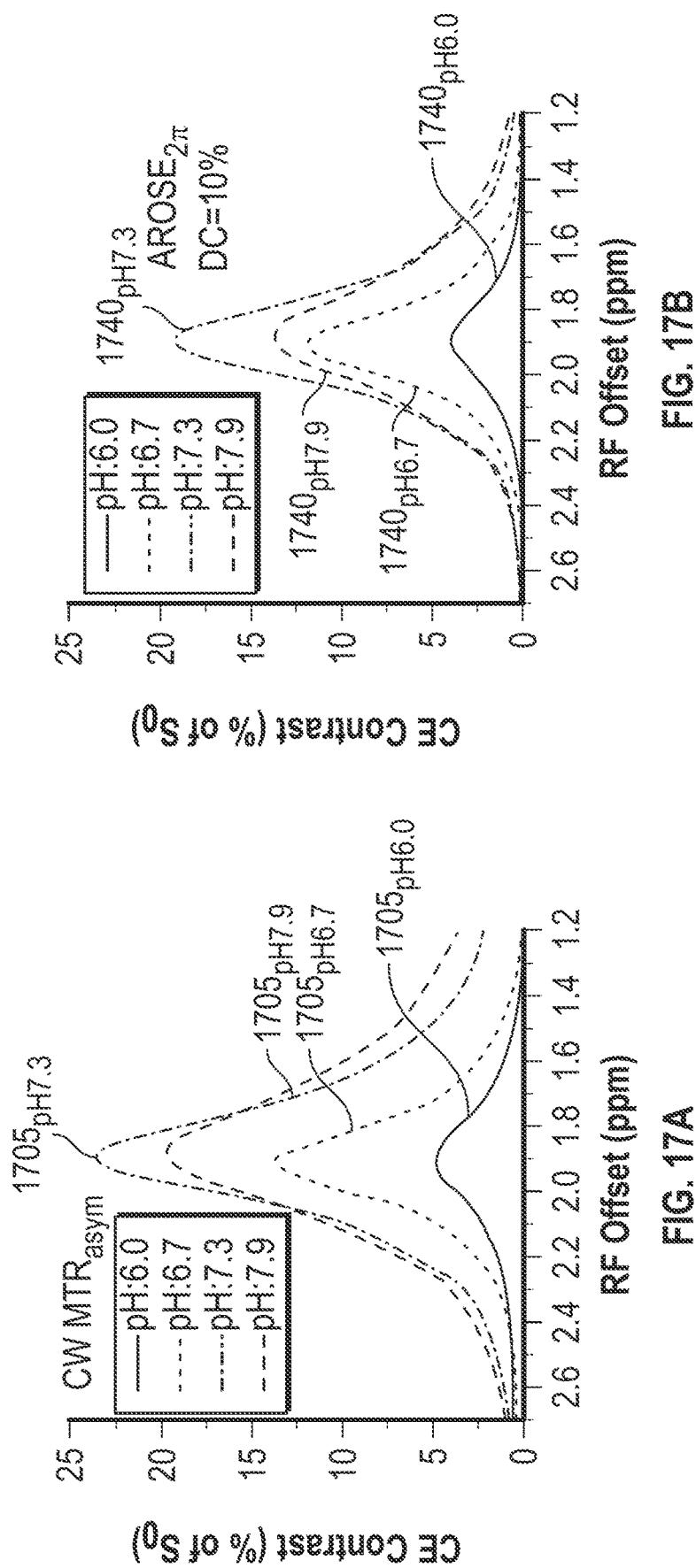

CHEMICAL EXCHANGE SATURATION TRANSFER (CEST) MAGNETIC RESONANCE IMAGING USING AN ASEF OR AROSE SYSTEM

CROSS-REFERENCE TO RELATED APPLICATIONS

This patent application is a U.S. National Phase of International Application No. PCT/US2022/032317, filed on Jun. 6, 2022, which claims the priority benefit under 35 U.S.C. § 119(e) of U.S. Provisional Application No. 63/234,464, filed on Aug. 18, 2021, the contents of which are herein incorporated by reference.

GOVERNMENT CONTRACT

This invention was made with government support under grant #NS100703 awarded by the National Institutes of Health. The government has certain rights in the invention.

BACKGROUND OF THE INVENTION

1. Field of the Invention

The present invention relates to systems and methods for chemical exchange saturation transfer (CEST) magnetic resonance imaging (MRI), particularly, to a system and method for CEST MRI using an average saturation efficiency filter (ASEF), or a system and method for CEST MRI using an adjustment of rotation and saturation effects (AROSE) system.

2. Description of the Related Art

Magnetic resonance imaging (MRI) is a noninvasive, diagnostic imaging technique that uses a magnetic field and computer-generated radio waves to produce detailed images of internal structures (e.g., organs, bones, muscles, blood vessels, etc.) of a subject (e.g., a human). When the subject lies inside an MRI scanner (generally in cylindrical shape), the magnetic field temporarily realigns water molecules in the subject's body, and the radio waves cause these aligned atoms to generate faint signals used to create MRI images. There are different types of MRI approaches, e.g., functional MRI (fMRI) for detecting a change of blood flow to certain areas of the subject's brain in conjunction with function, magnetic resonance angiography (MRA) for evaluating blood flow through arteries, etc. When using contrast agents in MRI, the contrast of interest should be generated using the lowest possible concentration of the agent in order not to disturb the physiological environment and to minimize toxicity. However, MRI suffers from inherent limitations in sensitivity, and thus may often require higher concentrations of contrast agents. Further, most of the paramagnetic metals utilized to enhance relaxation are toxic if not chelated or coated. Moreover, MRI generally relies on the excitation of hydrogen ($^1$H) nuclei in water molecules but assessing the presence of molecules other than water in, e.g., body tissues may be helpful in probing chemical compounds and metabolites related to the body's physiological function and pathological states. In order to detect directly the non-water molecules, multinuclear imaging systems with possible enrichment can also be helpful but are costly and technically difficult in application due to comparatively low concentrations of other nuclei in comparison to hydrogen creating a disconnect between useful molecular information and structural information. As such, while MRI offers a non-invasive diagnostic tool, there is a need to resolve the problems with contrast agents and their toxicity and improve on its impact on diagnoses at a molecular level.

Chemical Exchange Saturation Transfer (CEST) was introduced in 2000, suggesting the use of exchangeable protons (e.g., labile protons) of target molecules for MRI contrast, thereby extending the range of possible MR agents to include many biomolecules with exchangeable protons. CEST has been explored by many scholars and medical practitioners over the past two decades and has become an emerging molecular imaging technique capable of probing target biomolecules that have labile protons (e.g., mobile proteins and/or peptides, glucose, glycogen, amino acids, creatine, phosphocreatine, etc.), as well as environmental factors such as tissue pH or temperature. In CEST, a long RF irradiation for a predefined period (e.g., a few seconds) is usually applied to the target molecules at the Larmor frequency of a labile proton (e.g., amide (—NH), amine (—NH$_2$), or hydroxyl (—OH) proton) in order to provide a magnetic label or a state of no net magnetization. The state of no net magnetization is referred to as saturation. The saturation is then passed (i.e., transferred) to the bulk water around the target molecules by chemical exchange of the labile protons with free water protons in the bulk water. For such transfer to occur, the target molecules need be capable of exchanging their hydrogen ($^1$H) protons with the $^1$H protons of the water. As such, the saturation is transferred from the target molecules to water molecules by chemical exchange processes exchanging the saturated exchangeable protons of the target molecules with the free water protons. The exchanged free water protons become saturated, and then become exchanged with non-saturated free water protons since the bulk water is much larger than the exchangeable proton pool of the target molecules. The non-saturated free water proton, after being exchanged to the target molecule, again become saturated and become exchanged back with remaining non-saturated free water protons, and this chemical exchange processes repeat during the long predefined period (e.g., a few seconds), resulting in a substantial saturation effect eventually reaching an equilibrium between saturation, exchange, and relaxation of saturated protons. The saturation transfer reduces or attenuates MR signal of the bulk water, and such attenuation of the water MR signal is then imaged by an MRI device (e.g., an MRI scanner) as an indirect measurements of the biomolecule or environmental factor of interest. Such indirect measurement of the important biomolecules has led to a plethora of recent studies applying CEST in diagnosing and treating various diseases, e.g., tumor, stroke, Alzheimer's, muscle and kidney diseases.

However, CEST is still an emerging imaging technique and faces some issues to be resolved. First, while the indirect measurement through water often offers a sensitivity enhancement of 1-3 orders of magnitude than a direct measurement, its intrinsic disadvantage is a reduction in specificity. Second, CEST MRI suffers from contaminations from other labile protons due to the fact that the linewidth of CEST signals is tightly related to the chemical exchange rate. Generally, endogenous labile protons have relatively close Larmor frequencies (e.g., between approximately 0.5 to 4 ppm from the water frequency), but the exchange rate of these labile protons covers a wide range, from ~30 s$^{-1}$ for amide to greater than 5000 s$^{-1}$ for some hydroxyls and amines. Since the linewidth of the CEST signal is closely related to the chemical exchange rate (i.e., 2510 s$^{-1}$ corresponds to 1 ppm at 9.4 T and 3.1 ppm at 3 T), the overlap in the CEST signals from different labile protons (including, e.g., unwanted labile protons) with distinct Larmor frequencies is often not negligible. As such, the CEST signal from a molecule of interest is often contaminated by fast exchange species at close resonance frequencies due to their broad linewidths. For example, the exchange rate of amines and some hydroxyl groups can be approximately 5000 $s^{-1}$ or higher, which results in a linewidth of at least 2 ppm at 9.4 T and 6.3 ppm at 3 T. Third, CEST MRI suffers non-chemical exchange effects, such as contamination from magnetization transfer contrast (MTC) effects. For example, the MTC effect from semisolid macromolecules in in vivo experiments is often an order of magnitude larger than CEST signals and covers a broad range of frequencies reaching greater than 50 ppm. In order to minimize the MTC contamination, an asymmetry analysis or fitting of CEST spectra to theoretical models have been utilized. However, the asymmetry analysis suffers inaccuracies due to the fact that MTC is not symmetric about the water frequency, and the fitting of CEST spectra suffers from long scan times due to the need to cover a broad range of RF offsets. Further, because the MTC signal is very broad and many data points covering a wide offset range need to be acquired to fit the CEST signal and remove the MTC, there is a concern that the theoretical models used for the fitting may not be accurate. As such, CEST suffers from, e.g., low exchange-rate specificity, contamination of MTC effect, low Larmor frequency selectivity, occurrence of nuclear Overhauser enhancement (NOE) effects, direct water saturation, etc.

Therefore, for accurate analysis and quantification of the chemical exchange process, it is important to improve the specificity of the CEST signal of interest and remove or minimize the contaminations from, e.g., other labile protons with different chemical exchange rates, MTC, etc. Aside from the commonly-used asymmetry analysis (which cannot minimize MTC due to intrinsic MTC asymmetry), several approaches have recently been proposed in the prior art to mitigate these issues by differentiating the responses of different labile protons and semisolid macromolecule pools under the irradiation of various pulse trains to improve the specificity of CEST signals. Some of these methods can remove the MTC effect and provide an exchange rate filter that suppresses the chemical exchange (CE) signal from fast exchanging processes, however, they remain unable to filter slow exchange rates, and often incur a significant loss of CE sensitivity because the saturation transfer is minimized or removed. These methods can also be highly sensitive to $B_1$-inhomogeneity. Other exchange rate filters utilize highly different total saturation duration and time-averaged saturation power to tune CEST sensitivity to different exchange rates because a higher power and shorter saturation is more sensitive to faster exchange whereas a lower power and longer saturation is more sensitive to slower exchange. However, such a large difference in the delay can lead to significant mismatch of the MTC, unless a small number of pulses is used, resulting in reduced sensitivity. Thus, each of these approaches suffers from its own shortcomings and limitations in broader applications.

There is a room for improvement in CEST imaging techniques.

SUMMARY OF THE INVENTION

Accordingly, it is an object of the present disclosure to provide a novel system and method for improving the specificity of CEST signal without a significant loss of sensitivity by using average saturation efficiency filter (ASEF) and adjusting rotation and saturations effects (AROSE) in order to achieve a filtering effect and minimize various contaminations while retaining a high sensitivity and allowing imaging to be performed within clinically relevant scan times. ASEF and AROSE use at least two scans that may have saturation schemes that have similar contamination from non-specific effects and yet are disparate in their dependence on a target of interest. A combination of these scans may remove non-specific effects with limited loss in the sensitivity of the biomolecule of interest. Further, with ASEF and AROSE many of the hurdles for current CEST applications may be resolved. For example, mobile proteins and/or peptides can be measured more accurately for Alzheimer's disease, low concentrations targets like phosphocreatine can be imaged in a clinically reasonable scan time, and exogenous targets such as pH sensitive CEST agents can be detected with low infusion concentrations. Thus, the ASEF and AROSE improve the viability of CEST MRI in a wide range of disease applications, e.g., assaying creatine phosphorylation dynamics in the muscle, glycogen in the liver, the pH in cancer and stroke, mobile protein and/or peptides in Alzheimer's disease, etc. Both ASEF and AROSE utilize two scans that have saturation schemes with the same average power but highly different duty cycles. These saturation schemes have similar time-averaged saturation efficiency for fast chemical exchange species and the semisolid macromolecules, but drastically different averaged saturation efficiency for slow exchange species. Because CEST signal is proportional to the average saturation efficiency, their difference becomes a low-pass exchange rate filter which can minimize the MT effect and fast exchange species, while retaining sensitivity to slow chemical exchange species. The difference between ASEF and AROSE lies in the scan with the low duty cycle saturation scheme. ASEF utilizes a biphasic pulse which minimizes the influence of rotation effects to be removed, which is significant for slower exchanges, while AROSE uses pulses where the flip angle of these pulse trains can be modulated to maximize or minimize the effect of rotation to be removed. This means that while ASEF only filters out non-specific saturation transfer effects on the faster exchange spectrum, and cannot filter slow exchange rates, AROSE may filter slow exchange regime as well by modulating the rotation effect being filtered, expanding possibilities from a simple low pass filter to a band pass filter that may be used to tune to intermediate exchange rates.

These objects are achieved according to an embodiment of the present disclosure by providing a method for chemical exchange saturation transfer (CEST) magnetic resonance imaging (MRI) of a target structure using an average saturation efficiency filter (ASEF) executable on an MR device. The method includes: First, applying a first radio frequency (RF) pulse train with a high duty cycle ($DC_h$) and a first average irradiation power ($B_{1,\ avg}$), where i). the target structure comprises the target molecules including exchangeable protons and a water pool including free water protons and semi-solid macromolecules, the first RF pulse train being applied at a resonant frequency of the exchangeable protons of the target molecules for a first predefined period, ii). the exchangeable protons in the target molecules are saturated based on the application of the first RF pulse train, iii). a first saturation transfer of the target molecules to the water pool based on chemical exchange processes exchanging the saturated exchangeable protons with a set of the free water protons is made, and the first RF pulse train also causes direct water saturation and MTC between the semi-solid macromolecules and another set of the free water protons; and iv). an MR signal of the water pool exhibits a first attenuation based at least in part on the first saturation transfer, the MTC and direct water saturation; discontinuing the application of the first RF pulse train upon a lapse of the first predefined period; acquiring a first water MR signal of the water pool from the MR device, the first water MR signal representing the first attenuation, the target molecules and the water pool returning to thermal equilibrium after the acquisition of the first water MR signal and the discontinuance; Second, applying, to the target molecules for a second predefined period, a second RF pulse train with a low duty cycle ($DC_l$) and a second average irradiation power, the second RF pulse train comprising a plurality of pairs of bipolar or composite pulses having a pulse duration ($t_p$), separated by a period of wait ($t_d$), where i). the second RF pulse train is applied at the same resonant frequency as the first RF pulse train; ii). the second saturation of the target molecules is transferred to the water pool based on the chemical exchange processes affected by the low duty cycle of the second RF pulse train, and causes direct water saturation and MTC, iii). the MR signal of the water pool exhibits a second attenuation based at least in part on a second saturation transfer, the MTC, and the direct water saturation; discontinuing the application of the second RF pulse train upon a lapse of the second predefined period; acquiring a second water MR signal of the water pool from the MR device, the second water MR signal representing the second attenuation; and Third, generating an ASEF signal representing a difference between the first water MR signal and the second water MR signal.

In some examples, the difference between the first water MR signal and the second water MR signal taken by the ASEF signal is:

$$ASEF = pk_{ex}T_1 S_{base}^2 \overline{\omega_1^2} \frac{DC_h - DC_l}{\left(\overline{\omega_1^2} + DC_h \cdot k_{ex}^2\right)\left(\overline{\omega_1^2} + DC_l \cdot k_{ex}^2\right)}$$

where p is the relative population of the exchangeable protons, $k_{ex}$ is the chemical exchange rate, $T_1$ is a longitudinal relaxation time, $S_{base}$ is a baseline signal of the target structure, and $\omega_1$ is the saturation frequency. In some examples, the first RF pulse train and the second RF pulse train have the same average saturation frequency $\overline{\omega_1^2}$. In some examples, the ASEF signal shows that the ASEF filters fast chemical exchange processes including a chemical exchange rate $k_{ex}$ satisfying $DC_l \cdot k_{ex}^2 >> \overline{\omega_1^2}$ as follows:

$$ASEF \propto \left(\frac{\overline{\omega_1^2}}{k_{ex}^2}\right)^2 \approx 0$$

where $\overline{\omega_1^2}$ is the average saturation frequency. In some examples, the ASEF is a low-pass filter where specificity of slow exchange processes and intermediate exchange processes of the chemical exchange processes are improved by suppressing the fast exchange processes with a minimal loss of sensitivity of the former. In some examples, this high duty cycle refers to when the first RF pulse train is a continuous wave or the highest duty cycle that the MRI device is capable of generating. Among these the continuous wave provides the highest sensitivity of the CEST imaging of the target molecules. In some examples, this high duty cycle refers to when the peak to average power ratio (Crest factor) of the first RF pulse train is minimized to approach a Crest factor of a continuous wave. In some examples, a number of RF pulses of the second RF pulse train, and the period of wait $T_D$ between the RF pulses, and a peak power of the RF pulses are determined such that the second average irradiation power of the second RF pulse train is the same as the first average irradiation power. In some examples, the ASEF minimizes a mismatch between the first MTC and the second MTC based at least in part on having the same average irradiation power for the second RF pulse train as the first average irradiation power of the first RF train. In some examples, a fudge factor is added to the first or second RF pulse train to minimize a mismatch between the first MTC and the second MTC, the fudge factor including a percentage increase or decrease in one or more of the first or second average irradiation power $B_{1, avg}$. In some examples, the fudge factor is determined such that execution of the pulse program at a specific frequency independent of the resonant frequency of the exchangeable protons results in the second attenuation at the specific frequency being equal to the first attenuation at the specific frequency. In some examples, the bipolar or composite pulses cancel out rotation effect and reduce $B_1$-inhomogeneity. In some examples, the target molecules are endogenous or exogenous molecules. In some examples, the endogenous or exogenous molecules are mobile molecules.

Another embodiment in accordance with present disclosure provide a device for CEST MRI of a target structure. The device includes: an input apparatus configured to receive a user input including at least the target structure and information associated with generating a RF pulse train and a second RF pulse train for the CEST MRI; a control system coupled to the input apparatus, including a processor, a memory including an ASEF that is executable on an MR device, the ASEF configured to: (i) apply a first radio frequency (RF) pulse train with a high duty cycle ($DC_h$) and a first average irradiation power ($B_{1, avg}$), wherein the target structure comprises the target molecules including exchangeable protons and a water pool including free water protons and semi-solid macromolecules, the first RF pulse train being applied at a resonant frequency of the exchangeable protons for a first predefined period, the exchangeable protons in the target molecules are saturated based on the application of the first RF pulse train, a first saturation transfer of the target molecules to the water pool based on chemical exchange processes exchanging the saturated exchangeable protons with a set of the free water protons is made, and the first RF pulse train also causes direct water saturation and a MTC between the semi-solid macromolecules and another set of the free water protons; and an MR signal of the water pool exhibits a first attenuation based at least in part on the first saturation transfer, the MTC and direct water saturation; (ii) discontinue the application of the first RF pulse train upon a lapse of the first predefined period; (iii) acquire a first water MR signal of the water pool from the MR device, the first water MR signal representing the first attenuation, the target molecules and the water pool returning to thermal equilibrium upon the discontinuance; (iv) apply, to the target molecules for a second predefined period, a second RF pulse train with a low duty cycle ($DC_l$) and a second average irradiation power, the second RF pulse train comprising a plurality of pairs of bipolar or composite pulses having a pulse duration ($t_p$), separated by a period of wait ($t_d$), wherein the second RF pulse train is applied at the same resonant frequency as the first RF pulse train; a second saturation transfer of the target molecules to the water pool based on the chemical exchange processes affected by the low duty cycle of the second RF pulse train is made, and the second RF pulse trains causes direct water saturation and MTC, the MR signal of the water pool exhibits a second attenuation based at least in part on a second saturation transfer, the MTC, and the direct water saturation; (v) discontinue the application of the second RF pulse train upon a lapse of the second predefined period; (vi) acquire a second water MR signal of the water pool from the MR device, the second water MR signal representing the second attenuation; and (vii) generate an ASEF signal representing a difference between the first water MR signal and the second water MR signal; and an output apparatus including a display and coupled to the ASEF system; and the output apparatus configured to output at least the ASEF signal, the first water MR signal, and the second water MR signal on the display.

Another embodiment in accordance with the present disclosure provides a method of CEST MRI using an AROSE executable on an MR device. The method includes: applying a first radio frequency (RF) pulse train with a high duty cycle ($DC_h$), a first average irradiation power ($B_{1,\ avg}$), and a first flip angle $\varphi_h$, where i). the target structure comprises the target molecules including exchangeable protons and a water pool including free water protons and semi-solid macromolecules, the first RF pulse train being applied at a resonant frequency of exchangeable protons of the target molecules for a first predefined period, ii). the application of the first RF pulse train changes a magnetization of the target molecules by at least one of a first rotation effect or a first saturation effect, iii). the first rotation effect comprises rotating a spin system of the target molecules based on the application of the first RF pulse train with a first flip angle $\varphi_h$, making a first rotation transfer to the water pool via chemical exchange processes, and affecting the spin system of the water pool based on a first rotation transfer, iv). the first saturation effect comprises a first saturation of the target molecules in which exchangeable protons upon the application of the first RF pulse train, and a first saturation transfer to the water pool via the chemical exchange processes comprising exchanging the saturated exchangeable protons with a set of the free water protons, the application of the first RF pulse train causing contamination comprising direct water saturation and a MTC between the semi-solid molecules and another set of the free water protons, and v). an MR signal of the water pool exhibits a first attenuation based at least in part on the first rotation transfer and the first saturation transfer, the first MTC and the direct water saturation; discontinuing the application of the first RF pulse train upon a lapse of the first predefined period; acquiring a first water MR signal of the water pool from the MR device, the first water MR signal representing the first attenuation, after which the target molecules and the water pool return to thermal equilibrium upon the previous discontinuance; applying, to the target molecules for a second predefined period, a second RF pulse train with a low duty cycle ($DC_l$), a second average irradiation power and a second flip angle $\varphi_l$, the second RF pulse train comprising a plurality of RF pulses having a pulse duration ($t_p$) and a period of wait ($t_d$) between each pulse, where i). the second RF pulse train changes the magnetization of the target molecules by a second rotation effect and a second saturation effect based upon the application of the second RF pulse train, ii). the second rotation effect comprises rotating the spin system of the target molecules, making a second rotation transfer to the water pool, and affecting the spin system of the water pool based on the second rotation transfer, iii). the second saturation effect comprises the saturation of the target molecules based on exchangeable protons upon the application of the second RF pulse train, the saturation is transferred to the water pool via chemical exchange processes exchanging the saturated exchangeable protons with the set of the free water protons, the second RF pulse train also causes contamination comprising the direct water saturation and a MTC between the semi-solid molecules and another set of the free water protons, and iv). the MR signal of the water pool exhibits a second attenuation based at least in part on the second rotation transfer, the second saturation transfer, the MTC and the direct water saturation; discontinuing the application of the second RF pulse train upon a lapse of the second predefined period; acquiring a second water MR signal of the water pool, the second water MR signal representing the second attenuation; and generating an AROSE signal representing a difference between the first water MR signal and the second water MR signal.

In some examples, the first RF pulse train is a continuous wave or the highest duty cycle that the MRI device is capable of generating. In some examples, the AROSE signal shows the difference as follows: $AROSE(\varphi_l,\varphi_h)=S(DC_l,\varphi_l)-S(DC_h,\varphi_h)$ where S is a signal. In some examples, peak to average power ratio (Crest factor) of the first RF pulse train is minimized to approach a Crest factor of a continuous wave. In some examples, the first RF pulse train is the continuous wave providing a full saturation transfer effect and the highest sensitivity of the CEST imaging of the target molecules. In some examples, the first RF pulse train is a continuous wave which has no rotation effect and thus no associated flip angle, and the AROSE signal shows the difference as follows: $AROSE_\varphi=S(DC_l,\varphi)-S(CW)$ where $\varphi$ is the flip angle for the RF pulses of the second RF pulse train. In some examples, $\varphi$ is adjusted to increase specificity of the CEST imaging based at least in part on the chemical exchange processes associated with the target molecule. In some examples, the AROSE system is an exchange rate filter for chemical exchange processes with both a slow exchange rate and a fast exchange rate where $\varphi$ includes $\pi(AROSE_\pi)$. In some examples, the AROSE system filters a fast exchange rate of the chemical exchange process where $\varphi$ includes $2\pi$ ($AROSE_{2\pi}$). In some examples, at least one of the first RF pulse train and the second RF pulse train includes frequency-selective excitation RF pulses applied at the Larmor frequency of the nuclei in the target molecules.

In some examples, a number of RF pulses, the period of wait $T_D$ between the RF pulses, and a peak power of the RF pulses of the second RF pulse train are determined such that the second average irradiation power of the second RF pulse train is the same as the first average irradiation power of the first RF pulse train. In some examples, the number of RF pulses, the period of wait $t_d$ between the RF pulses, and the peak power of the RF pulses of the second RF pulse train are determined such that a mismatch between the first MTC and the second MTC is minimized. In some examples, the AROSE system minimizes a mismatch between the first MTC and the second MTC based at least in part on having the same average irradiation power for the second RF pulse train as the first average irradiation power. In some examples, the AROSE system reduces the mismatch between the first MTC and the second MTC by using a shorter $t_p$ for the second RF pulse train, a smaller duty cycle difference between the high duty cycle $DC_h$ and the low duty cycle $DC_l$, and a lower average irradiation power $B_{1,\ avg}$. In some examples, a fudge factor is added to one of the first or second RF pulse train to minimize a mismatch between the first MTC and the second MTC, the fudge factor including a percentage increase or decrease in one of the first or second average irradiation power $B_{1, avg}$. In some examples, a number of RF pulses, the period of wait $T_D$ between the RF pulses, and a peak power of the RF pulses of the second RF pulse train are determined such that a mismatch between the MTC of the first acquisition and the MTC of the second acquisition is minimized. In some examples, a number of RF pulses, the period of wait $T_D$ between the RF pulses, and a peak power of the RF pulses of the second RF pulse train are determined such that execution of the AROSE pulse program at a specific frequency independent of the resonant frequency of the exchangeable protons results in the second attenuation at the specific frequency being equal to the first attenuation at the specific frequency.

In some examples, the RF frequency of the first and the second pulse train is the resonant frequency of the nuclei of the target molecules. In some examples, the target molecules are endogenous or exogenous molecules. In some examples, the endogenous or exogenous molecules are mobile molecules.

In some examples, the method further includes applying a third RF pulse train to the target molecules for a third predefined period, a third RF pulse train with a low duty cycle ($DC_l$), a third average irradiation power and a third flip angle $\varphi_{l3}$, the third RF pulse train including a plurality of RF pulses having a pulse duration ($t_P$) and a period of wait ($t_d$) between each pair of bipolar pulses, where the third RF pulse train the magnetization of the target molecules by the rotation effect and the saturation effect based upon the application of the third RF pulse train, the rotation and saturation of the target molecules are transferred to the water pool via the chemical exchange processes, the third RF pulse train also causes contamination including the direct water saturation and a second MTC between the semi-solid molecules and another set of the free water protons, and the MR signal of the water pool exhibits a third attenuation based at least in part on the rotation transfer, the saturation transfer, the third MTC and the direct water saturation; discontinuing the application of the third RF pulse train upon a lapse of the third predefined period; and acquiring a third water MR signal of the water pool, the third water MR signal representing the third attenuation. In some examples, the generating the AROSE signal includes generating the AROSE signal representing differences among the first water MR signal, the second water MR signal and the third water signal. In some examples, a number of RF pulses, the period of wait $t_d$ between the RF pulses, and a peak power of the RF pulses of the third RF pulse train are determined such that mismatches among the first MTC, the second MTC and the third MTC are minimized.

Another embodiment provides a device for CEST MRI of a target structure. The device includes: an input apparatus configured to receive a user input including at least the target structure and information associated with generating a first radiofrequency (RF) pulse train and a second RF pulse train for the CEST MRI; a control system coupled to the input apparatus for receiving the user input, comprising a processor, a memory containing a pulse program implementing adjustment of rotation and saturation effects (AROSE) executable on an MR device, the AROSE program configured to: (i) apply a first radio frequency (RF) pulse train with a high duty cycle ($DC_h$), a first average irradiation power ($B_{1, avg}$), and a first flip angle $\varphi_h$, wherein the target structure comprises the target molecules including exchangeable protons and a water pool including free water protons and semi-solid macromolecules, the first RF pulse train being applied at a resonant frequency of the exchangeable protons for a first predefined period, the application of the first RF pulse train changes a magnetization of the target molecules by at least one of a first rotation effect or a first saturation effect, the rotation effect comprises rotating a spin system of the target molecules based on the application of the first RF pulse train with a first flip angle $\varphi_h$, making a first rotation transfer to the water pool via chemical exchange processes, and affecting the spin system of the water pool based on the first rotation transfer, the first saturation effect comprises a first saturation of the target molecules in which exchangeable protons upon the application of the first RF pulse train, and a first saturation transfer to the water pool via the chemical exchange processes comprising exchanging the saturated exchangeable protons with a set of the free water protons, the application of the first RF pulse train causing contamination comprising direct water saturation and a MTC between the semi-solid molecules and another set of the free water protons, and an MR signal of the water pool exhibits a first attenuation based at least in part on the first rotation transfer and the first saturation transfer, the first MTC and the direct water saturation; (ii) discontinue the application of the first RF pulse train upon a lapse of the first predefined period; (iii) acquire a first water MR signal of the water pool from the MR device, the first water MR signal representing the first attenuation, the target molecules and the water pool returning to thermal equilibrium after the acquisition of the first water MR signal and the discontinuance; (iv) apply, to the target molecules for a second predefined period, a second RF pulse train with a low duty cycle ($DC_l$), a second average irradiation power and a second flip angle $\varphi_l$, the second RF pulse train comprising a plurality of RF pulses having a pulse duration ($t_P$) and a period of wait ($t_d$) between each pulse, wherein the second RF pulse train changes the magnetization of the target molecules by a second rotation effect and a second saturation effect, the second rotation effect comprises rotating the spin system of the target molecules, transferring the rotation to the water pool, and affecting the spin system of the water pool based on a second rotation transfer, and the second saturation effect comprises a second saturation of the target molecules based on exchangeable protons upon the application of the second RF pulse train, and a second saturation transfer to the water pool via chemical exchange processes exchanging the saturated exchangeable protons with the set of the free water protons, the second RF pulse train causing contamination comprising the direct water saturation and a MTC between the semi-solid molecules and another set of the free water protons, and the MR signal of the water pool exhibits a second attenuation based at least in part on the second rotation transfer, the second saturation transfer, the MTC and the direct water saturation; (v) discontinue the application of the second RF pulse train upon a lapse of the second predefined period; (vi) acquire a second water MR signal of the water pool, the second water MR signal representing the second attenuation; and (vii) generate an AROSE signal representing a difference between the first water MR signal and the second water MR signal; and an output apparatus including a display and coupled to the AROSE system, the output apparatus configured to output at least the AROSE signal, the first water MR signal, and the second water MR signal on the display.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIGS. 4A-B illustrate simulated baseline magnetization transfer (MT) signals as a function of pulse period $T_p$ with varied duty cycles and average irradiation power $B_{1,\ avg}$ according to one particular, non-limiting exemplary embodiment of the disclosed concept;

FIGS. 7A-D illustrate CW and ASEF-CEST results of creatine in agar according to one particular, non-limiting exemplary embodiment of the disclosed concept;

FIGS. 17A-D illustrate frequency-specificity of creatine phantoms of varied pH measured with $B_{1,avg}$ of 0.94 µT and DC=10% according to one particular, non-limiting exemplary embodiment of the disclosed concept;

DETAILED DESCRIPTION OF EXEMPLARY EMBODIMENTS

Figure 1A:
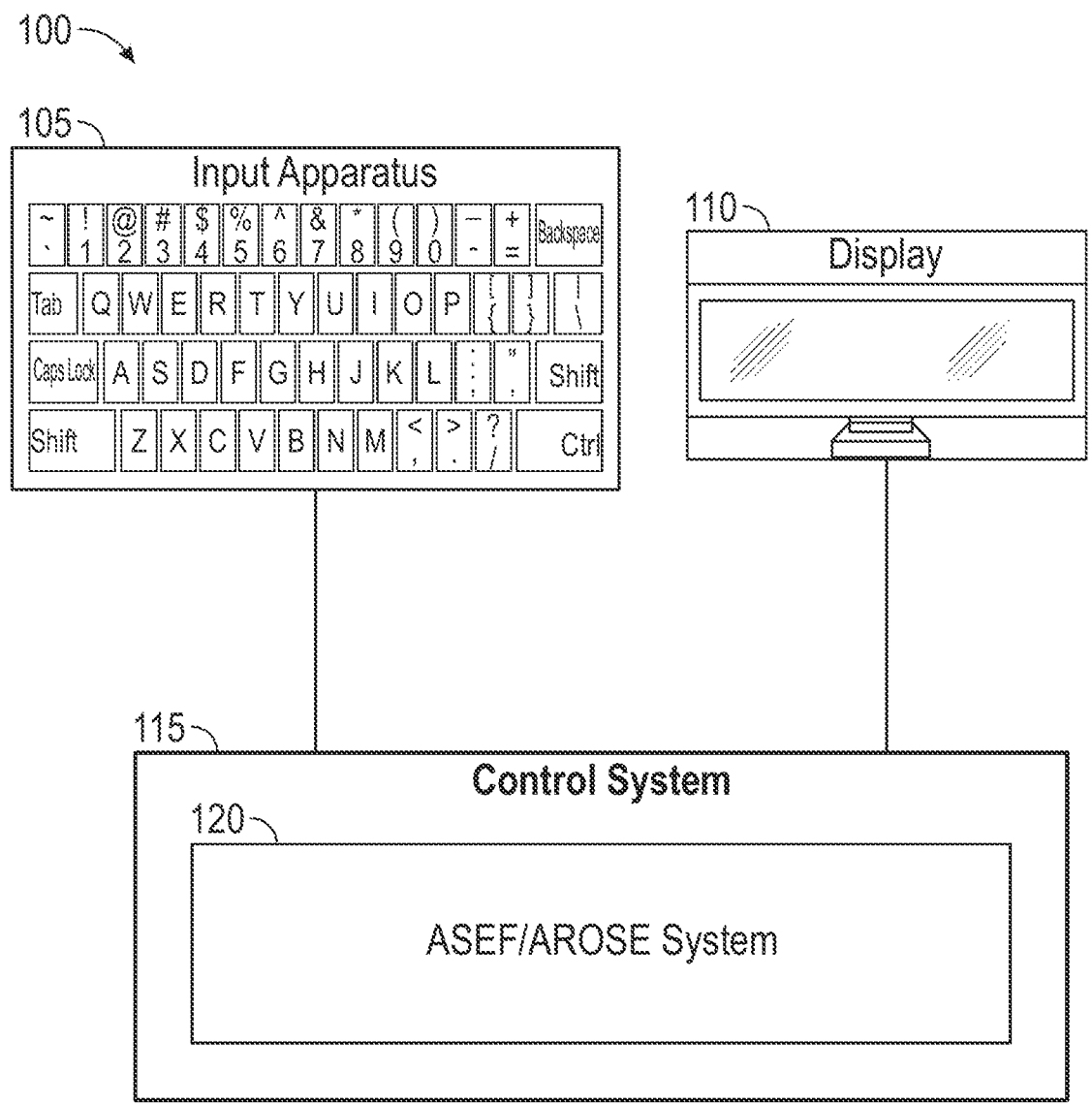
FIG. 1A illustrates a block diagram of a device for CEST MRI using an average saturation filter (ASEF)/adjustment of rotation and saturation effects (AROSE) system according to one particular, non-limiting exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

FIG. 1A illustrates a block diagram of a device 100 for CEST MRI using an average saturation filter (ASEF) system 120 and/or an adjustment of rotation and saturation effects (AROSE) system 120 according to one particular, non-limiting exemplary embodiment of the disclosed concept. As seen in FIG. 1, the exemplary device 100 is a PC or laptop computer and includes an input apparatus 105 (which in the illustrated embodiment is a keyboard), an output apparatus 110 including a display (which in the illustrated embodiment is an LCD), and a control system 115. A user is able to provide input into the control system 115 using the input apparatus 105, and the control system 115 provides output signals to display 110 to enable the display 110 to display real time information to the operator, such as, without limitation, at least an ASEF signal, a first water MR signal, and a second water MR signal on the display 110.

Control system 115 includes a processor and a memory. The processor may be, for example and without limitation, a microprocessor (µP), a microcontroller, or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer and can be volatile memory or nonvolatile memory. The memory has stored herein a number of routines, instructions, or codes that are executable by the processor. One or more of the routines implement (by way of computer/processor executable instructions) at least one embodiment of the method discussed in detail herein for the ASEF and/or AROSE.

The control system 115 also includes an ASEF/AROSE system 120. An ASEF/AROSE system 120 may be a software application, a firmware, or codes via the processor to perform various ASEF/AROSE functions described herein. The ASEF/AROSE system 120 performs ASEF functionalities and is configured to: (i) apply a first radio frequency (RF) pulse train with a high duty cycle ($DC_h$) and a first average irradiation power ($B_{1,\ avg}$), where the target structure includes the target molecules including exchangeable protons and a water pool including free water protons and semi-solid macromolecules, the first RF pulse train being applied at a resonant frequency of the exchangeable protons for a first predefined period, the exchangeable protons in the target molecules are saturated based on the application of the first RF pulse train, a first saturation transfer to the water pool based on chemical exchange processes exchanging the saturated exchangeable protons with a set of the free water protons is made, and the first RF pulse train also causes direct water saturation and a MTC between the semi-solid macromolecules and another set of the free water protons; and an MR signal of the water pool exhibits a first attenuation based at least in part on the first saturation transfer, the MTC and direct water saturation; (ii) discontinue the application of the first RF pulse train upon a lapse of the first predefined period; (iii) acquire a first water MR signal of the water pool from the MR device, the first water MR signal representing the first attenuation, the target molecules and the water pool returning to thermal equilibrium after the acquisition of the first water MR signal and the discontinuance; (iv) apply, to the target molecules for a second predefined period, a second RF pulse train with a low duty cycle ($DC_l$) and a second average irradiation power, the second RF pulse train comprising a plurality of pairs of bipolar pulses having a pulse duration ($t_P$), separated by a period of wait ($t_d$), wherein the second RF pulse train is applied at the same resonant frequency as the first RF pulse train; a second saturation transfer to the water pool based on the chemical exchange processes affected by the low duty cycle is made, the second RF pulse train causes direct water saturation and MTC, the MR signal of the water pool exhibits a second attenuation based at least in part on a second saturation transfer, the MTC, and the direct water saturation; (v) acquire a second water MR signal of the water pool from the MR device, the second water MR signal representing the second attenuation; and (vi) generate an ASEF signal representing a difference between the first water MR signal and the second water MR signal; and an output apparatus including a display and coupled to the ASEF system.

The ASEF/AROSE system 120 also performs the AROSE functionalities and is further configured to: (i) apply a first radio frequency (RF) pulse train with a high duty cycle ($DC_h$), a first average irradiation power ($B_{1,\ avg}$), and a first flip angle $\varphi_h$, wherein the target structure comprises the target molecules including exchangeable protons and a water pool including free water protons and semi-solid macromolecules, the first RF pulse train being applied at a resonant frequency of the exchangeable protons for a first predefined period, the application of the first RF pulse train changes a magnetization of the target molecules by at least one of a first rotation effect or a first saturation effect, the first rotation effect comprises rotating a spin system of the target molecules based on the application of the first RF pulse train with a first flip angle $\varphi_h$, making a first rotation transfer to the water pool via chemical exchange processes, and affecting the spin system of the water pool based on the first rotation transfer, the first saturation effect comprises a first saturation of the target molecules in which exchangeable protons upon the application of the first RF pulse train, the first saturation is transferred to the water pool via the chemical exchange processes comprising exchanging the saturated exchangeable protons with a set of the free water protons, the application of the first RF pulse train also causes contamination comprising direct water saturation and an MTC between the semi-solid molecules and another set of the free water protons, and an MR signal of the water pool exhibits a first attenuation based at least in part on the first rotation transfer and the first saturation transfer, the first MTC and the direct water saturation; (ii) discontinue the application of the first RF pulse train upon a lapse of the first predefined period; (iii) acquire a first water MR signal of the water pool from the MR device, the first water MR signal representing the first attenuation, the target molecules and the water pool return to thermal equilibrium after the acquisition of the first water MR signal and the discontinuance; (iv) apply, to the exchangeable protons of the target molecules for a second predefined period, a second RF pulse train with a low duty cycle ($DC_l$), a second average irradiation power and a second flip angle $\varphi_l$, the second RF pulse train including a plurality of RF pulses having a pulse duration ($t_P$) and a period of wait ($t_d$) between each pulse, where the second RF pulse train changes the magnetization of the target molecules by a second rotation effect and a second saturation effect based upon the application of the second RF pulse train, the second rotation effect comprises rotating the spin system of the target molecules, making a second rotation transfer to the water pool, and affecting the spin system of the water pool based on a second rotation transfer, and the second saturation effect comprises a first saturation of the target molecules based on exchangeable protons upon the application of the second RF pulse train, and a first saturation transfer to the water pool via chemical exchange processes exchanging the saturated exchangeable protons with the set of the free water protons, the second RF pulse train also causes contamination comprising the direct water saturation and MTC between the semi-solid molecules and another set of the free water protons, and the MR signal of the water pool exhibits a second attenuation based at least in part on the second rotation transfer, the second saturation transfer, the MTC and the direct water saturation; (v) acquire a second water MR signal of the water pool, the second water MR signal representing the second attenuation; and (vi) generate an AROSE signal representing a difference between the first water MR signal and the second water MR signal; and an output apparatus including a display and coupled to the AROSE system, the output apparatus configured to output at least the AROSE signal, the first water MR signal, and the second water MR signal on the display.

The present disclosure provides an average saturation efficiency filter (ASEF) and adjustment of rotation and saturation effects (AROSE) to improve, among others, the specificity of CEST signals.

Chemical Exchange Saturation Transfer (CEST)

In CEST imaging, a frequency-selective radiofrequency (RF) saturation pulse is applied at resonance frequency of the exchangeable labile protons of a solute pool (e.g., target endogenous or exogenous molecules), thereby equalizing the number of spins aligned against the magnetic field to the number of spins aligned with the magnetic field. The equalization results in saturation, a state in which there is no net magnetization (i.e., zero MR signal). Such saturated exchangeable protons with the net-zero magnetization from the solute pool then exchanges with unsaturated protons from a solvent pool (water), reducing the water signal by the amount of concentration of the solute pool. Simultaneously, longitudinal relaxation processes return the saturated proton spins to their thermal equilibrium state until the pools reach steady state or the saturation pulse is turned off. The reduction in the water signal is then imaged.

In biological tissues (i.e., in vivo), the saturation of solute pools also causes magnetization transfer (MT) between water molecules bound to larger macromolecules in solid or semisolid phases and free water protons, and the MT contrast (MTC) effect attenuates the water signal. Examples parameters to be considered in analyzing the CEST effect include concentration of the solute, the proton exchange rate, the number of exchangeable protons, the pH of the local environment, $T_1$ (time for a magnetic vector to return to its relaxation state), $T_2$ (time for an axial spin to return to its resting state), the power and duration ($T_p$) of the saturation pulse, and the saturation efficiency. Saturation efficiency determines how effectively a labile proton can be saturated by the RF pulse. The saturation efficiency is dependent on the chemical exchange rate and the saturation pulse power. For example, because a labile proton with a faster exchange rate has a shorter resident time, its magnetization needs higher RF power to be saturated. These parameters and other parameters of CEST are described with respect to a CEST experiment below.

In a CEST experiment, the signal is usually quantified by a ratio of two signal intensities with and without saturation ($I_{sat}$ and $I_0$) because the CEST effect is always measured indirectly through the bulk water. CEST is often measured by a long continuous wave (CW) saturation because of the CW's high sensitivity and simplicity in theoretical modeling. The steady state signal with a long CW saturation can be written as the ratio between longitudinal relaxation rate in the laboratory and rotating frames:

$$S_{base}^{CW} = \frac{I_{sat}}{I_0} = \frac{R_1 \cos^2\theta}{R_{1\rho}} \quad \text{[Equation 1]}$$

where $\theta$ is the angle between the effective $B_1$ field and the $B_0$ field. Assuming the CEST effect is small and $\cos^2\theta \approx 1$, the measured CEST ratio or CESTR between two states with and without the chemical exchange (CE) effect can be expressed as $$CESTR^{CW} = S_{base}^{CW} - S_{CE}^{CW} = T_1 \cdot S_{base}^2 \cdot R_{ex} \quad \text{[Equation 2]}$$

where the exchange-mediated relaxation rate $$R_{ex} = pk_{ex}\alpha, \alpha = \frac{\omega_1^2}{\omega_1^2 + k_{ex}^2}$$

is the saturation efficiency, p is the relative population of the labile proton, $\omega_1$ is the saturation frequency ($=\gamma B_1$) and $k_{ex}$ is the chemical exchange rate. $R_{ex}$ may be also referred to as $\Delta R_{1\rho}$.

Figure 3A:
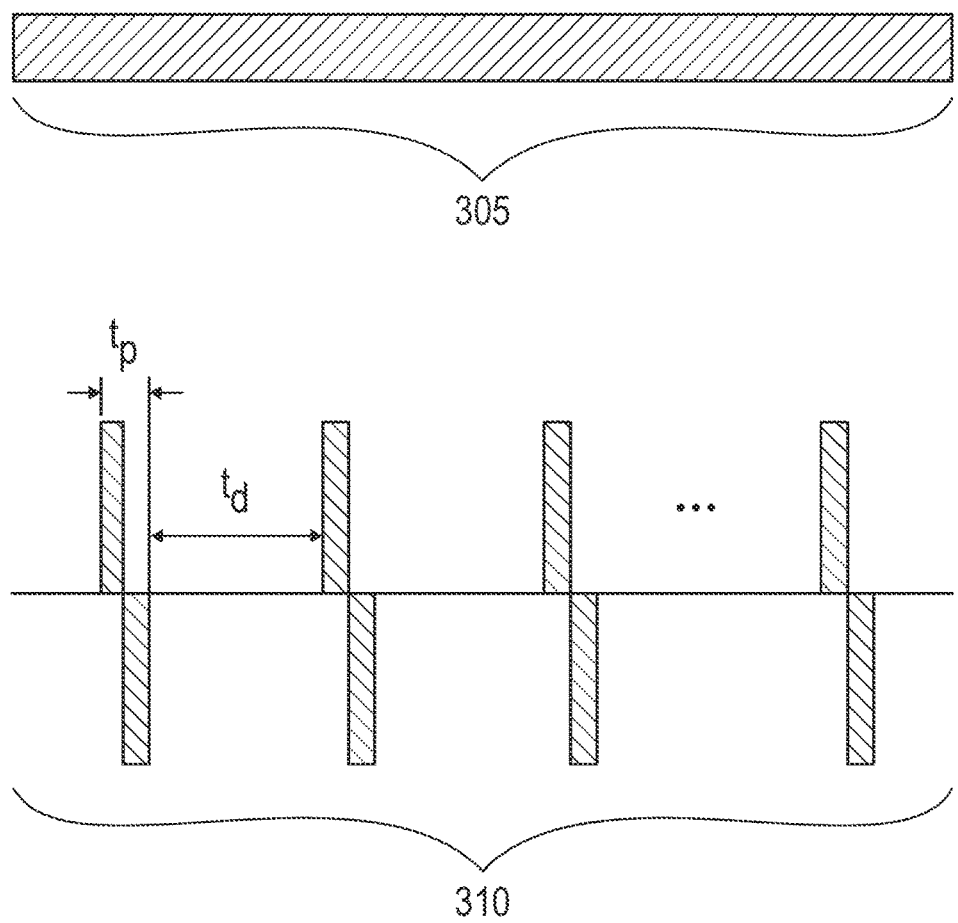
FIG. 3A illustrates pulse diagrams used for the saturation preparation using ASEF according to one particular, non-limiting exemplary embodiment of the disclosed concept.

While the CW saturation experiment represents the highest efficiency, due to concerns with machine limitations and/or power deposition, it is common to use a train of pulses in clinical setting. A train of block pulses where the RF in each repeating unit has a pulse with duration $t_p$ followed by a delay of $t_d$ (FIG. 3A). While a pair of bipolar pulses was used to reduce $B_1$-inhomogeneity, for simplicity it is assumed to have the same polarity in the calculation here. It should be understood that this pair of bipolar pulses can also be replaced by other composite pulses that achieve the same means of reducing $B_1$-inhomogeneity and eliminating rotation such as pulses that achieve phase cycling. The duty cycle can be defined as $$DC = \frac{t_p}{t_d + t_p},$$

and the signal under pulse train saturation may be $$S_{base}^{pulsed} = \frac{(1 - e^{-R_1 \cdot t_d}) - \frac{R_1}{R_{1\rho}}(1 - e^{R_{1\rho} \cdot t_p})}{e^{R_{1\rho} \cdot t_p} - e^{-R_1 \cdot t_d}} \quad \text{[Equation 3]}$$

When $R_{1\rho} \cdot t_p \ll 1$, $R_1 \cdot t_d \ll 1$, and $e^x \approx 1+x$, the equation above can be simplified as $$S_{base}^{pulsed} = \frac{R_1}{\overline{R_{1\rho}}} \quad \text{[Equation 4]}$$

where the averaged relaxation rate is:

$$\overline{R_{1\rho}} = R_{1\rho} \cdot DC + R_1 \cdot (1 - DC) \quad \text{[Equation 5]}$$

The difference between the two states with and without CE effect is:

$$\overline{R_{ex}} = R_{ex} \cdot DC = pk_{ex} \cdot \frac{DC \cdot \omega_1^2}{\omega_1^2 + k_{ex}^2} \quad \text{[Equation 6]}$$

Note the average saturation frequency is $\overline{\omega_1^2} \equiv DC \cdot \omega_1^2$, we have $$\overline{R_{ex}} = pk_{ex} \cdot \frac{DC \cdot \overline{\omega_1^2}}{\overline{\omega_1^2} + DC \cdot k_{ex}^2} = pk_{ex}\overline{\alpha} \quad \text{[Equation 7]}$$

where $\overline{\alpha}$ is the average saturation efficiency. Similar to Eq. [2], the measured CEST ratio for a pulse train can be expressed as $$CESTR = T_1 \cdot S_{base}^2 \cdot \overline{R_{ex}} = pk_{ex} T_1 \cdot S_{base}^2 \cdot \overline{\alpha} \quad \text{[Equation 8]}$$

Thus, CEST signal of a pulse train is proportional to the average saturation efficiency.

Average Saturation Efficiency Filter (ASEF)

ASEF is a method of improving the specificity of CEST signals and reducing contamination from fast exchanging labile protons and background magnetization transfer (MT). It measures the difference between CEST signals acquired with similar average irradiation power but largely different duty cycles (DC), e.g., a continuous wave or a high DC pulse train versus a low DC one. The ASEF utilizes two saturation schemes (as described with reference to FIG. 3A) which have similar time-averaged saturation efficiency for fast chemical exchange species and semisolid macromolecules, but drastically different averaged saturation efficiency for slow exchange species. The signal properties of ASEF were evaluated by computer simulation and validated by phantom experiments (as described with reference to FIGS. 4A-8H).

The ASEF signal takes the difference between two measurements with the same $\overline{\omega_1^2}$, but a high DC ($DC_h$) and a low DC ($DC_l$), and the ASEF ratio (ASEFR) can be expressed as:

$$ASEFR = pk_{ex} T_1 S_{base}^2 \overline{\omega_1^2}^2 \frac{DC_h - DC_l}{\left(\overline{\omega_1^2} + DC_h \cdot k_{ex}^2\right)\left(\overline{\omega_1^2} + DC_l \cdot k_{ex}^2\right)} \quad \text{[Equation 9]}$$

In the present disclosure, ASEF and ASEFR may be used interchangeable. For simplicity, in one particular embodiment of the present disclosure, CW is used for the high DC saturation, i.e., $DC_h=1$. Thus, $$ASEFR = pk_{ex} T_1 S_{base}^2 \overline{\omega_1^2}^2 \cdot \frac{1 - DC_l}{\left(\overline{\omega_1^2} + k_{ex}^2\right)\left(\overline{\omega_1^2} + DC_l \cdot k_{ex}^2\right)} \quad \text{[Equation 10]}$$

For very fast $k_{ex}$ satisfying $DC_l \cdot k_{ex}^2 \gg \overline{\omega_1^2}$ $$ASEFR \propto \left(\frac{\overline{\omega_1^2}}{k_{ex}^2}\right)^2 \approx 0 \quad \text{[Equation 11]}$$

For very slow $k_{ex}$ satisfying $k_{ex}^2 \ll \overline{\omega_1^2}$, $$ASEFR \propto (1 - DC_l) \cdot pk_{ex} \quad \text{[Equation 12]}$$

Thus, ASEF may serve as a low-pass filer which minimizes fast exchanging effects.

For the magnetization transfer (MT) effect of the semi-solid pool, the relaxation rate under a CW saturation can be expressed as:

$$R_{MT} = pk_{MT} \cdot \frac{\omega_1^2}{\omega_1^2 + \Omega^2 + k_{MT} \cdot (k_{MT} + R_{2,MT})} \approx \quad \text{[Equation 13]}$$

$$pk_{MT} \cdot \frac{\omega_1^2}{\omega_1^2 + \Omega^2 + k_{MT} \cdot R_{2,MT}}$$

assuming the relaxation can be described as a Lorentzian, where $\Omega$ is the applied RF frequency offset from water, $k_{MT}$ is the MT rate, and $R_{2,MT}$ is the transverse relaxation of the semisolid macromolecule proton, which is orders of magnitude larger than $k_{MT}$. Under a pulse train saturation, the average MT relaxation rate becomes $$\overline{R_{MT}} = pk_{MT} \cdot \frac{DC \cdot \overline{\omega_1^2}}{\overline{\omega_1^2} + DC \cdot (\Omega^2 + k_{MT} \cdot R_{2,MT})} \quad \text{[Equation 14]}$$

The difference for $DC_h$ and $DC_l$ saturation is:

$$\Delta\overline{R_{MT}} = \frac{pk_{MT} DC_h \cdot \overline{\omega_1^2}}{\overline{\omega_1^2} + DC_h \cdot q} - \frac{pk_{MT} DC_l \cdot \overline{\omega_1^2}}{\overline{\omega_1^2} + DC_l \cdot q} = \quad \text{[Equation 15]}$$

$$pk_{MT} \frac{DC_h - DC_l}{\left(1 + \frac{DC_h \cdot q}{\overline{\omega_1^2}}\right)\left(1 + \frac{DC_l \cdot q}{\overline{\omega_1^2}}\right)}$$

where $q = \Omega^2 + k_{MT} \cdot R_{2,MT}$, and typically $DC_l \cdot q \gg w_1^2$. Thus, for $DC_h=1$, the mismatch of the MT, or the baseline ASEF signal of MT, can be expressed as:

$$ASEFR_{MT} \approx T_1 S_{base}^2 \cdot \Delta\overline{R_{MT}} \propto \frac{1 - DC_l}{DC_l} \cdot \left(\frac{\overline{\omega_1^2}}{\Omega^2 + k_{MT} \cdot R_{2,MT}}\right)^2 \quad \text{[Equation 16]}$$

which is very sensitive to or dependent on saturation parameters and is larger for smaller $DC_l$ and for higher $\overline{\omega_1^2}$.

As such, several parameters of ASEF should be carefully chosen. For example, the duty cycles of the pulse trains determine the sensitivity whereas $B_{1,\ avg}$ determines the range for exchange rate filtering properties (e.g., without limitation, the exchange rate where the ASEF signal reaches the minimum and maximum). As shown in FIGS. 6A-E, DC, $B_{1,\ avg}$, and $t_p$ strongly affect the MT mismatch, and a higher $DC_l$, smaller $B_{1,\ avg}$ and shorter $t_p$ will reduce the MT mismatch. These three parameters also affect the bandwidth of the pulse train and consequently, the direct water saturation. Finally, although a train of bipolar pairs of pulses helps to minimize rotation transfer effects, there is residual rotation transfer signals for very slow exchange rates which can be reduced by the selection of $t_p$.

In order to increase the specificity of the CEST signal of interest, $ASEFR_{MT}$ should be minimized by adjusting saturation parameters such as $B_{1,avg}$, DC and $t_p$, or by applying a fudge factor (ff) so that there is a slight mismatch of $B_{1,avg}$ between the $DC_h$ and $DC_l$ pulse trains, for example and without limitation, $(1+ff) \times B_{1,avg}$ for the $DC_l$ pulse train, and $B_{1,avg}$ for the $DC_h$ pulse train. Typically, the choice of $B_{1,avg}$ for the study of CEST is dependent on the exchange rate of the labile proton of interest, which is 0.5-1 µT for PCr at 2.6 ppm, 0.7 to 2 µT for amide protons at 3.6 ppm, and 0.7 to 2 µT for the guanidyl group at approximately 2 ppm. Within these ranges, a lower $B_{1,avg}$ would be preferred for ASEF to reduce the MT mismatch, which increases rapidly with $B_{1,avg}$. Whereas a longer $t_p$ (e.g., >20 ms) would be needed at 2 ppm to minimize the contamination from direct water saturation, a shorter $t_p$ can be used for the 3.6 ppm amide to reduce the MT mismatch. A higher $DC_l$ can also reduce the MT mismatch, but a $DC_l$ of less than 30% would be preferred to maintain ASEF sensitivity.

When MT mismatch is non-negligible, a small fudge factor (ff) may be used to minimize the mismatch as shown in FIGS. 8A-H. This factor can be determined in a pilot experiment with a pre-selected saturation power, DC, and $t_p$, at a reference offset that is close to the Larmor frequency of interest but has minimal known CEST effect, such as 4.5-5 ppm for in vivo study. In some examples, a fudge factor matching procedure may be employed to mitigate the MT mismatch. During the matching procedure, a fudge factor (ff) may be determined to adjust the power of the low DC pulse train so that the MT effects of high DC pulse train (e.g., a CW pulse train) and a low DC pulse train are matched at a reference frequency ($\Omega_{ref}$) with minimal CEST effect. The fudge factor ff can be determined by: (1) acquiring a CW pulse train signal $S_{\Omega_{ref}}^{CW}(B_{1,avg})$ at the reference frequency at average $B_1$; (2) acquiring a low DC pulse train signal $S_{\Omega_{ref}}^{pulsed}(B_{1,avg}*(1+ff))$ at reference frequency at average $B_1$ adjusted by a fudge factor ff, and (3) interpolating to find a fudge factor ff giving $S_{\Omega_{ref}}^{CW}(B_{1,avg})=S_{\Omega_{ref}}^{pulsed}(B_{1,avg}*(1+ff))$. Alternatively or additionally, a baseline-correction can be applied where the baseline ASEF signal of the MT effect is acquired at the reference offset and subtracted from the ASEF signal at the RF offset of interest. The base line correction can be used to rectify any residual signal that may result from disparate MT effects across an ASEFR image. The base line correction to further minimize $ASEFR_{MT}$ can be performed by: (1) acquiring a CW pulse train signal $S_\Omega^{CW}(B_{1,avg})$ at a set of frequencies including the reference frequency at average $B_1$; (2) acquiring a low DC pulse train signal $S_\Omega^{CW}(B_{1,avg}*(1+ff))$ at the same frequencies at average $B_1$ adjusted by a fudge factor ff; (3) calculate raw ASEFR ($ASEFR_\Omega^{raw}$) as: $ASEFR_\Omega^{raw}=(S_\Omega^{pulsed}-S_\Omega^{CW})/S_0$; and correct ASEFR for baseline giving $ASFER_\Omega = ASEFR_\Omega^{raw} - ASEFR_{\Omega_{ref}}^{raw}$. It has been shown that exchange rate filtering of ASEF is only slightly affected by a small fudge factor. For example, it has been shown that $B_{1,avg}=1.6$ µT for CW saturation whereas $B_{1,avg}=(1+ff) \times 1.6$ µT for the low DC pulse train. Further, because $ASEFR_{MT}$ is strongly $B_1$-dependent, the baseline correction will also be helpful in present of significant $B_1$ inhomogeneities when the suppression of $ASEFR_{MT}$ with a single fudge factor may be insufficient.

Simulations of CEST signals (as described with reference to FIGS. 3A-8H) were made by using Bloch-McConnel Equations which include 3 exchanging pools of free water protons, labile protons, and bound water protons, and the line shape of the bound water was modeled by a super-Lorentzian function. A default bound water proton fraction ($f_{MT}$) of 0.06, a magnetization transfer rate between bound water and free water ($k_{MT}$) of 10 s$^{-1}$, a chemical shift between the labile proton and water of 1.9 ppm, a fraction of labile proton of 0.001 and a chemical exchange rate varying from 5 s$^{-1}$ to 5000 s$^{-1}$ were used. The $T_1$ ($T_2$) of water, labile proton, and bound water protons were assumed to be 2 s (66.6 ms), 2 s (66.6 ms), and 2 s (10 µs), respectively. A Gaussian with kurtosis of 4 was used because its power distribution is more uniform and closer to a square pulse than a regular Gaussian. In other words, compared to the standard Gaussian, a Gaussian with kurtosis 4 can be said to have a lower Crest factor. Unless otherwise specified, a default $DC_l=15\%$ and $t_p=24$ ms was used for the bipolar pair (i.e., 12 ms for a single pulse).

All MR experiments were performed on a Bruker Bio-Spec® 9.4 T instrument at room temperature. A 4.0-cm ID (inner diameter) volume coil was used for excitation and reception. The magnetic field homogeneity was optimized by utilizing a protocol that calculated shim values based on a field map and then subsequently optimized by localized shimming over the volume of interest in phantoms. The CEST pulse sequence consists of a 6.4-s saturation preparation module for chemical exchange contrast followed by an image readout. Images were acquired by a single slice spin-echo EPI (echo-planar imaging) with following parameters: matrix size=64×64, field of view=50×50 mm, slice thickness=5 mm, TR (repetition time)=14 s and TE (echo time)=27 ms. Two sets of creatine phantoms were prepared. The first set consisted of four phantoms prepared in 1×PBS and 3% weight/volume (w/v) agar. 50 mM creatine (Cr) was added to three of these phantoms and then titrated to the following pHs: 6.5, 7.0, 7.5, and 7.0 for the agar only phantom. The second set consisted of seven phantoms prepared in 10% (w/v) Bovine Serum Albumin (BSA) and 1×PBS. 50 mM Cr was then added to six of these phantoms and they were subsequently titrated to the following pHs: 6.15, 6.55, 7.04, 7.44, 7.85, 8.25, and 7.0 for the BSA only phantom. These phantoms were then transferred into 9-mm I.D. syringes, heated in a water bath at 95° C. to denature the BSA within the phantoms for 20 minutes, and allowed to cool before imaging at room temperature. To evaluate the exchange rate filtering of ASEF signal, the exchange rates of Cr at these pH values were obtained by a formula $k_{ex}=10^{(pH-4.8)}$(s$^{-1}$), which is an approximate calibration of Cr exchange rates at 20° C.

Saturation preparation schemes consisted of either a single CW block pulse or a train of 40 binomial pairs of Gaussian pulses with a kurtosis of 4 (gaussK4). The pulse duration was 24 ms for the pair and the pulse interval was 136 ms, yielding a DC=15%. The power used for these schemes was an average $B_1$ of 1.0 µT for the first set of phantoms or 0.8 µT and 1.6 µT for the second set of phantoms and the precise peak pulse powers were determined by fudge factor matching. For this matching, saturation transfer signals were measured in a pilot study at reference frequencies with minimal CEST effect, i.e., −4 ppm for the first experiment of agar phantoms and 6 ppm for the second experiment of BSA phantoms, using both CW and the binomial pair pulse train. $S_0$ was measured with saturation applied at 300 ppm for normalization. The power of the binomial pair pulse train was then modulated to achieve equality of the saturated signal between the two saturation schemes resulting in a peak power of 3.81 µT for average $B_1$ of 1.0 µT (ff of 6.39%) for agar phantoms, and peak powers of 2.93 µT and 6.05 µT for the BSA phantoms for average $B_1$ of 0.8 µT and 1.6 µT (i.e., ff of 2.39% and 5.85%), respectively. FIGS. 19A-22 describe another example fudge factor matching in accordance with the present disclosure.

As mentioned previously, one of the biggest limitations for in vivo endogenous CEST application is its low specificity, especially due to contamination from the MT effect of semisolid macromolecules and fast chemical exchanging species at close resonance frequencies. CEST signal is proportional to time-averaged saturation efficiency. The result of these ASEF simulations and phantom experiments show that ASEF minimizes the MT effect and provides exchange rate filtering for chemical exchange sensitive imaging with a relatively small reduction in maximum CEST sensitivity. For two irradiation schemes with the same average irradiation power but largely different duty cycles, the average saturation efficiency is similar for fast chemical exchange process and the MT pool, but differs greatly at slow exchange processes. Taking the difference between these two schemes, ASEF can minimize these contaminations with a relatively small reduction in peak CEST sensitivity for slow to intermediate exchange species compared to CW irradiation. It can be acquired at as few as only one frequency offset, i.e., the Larmor frequency of the labile proton of interest. Thus, ASEF is a highly useful tool for CEST study in the slow to intermediate exchange regime.

Further, ASEF in accordance with the present disclosure provides a much better solutions to contamination issues associated with CEST signals. For example, ASEF may provide higher sensitivity than other filtering methods and is less sensitive to $B_1$-inhomogeneity due to the use of a bipolar pair. Furthermore, since ASEF matches average power deposition there is minimal mismatch of the MT. These advantageous features of ASEF are described with reference to FIGS. 4A-8H. It is noted that since the ASEF approach takes the differences between two irradiations with highly different DCs, CW was used for the CEST signal simulations and phantom experiments for simplicity and to achieve the highest sensitivity. However, conventional MR device (e.g., MRI scanner, MR spectroscopy, etc.) are capable of generating RF pulses with pulse duration in the order of tens of milliseconds (ms). As such, in those hardware systems where CW is not available, the highest possible DC is preferable for maximizing the differential saturation transfer signal, which will be the general case as described in Eq. [9]. In the same sense, where CW is not available, pulses should utilize the pulse shapes and flip angles with the lowest available Crest factors. Another practical issue is the linearity and the stability of the RF system. ASEF signal relies on two irradiation schemes with either the same or very close average irradiation power. Because the pulse duration and peak power should be highly different to ensure high ASEF sensitivity, there may be some mismatch in the actual average power in RF systems where linearity and temporal stability are not ideal, and thus, a calibration of the average power (e.g., with a phantom) may be necessary to minimize the differences between the average powers of the two irradiation schemes.

Adjustment of Rotation and Saturation Effects (AROSE)

The AROSE approach measures the difference between CEST signals acquired with the same average irradiation power but largely different duty cycles, e.g., a continuous wave (CW) or a high duty cycle pulse versus a low duty cycle pulse train with a flip angle φ. Simulation and phantom studies were performed to evaluate the characteristics of $AROSE_\varphi$ signal, and their results show that $AROSE_{2\pi}$ is a low-pass filter which can suppress fast exchanging processes (e.g., >3000 s$^{-1}$) whereas $AROSE_\pi$ is a band-pass filter suppressing both fast and slow exchange (e.g., <30 s$^{-1}$) rates. For other φ angles, the sensitivity and the filtering effect of $AROSE_\varphi$ falls between $AROSE_\pi$ and $AROSE_{2\pi}$, and the range of filtering can be adjusted with the average irradiation power. AROSE can also minimize the magnetization transfer contrast (MTC) and improve the Larmor frequency selectivity of the CEST signal. The linewidth of $AROSE_{1.5\pi}$ spectrum is about 60-65% when compared to the CEST spectrum measured by CW. Depending on the needs of an application, the sensitivity, exchange-rate filtering, and the Larmor frequency selectivity can be adjusted by varying the flip angle, the duty cycle, and the average irradiation power.

Under a long CW irradiation, the longitudinal magnetization of the labile proton is saturated and essentially zero. Under a pulse train irradiation, when the dwell time of a labile proton is comparable to or longer than the pulse duration (e.g., $t_p<1/k_{ex}$), it is necessary to consider that each short irradiation pulse causes the magnetization to flip to a certain angle, and thus the longitudinal magnetization may be a value between positive and negative $M_0$. The CEST signal with pulse train irradiation contains a contribution of rotation transfer which can be significant for slow exchanges. Specifically, a train of π-pulse and 2π-pulse may give maximal and minimal rotation transfer effects, respectively. Because both saturation and rotation transfer effects provide a magnetic label and affect the bulk water signal in general, an AROSE signal can be obtained from two acquisitions with different labelling schemes (e.g., duty cycle and flip angle φ):

$$AROSE(\varphi_l, \varphi_h) = S(DC_l, \varphi_l) - S(DC_h, \varphi_h) \qquad \text{[Equation 17]}$$

In one particular embodiment of the present disclosure, CW was used for the high duty cycle irradiation, thus simplifying to the following, $$AROSE_\varphi = S(DC_l, \varphi) - S(CW) \qquad \text{[Equation 18]}$$

As a special case, $AROSE_{2\pi}$ may be a low-pass filter because a 2π-pulse has minimal rotation transfer effect. Indeed, $AROSE_{2\pi}$ may be considered as a special case of ASEF where the rotation transfer effect is suppressed by using a pulse train of a bipolar pair. Simulation of the Bloch-McConnell Equations has shown that the magnitude of rotation transfer effect from a train of π-pulses approaches that of the saturation effect of a CW irradiation for slow exchange rates. Thus, $AROSE_\pi$ can be a band-pass filter minimizing both slow and fast exchange signals. For other flip angles, the exchange rate-filtering property may be between $AROSE_\pi$ and $AROSE_{2\pi}$.

CEST signals were simulated by Bloch-McConnel Equations which include three exchanging pools of free water protons, labile protons, and bound water protons, and the line shape of the bound water was modeled by a super-Lorentzian function. A bound water proton fraction ($f_{MT}$) to vary from 0 to 0.09 with a default value of 0.06, the magnetization transfer rate between bound water and free water ($k_{MT}$) of 15 s$^{-1}$, the chemical shift between the labile proton and water is 3.5 ppm, the fraction of labile proton is 0.001 and the chemical exchange rate varies from 5 s$^{-1}$ to 5000 s$^{-1}$ were used. The $T_1$ ($T_2$) of water, labile proton, and bound water protons were assumed to be 2 s (66.6 ms), 2 s (66.6 ms), and 2 s (10 µs), respectively. Gaussian pulses were used for the pulse train in the simulation.

All MR experiments (as described with reference to FIGS. 10A-18D) were performed on a Bruker BioSpec® 9.4 T instrument at room temperature. A 4.0-cm ID volume coil was used for excitation and reception. The magnetic field homogeneity was optimized by utilizing a protocol that calculated shim values based on a field map and then subsequently optimized by localized shimming over the volume of interest in phantoms. The CEST pulse sequence consists of a 6-s saturation preparation module for chemical exchange contrast followed by an image readout. Images were acquired by a single slice spin-echo EPI with following parameters: matrix size=64×64, field of view=50×50 mm, slice thickness=5 mm, TR=14 s and TE=27 ms. Two sets of phantom experiments were performed for the study of AROSE effects to study the exchange rate filtering and the frequency selectivity of an AROSE signal, a set of seven phantoms with 30 mM creatine (Cr) were dissolved in 1× phosphate buffered saline (PBS) and titrated to pH values of 6.0, 6.3, 6.7, 7.0, 7.3, 7.6, and 7.9. These solutions were transferred into syringes and bundled together for imaging. Z-spectra were acquired for 38 offsets with uneven interval in the range of −4 ppm to 4 ppm. Either a single CW block pulse or a train of pulses ($\varphi=\pi$, 1.33 $\pi$, 1.5 $\pi$, and 2$\pi$) with $B_{1,\,avg}$ of 0.47 µT or 0.94 µT was applied. The two sets of phantom experiments were performed also to study the effect of MTC and the direct water rotation on an AROSE signal, a second set of phantom contains 12% Bovine Serum Albumin (BSA) with 40 mM Cr or 12% BSA only were dissolved in PBS and titrated to pH=7.4 and transferred to syringes. These syringes were then heated in a water bath at 95° C. for 20 minutes to denature and coagulate BSA. Direct water rotation and AROSE was examined by acquiring Z-spectra using either a single CW block pulse or a train of pulses ($\varphi=\pi$, 1.5 $\pi$, or 2$\pi$) with a $B_{1,\,avg}$ of 0.7 µT or 1.4 µT applied at 52 offsets between the offset range of ±5 ppm. Gaussian pulses with specific average power, flip angle and duty cycle were used for the pulse trains. For example, the following pulse trains were used for $B_{1,\,avg}$ of 0.94 µT Hz and 10% DC: 120 Gaussian $\pi$ pulses (pulse width=5.3 ms, $B_{1,\,peak}$=5.31 µT) with a pulse interval of 44.7 ms, or 60 Gaussian 2$\pi$ pulses (pulse width=10.6 ms, $B_{1,\,peak}$=5.31 µT) with a pulse interval of 89.4 ms. It is noted that the actual average power of the long CW pulse is less than the nominal power because the temporal stability is not ideal in the RF system used for the experiments, e.g., there is a ~25% drop of the power over the long saturation duration of a few seconds. Thus, a power calibration was performed on an agarose phantom for correction.

The results of the simulation and phantom experiments show that AROSE minimizes the MTC and improves the exchange rate filtering and the Larmor frequency specificity as discussed further with reference to FIGS. 9A-18D. The ASEF approach in accordance with the present disclosure improves the CEST signal specificity by suppressing the MTC effect and fast exchange processes. The ASEF only needs to be acquired at the Larmor frequency of the labile proton of interest, with a relatively small reduction in peak CE sensitivity compared to CW irradiation. The AROSE approach in accordance with the present disclosure has similar effects with the ASEF, but also provides adjustable filtering for slow exchange process and improves the Larmor frequency selectivity.

The current invention of ASEF and AROSE relies primarily on a CW or in the very least a pseudo-continuous wave pulse (to the degree of machine and safety limits). This maximizes contrast resultant from saturation transfer. The second acquisition resultant from a low duty cycle pulse train is then used as a filter to remove non-specific effects such as MTC and faster exchange rates. The signal from 2$\pi$-pulse train of AROSE$_{2\pi}$ can be considered as a similar case as the binomial pulse train of ASEF which contains minimal rotation transfer component and exploits the difference in the saturation transfer effect between CW and low DC pulse train to the highest degree. Since there is no rotation effect subtracted from both ASEF and AROSE$_{2\pi}$, there is no suppression of the rotation-susceptible slower exchange rates creating a purely low pass filter that will only filter out faster exchange contributions. For AROSE$_\varphi$ with $\varphi \neq 2\pi$, the rotation transfer effect is not added to, but is subtracted from the differential saturation transfer signal between CW and $\varphi$-pulse train to provide exchange rate filtering for slow chemical exchange rates as well as some improvement on Larmor frequency-specificity.

There are several parameters which can be selected and adjusted according to the need of the application, and thus make the AROSE approach versatile. One parameter is the flip angle $\varphi$ of the pulse train because it affects the FWHM (full-width-at-half-maximum) of the exchange rate filter and the Larmor frequency selectivity, as well as the peak CE sensitivity. Specifically, a $\varphi$ with larger rotation transfer effect, such as $\pi$ and 3$\pi$, causes a larger loss in peak sensitivity but provides stronger filtering for slower exchange rates. The dependence of frequency selectivity on $\varphi$ is more complex and is also influenced by the exchange rate: the linewidth decreases with $\varphi$ until 1.3$\pi$-1.5$\pi$, but pulses with a smaller $\varphi$, due to its broader bandwidth, can lead to a significant undershoot for slow exchange rates which adversely affect frequency selectivity. A smaller $\varphi$ also causes a larger direct water rotation effect and makes the application to labile protons with Larmor frequency closer to water more difficult. Moreover, a flip angle around 1.5$\pi$ may be more sensitive to $B_1$ inhomogeneity than other angles. As shown in FIG. 10A, the rotation transfer effect reaches local minimum and maximum at integer multiples of $\pi$, while the slope is the largest at around 1.5$\pi$. Thus, $B_1$-correction may be needed if the $B_1$ inhomogeneity is significant. On the other hand, a larger $\varphi$ (e.g., such as 3$\pi$) will have a larger mismatch of the MTC effect in the baseline AROSE signal which requires a fudge factor to correct it. In principle, the choice of $\varphi$ should be larger than 1.3$\pi$ unless a very strong suppression of slow exchange rate is necessary, and it is known that there is little contamination to the signals of interest from direct water rotation and from labile protons with close Larmor frequencies.

Another important parameter to choose for AROSE is the duty cycle, which strongly affects the sensitivity and the direct water rotation. For example, a higher DC for the low DC pulse train reduces AROSE sensitivity (e.g., a low pulse train having 0.5 DC exhibits lower AROSE sensitivity as compared to a low pulse train having 0.3 DC when combined with the same CW), but it also reduces the direct water rotation, allowing the study of labile protons with Larmor frequencies closer to water. DC also slightly affects the FWHM of the exchange rate filtering and frequency specificity.

A third important parameter to choose for AROSE is $B_{1,\,avg}$ which determines the peak magnitude and the frequency range for exchange rate filtering (see FIGS. 12A-D). For example, an increase of $B_{1,\,avg}$ from 0.7 µT to 1.4 µT can shift the high-pass threshold of the exchange rate filtering for AROSE$_{2\pi}$, roughly defined as signals below 10% of the peak magnitude, from ~1300 s$^{-1}$ to ~2600 s$^{-1}$. $B_{1,\,avg}$ also strongly affects the direct water rotation, as seen in FIG. 15C. While Gaussian pulse was used for the pulse train for the simulations and experiments, the pulse shape can also be adjusted and may have different sensitivity and exchange rate-filtering effect.

The AROSE approach takes the differences between two irradiations with highly different DCs. CW was used here for simplicity and to achieve the highest AROSE sensitivity. In hardware systems where CW is not available, the highest possible DC is preferable for maximizing the differential saturation transfer signal. This high duty cycle pulse train irradiation can also introduce more degrees of freedom such as the pulse shape and the flip angle, which can be adjusted for the optimization of CE sensitivity, the exchange-rate filtering and the frequency specificity, and needs further investigation. Another practical issue is the linearity and the stability of the RF system. AROSE signal relies on two irradiation schemes with the same or very close average irradiation power. Because the pulse duration and peak power should be highly different to ensure a high AROSE sensitivity, there may be some mismatch in the actual average power in RF systems where the linearity and temporal stability are not ideal, and thus, a calibration of the average power (e.g., with a phantom experiment) may be necessary to minimize the differences between the average powers of the two irradiation schemes.

In short, ASEF in accordance with the present disclosure minimizes the MT effect and provides exchange rate filtering for CE sensitive imaging with a small reduction in maximum CEST sensitive. That is, ASEF can serve as a low-pass filer, which minimizes fast exchanging effects. AROSE in accordance with the present disclosure may be used as filtering slow, and/or fast exchange rate. That is, $AROSE_{2\pi}$ is a low-pass filter which can suppress fast exchanging processes (e.g., $>3000$ s$^{-1}$) whereas $AROSE_{\pi}$ is a band-pass filter suppressing both fast and slow exchange (e.g., $<30$ s$^{-1}$) rates.

Figure 1B:
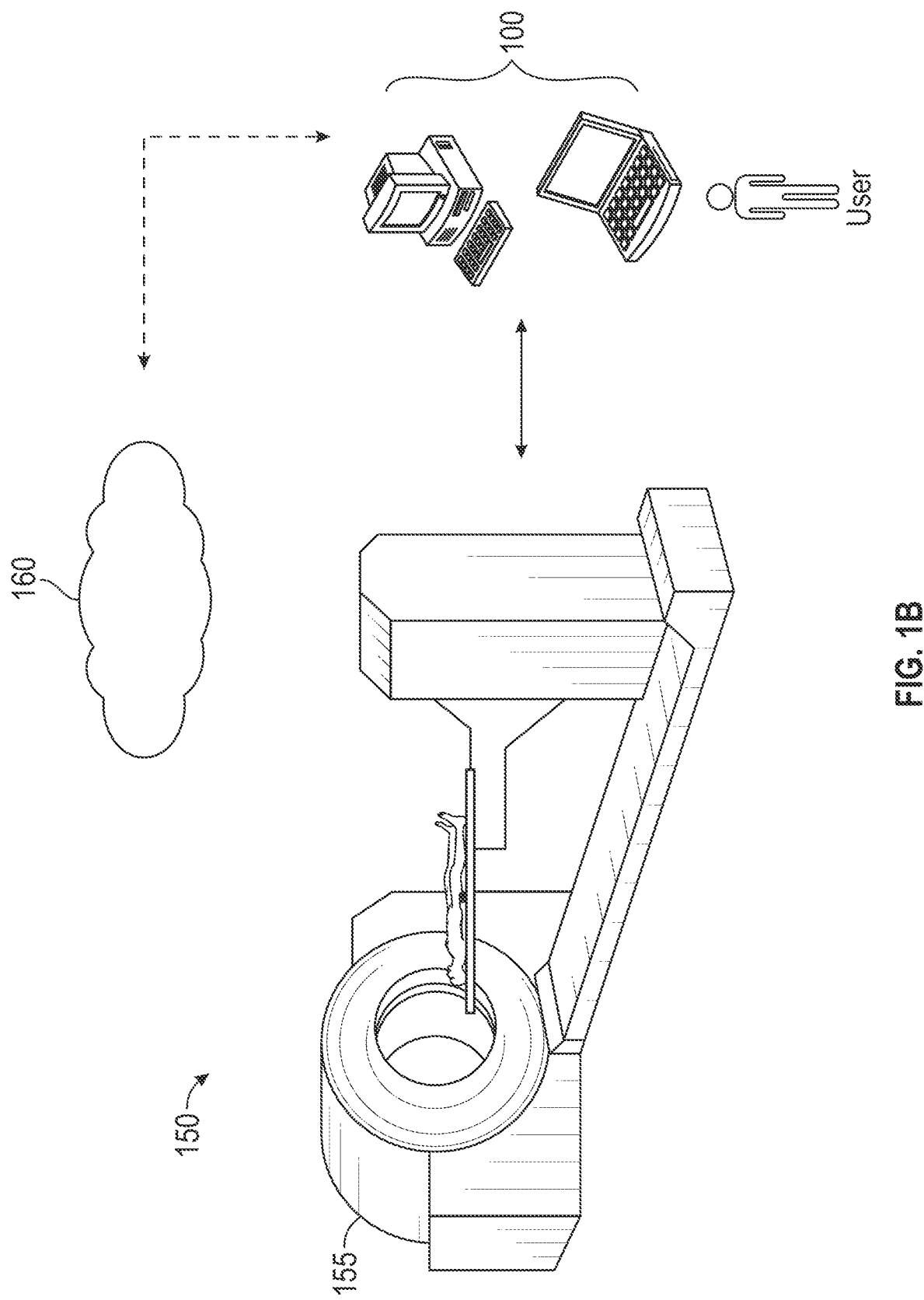
FIG. 1B illustrates a magnetic resonance imaging system for CEST MRI according to one particular, non-limiting exemplary embodiment of the disclosed concept.

FIG. 1B illustrates a magnetic imaging system 150 for CEST MRI according to one particular, non-limiting exemplary embodiment of the disclosed concept. The MRI system 150 includes a CEST MRI device 100 and an MR device 155 coupled to the CEST MRI device 100 via wired connection or wireless communications mechanisms (e.g., Bluetooth™, WiFi, LTE, etc.). As described with reference to FIG. 1A, the CEST MRI device 100 includes an input apparatus 105, an output apparatus 110 and a control system 115, including an ASEF/AROSE system 120. The ASEF/AROSE system 120 may be codes, instructions, or software applications for ASEF/AROSE functionalities as described herein. A detailed explanation of the input apparatus 105, display 110 and the control system 115 is provided in connection with FIG. 1A.

In FIG. 1B the MR device 155 is an MRI scanner in a cylindrical shape, but the MR device 155 may be any device (e.g., MR spectroscopy) capable of generating magnetic field and RF waves or pulse trains for MRI. The MR device 155 includes a magnet (not shown) and coils (not shown) and is structured to generate a magnetic field and computer-generated radio waves to produce detailed images of internal structures (e.g., organs, bones, muscles, blood vessels, etc.) of a subject (e.g., a patient). When the subject lies inside an MR device 155, the magnetic field temporarily realigns water molecules in the subject's body, and the radio waves cause these aligned atoms to generate faint signals used to create cross-sectional MRI images. Further, the MR device 155 may generate one or more RF pulse trains (e.g., a first RF pulse train with a high duty cycle, a second RF pulse train with a low duty cycle, etc.) based on information received from the user (e.g., MRI technician, clinician, etc.) associated with the one or more RF pulse trains. The information includes, e.g., without limitation duty cycles (DCs), average irradiation power, RF pulse duration, period of wait between the RF pulses, flip angles of the RF pulses, etc. A high duty cycle includes a continuous wave or the highest duty cycle that the MR device 155 is capable of generating. A low duty cycle includes a duty cycle lower than the high duty cycle. The examples of a low duty cycle include, without limitation 10%, 15%, 20%, 40% duty cycle, etc. The DCs are determined based at least in part on capabilities of the MR device 155, target molecules, or environment of interest.

The cloud server 160 may be communicatively coupled to the ASEF/AROSE system 120 via a communications module (not shown), and the ASEF/AROSE system 120 may obtain, e.g., the codes, instructions, or software applications wirelessly. The cloud server 160 may be also communicatively coupled to a storage server including public health data relevant to the CEST MRI of the subject.

Figure 2:
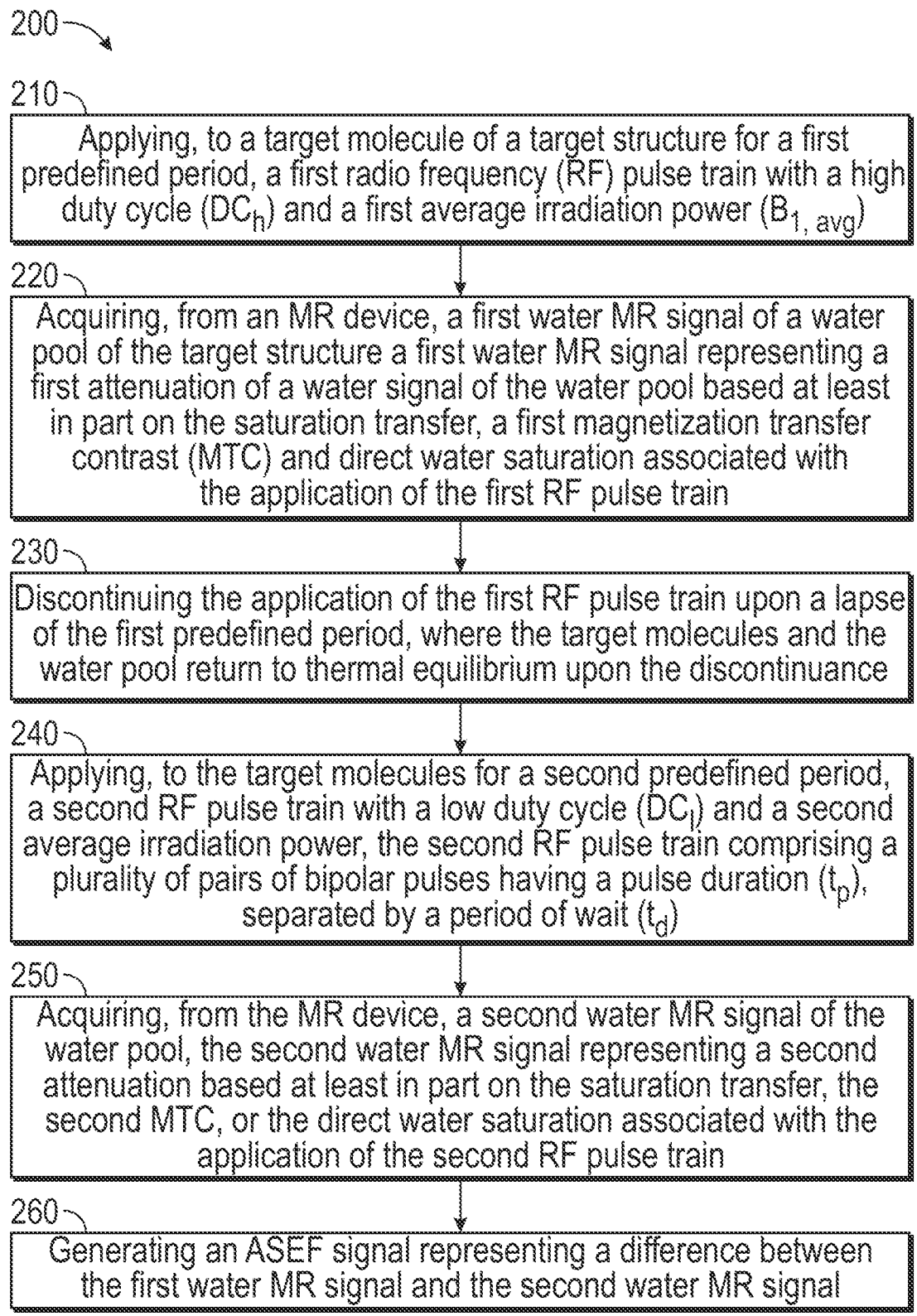
FIG. 2 is a flow chart of a method of CEST MRI using an ASEF system couplable to a magnetic resonance (MR) device according to one particular, non-limiting exemplary embodiment of the disclosed concept.

FIG. 2 is a flow chart of a method 200 of CEST MRI using an ASEF system couplable to a magnetic resonance (MR) device according to one particular, non-limiting exemplary embodiment of the disclosed concept. The method 200 may be performed by the ASEF system 120 or any components of the device 100 as described with reference to FIG. 1.

At 210, the ASEF system applies to a target molecule of a target structure for a first predefined period, a first radio frequency (RF) pulse train with a high duty cycle ($DC_h$) and a first average irradiation power (B1, avg). The target structure includes the target molecules including exchangeable protons and a water pool including free water protons and semi-solid macromolecules. The target molecules reach saturation in which each exchangeable proton has net-zero magnetization based on the application of the first RF pulse train. The saturation of the target molecules is transferred to the water pool based on chemical exchange processes exchanging the net-zero magnetization exchangeable protons with a set of the free water protons, and the first RF pulse train also causes direct water saturation and a first magnetization transfer contrast (MTC) between the semi-solid macromolecules and another set of the free water protons. And an MR signal of the water pool exhibits a first attenuation based at least in part on the saturation transfer, the first MTC and direct water saturation. In some examples, the first predefined period lasts a few seconds (e.g., without limitation, 2, 3, 4 seconds). In some examples, the first RF pulse train is a continuous wave or the highest duty cycle that the MRI device is capable of generating. In some examples, the chemical exchange processes include a chemical exchange rate varying from 5 s$^{-1}$ to 5000 s$^{-1}$. In some examples, fast exchange processes of the chemical exchange process includes a chemical exchange rate greater than 2000 s$^{-1}$. In some examples, slow exchange processes of the chemical exchange processes includes a chemical exchange rate less than 30 s$^{-1}$. However, these are for illustrative purposes only and may vary depending on the target molecules and environmental property of interest. In some examples, the continuous wave provides the highest sensitivity of the CEST imaging of the target molecules. In some examples, peak to average power ratio (Crest factor) of the first RF pulse train is minimized to approach a Crest factor of a continuous wave and the Crest factor of the first RF pulse train is lower than a Crest factor achieved by a series of simple 90 degrees RF pulses.

At 220, the ASEF system acquires, from an MR device, a first water MR signal of a water pool of the target structure a first water MR signal representing the first attenuation of a water signal of the water pool based at least in part on the saturation transfer, a first magnetization transfer contrast (MTC) and direct water saturation associated with the application of the first RF pulse train.

At 230, the ASEF system discontinues the application of the first RF pulse train upon a lapse of the first predefined period. The target molecules and the water pool return to a thermal equilibrium upon the discontinuance.

At 240, the ASEF system applies to the target molecules for a second predefined period, a second RF pulse train with a low duty cycle ($DC_l$) and a second average irradiation power, the second RF pulse train including a plurality of pairs of bipolar pulses having a pulse duration ($t_P$), separated by a period of wait ($t_d$). The target molecules reach saturation in which each exchangeable proton has net-zero magnetization based on the application of the second RF pulse train. The saturation of the target molecules is transferred to the water pool based on chemical exchange processes exchanging the net-zero magnetization exchangeable protons with a set of the free water protons, and the second RF pulse train also causes direct water saturation and a second MTC between the semi-solid macromolecules and another set of the free water protons. And an MR signal of the water pool exhibits a second attenuation based at least in part on the saturation transfer, the second MTC and direct water saturation. The second predefined period may be a few seconds (e.g., without limitation, 2, 3, 4 seconds). In some examples, $T_P$ may be, e.g., without limitation, a few milliseconds (e.g., without limitations, 10, 12, 24 milliseconds, etc.). When power spectrum and Z-spectra for CW saturation and bipolar pair pulse trains (e.g., having $t_p$=12 ms and tp=24 ms) were compared, a shorter $t_p$ of 12 ms had wider sidebands, indicating that direct water saturation affects a wider frequency offset than 24 ms. Also, Z-spectra measured with a CW pulse and pulse trains with 15% and 30% indicate that a larger DC (e.g., DC=30%) reduces the effect of direct water saturation more than that of a smaller DC (e.g., DC=15%). In some examples, a number of RF pulses of the second RF pulse train, and the period of wait $t_d$ between the RF pulses, and a peak power of the RF pulses are determined such that the second average irradiation power of the second RF pulse train is the same as the first average irradiation power. In some examples, the ASEF minimizes a mismatch between the first MTC and the second MTC based at least in part on having the same average irradiation power for the second RF pulse train as the first average irradiation power of the first RF train. In some examples, the ASEF minimizes a mismatch between the first MTC and the second MTC based at least in part on selecting a short $t_P$ for the second RF pulse train, a small duty cycle difference between the high duty cycle $DC_h$ and the low duty cycle $DC_l$, and a low average irradiation power $B_{1,\,avg}$. In some examples, a fudge factor is added to the second RF pulse train to minimize a mismatch between the first MTC and the second MTC, the fudge factor including a percentage increase or decrease in the second average irradiation power $B_{1,\,avg}$. In some examples, the bipolar pulses cancel out rotation effect and reduce $B_1$-inhomogeneity. In some examples, the target molecules are endogenous or exogenous molecules. In some examples, the endogenous or exogenous molecules are mobile molecules. In some examples, at least one of the first RF pulse train or the second RF pulse train includes Gaussian shape. In some examples, at least one of the first RF pulse train or the second RF pulse train includes Lorentzian shape.

At 250, the ASEF system acquiring, from the MR device, a second water MR signal of the water pool, the second water MR signal representing the second attenuation based at least in part on the saturation transfer, the second MTC, or the direct water saturation associated with the application of the second RF pulse train.

At 260, the ASEF system generating an ASEF signal representing a difference between the first water MR signal and the second water MR signal. The output apparatus of the ASEF system may display the ASEF signal on a display. In some examples, the difference between the first water MR signal and the second water MR signal taken by the ASEF signal is:

$$ASEF = pk_{ex}T_1 S_{base}^2 \overline{\omega_1^2} \frac{DC_h - DC_l}{\left(\overline{\omega_1^2} + DC_h \cdot k_{ex}^2\right)\left(\overline{\omega_1^2} + DC_l \cdot k_{ex}^2\right)}$$

where p is the relative population of the exchangeable protons, $k_{ex}$ is the chemical exchange rate, $T_1$ is a longitudinal relaxation time, $S_{base}$ is a baseline signal, and $\omega_1$ is the saturation frequency. In some examples, the first RF pulse train and the second RF pulse train have the same average saturation frequency $\overline{\omega_1^2}$. In some examples, the ASEF signal shows that the ASEF is a low-pass filter that filters fast chemical exchange processes including a chemical exchange rate $k_{ex}$ satisfying $DC_l \cdot k_{ex}^2 >> \overline{\omega_1^2}$ as follows:

$$ASEF \propto \left(\frac{\overline{\omega_1^2}}{k_{ex}^2}\right)^2 \approx 0$$

where $\overline{\omega_1^2}$ is the average saturation frequency. In some examples, the ASEF improves specificity of slow exchange processes and intermediate exchange processes of the chemical exchange processes by suppressing the fast exchange processes with a minimal loss of sensitivity.

Figure 3B:
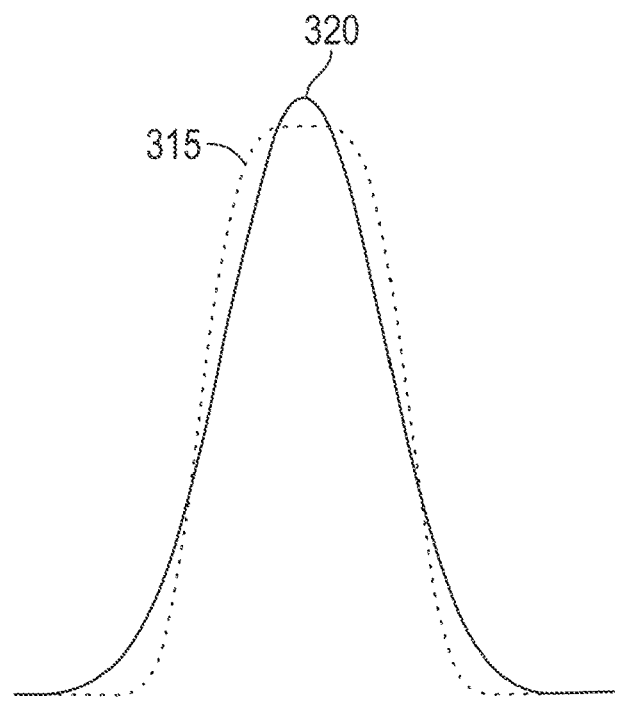
FIG. 3B illustrates Gaussian with a kurtosis of 4 used for pulse train according to one particular, non-limiting exemplary embodiment of the disclosed concept.

FIG. 3A illustrates pulse diagrams used for the saturation preparation using ASEF according to one particular, non-limiting exemplary embodiment of the disclosed concept. A continuous wave (CW) or a high duty cycle ($DC_h$) 305, where CW is not available (e.g., due to the clinical scanner not having a CW capability, etc.) and a low duty cycle ($DC_l$) 310 are used for ASEF of the CEST signal. ASEF compares irradiation schemes with the same $B_{1,avg}$ but a highly different DC. A binomial pair pulse was used for the low DC irradiation to reduce the effect of $B_1$-inhomogeneity and minimize rotation transfer. FIG. 3B illustrates Gaussian 315 with a kurtosis of 4 used for pulse train so that the power distribution is more uniform than in a regular Gaussian 320 which has a kurtosis of 2.

Figure 4D:
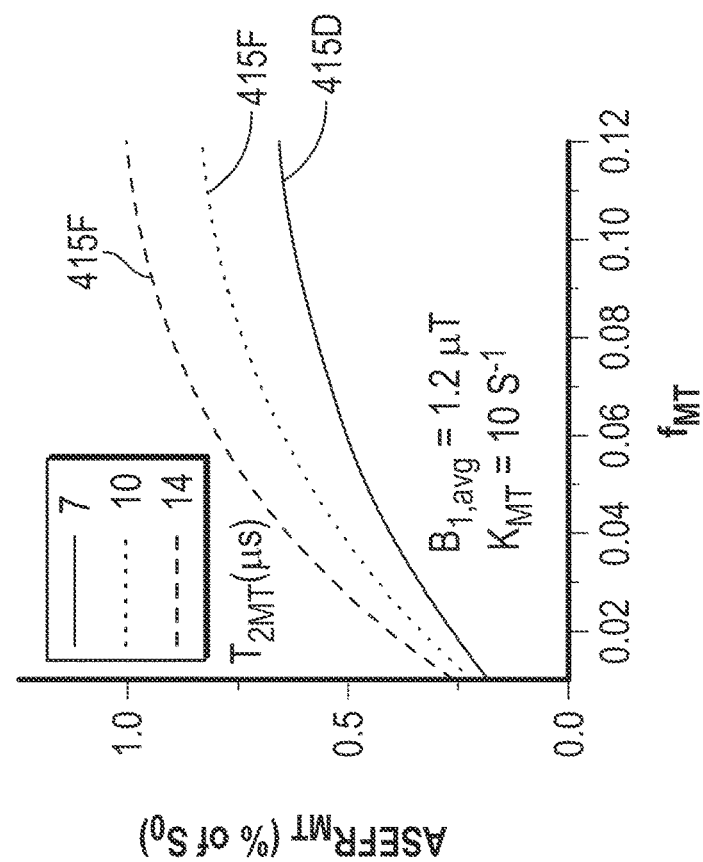
FIGS. 4C-D illustrate example baseline ASEFR (ASEFR$_{MT}$) signals as a function of $f_{MT}$ according to one particular, non-limiting exemplary embodiment of the disclosed concept.
Figure 4C:
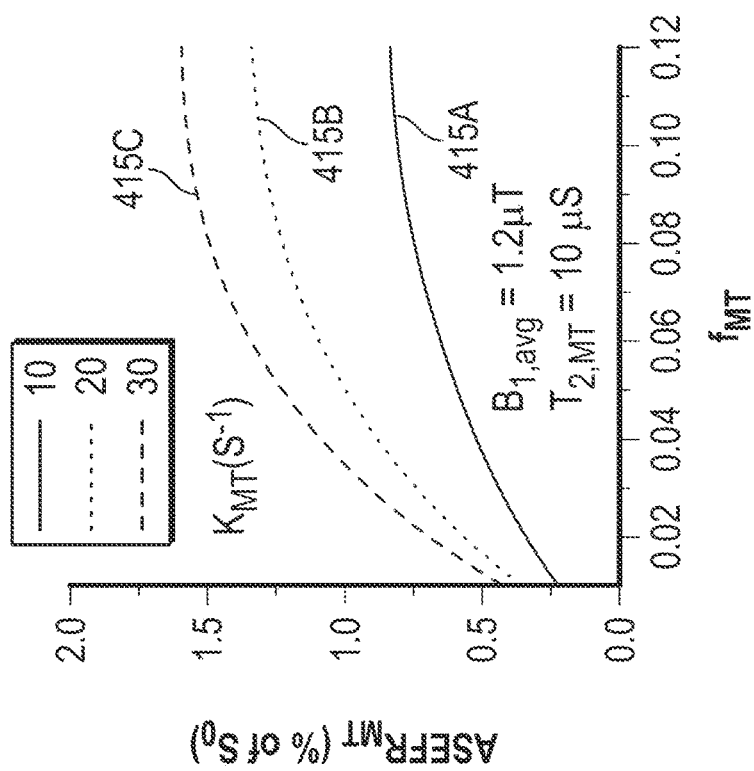

FIGS. 4A-B illustrate simulated baseline magnetization transfer (MT) signals as a function of pulse period $t_p$ with varied duty cycles and average irradiation power $B_{1,avg}$ according to one particular, non-limiting exemplary embodiment of the disclosed concept. FIGS. 4C-D illustrate example baseline ASEFR ($ASEFR_{MT}$) signals as a function of $f_{MT}$ according to one particular, non-limiting exemplary embodiment of the disclosed concept. FIG. 4A shows that the baseline MT signal is dependent on both $t_p$ and the duty cycle, indicating a mismatch in the MT signal for different DC saturation 410A, 410B, 410C, 410D. The MT signal increases with $t_p$ and is larger at lower DC (e.g., 410A, 410B, 410C). FIG. 4B shows that the mismatch of MT signals between CW 405 ($B_{1,avg}$=0.8 µT), 405' ($B_{1,avg}$=1.2 µT), 405" ($B_{1,avg}$=1.6 µT) and $DC_l$ 410 (($B_{1,avg}$=0.8 µT), 410' ($B_{1,avg}$=1.2 µT), 410" ($B_{1,avg}$=1.6 µT), indicating that saturation is power-dependent and increases with $B_{1,avg}$. Thus, a short $t_p$, a larger $DC_l$, and more importantly, a lower $B_{1,avg}$ are preferred to minimize the MT mismatch. FIG. 4C shows $ASEFR_{MT}$ 415A with $k_{MT}$=10 $s^{-1}$, $ASEFR_{MT}$ 415B with $k_{MT}$=20 $s^{-1}$, and $ASEFR_{MT}$ 415C with $k_{MT}$=30 $s^{-1}$, where $B_{1,avg}$=1.2 µT and $T_{2,MT}$=10 µs. FIG. 4D shows $ASEFR_{MT}$ 415D with $T_{2,MT}$=7 µs, $ASEFR_{MT}$ 415E with $T_{2,MT}$=10 µs, and $ASEFR_{MT}$ with $T_{2,MT}$=14 µs where $B_{1,avg}$=1.2 µT and $k_{MT}$=10 $s^{-1}$. The $ASEFR_{MT}$ signals in FIGS. 4C-D indicate that $ASEFR_{MT}$ signal is also dependent on the properties of MT and increases with both the MT rate $k_{MT}$ and $T_{2,MT}$.

Figure 5B:
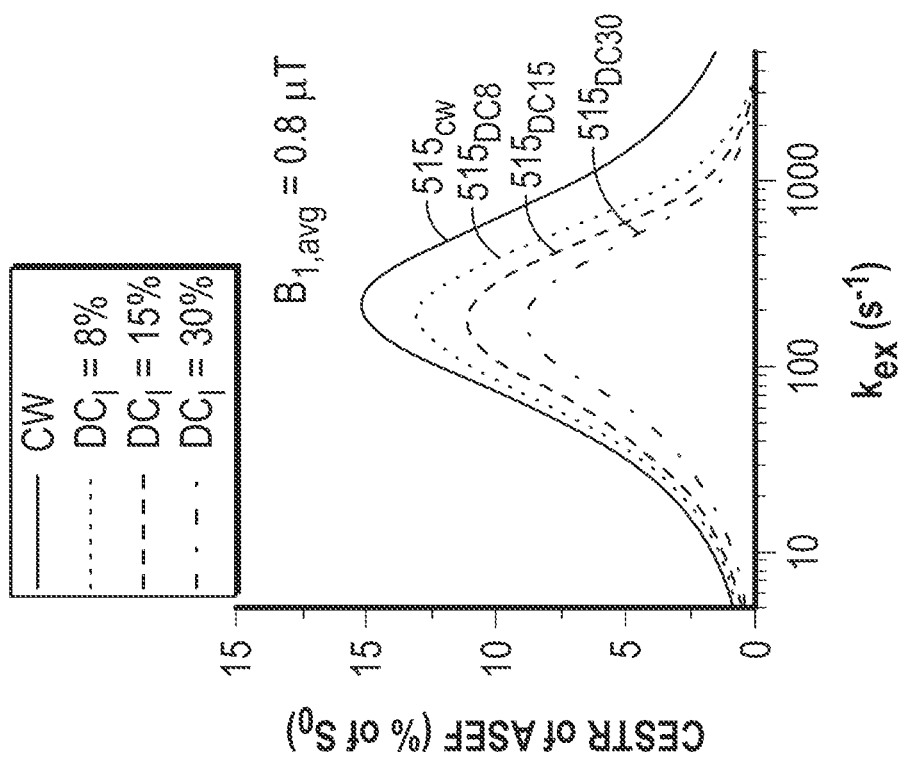
FIGS. 5A-D illustrate chemical exchange (CE) contrasts as a function of chemical exchange rate ($k_{ex}$) per second ($s^{-1}$) simulated for CW and pulsed train saturation according to one particular, non-limiting exemplary embodiment of the disclosed concept.
Figure 5A:
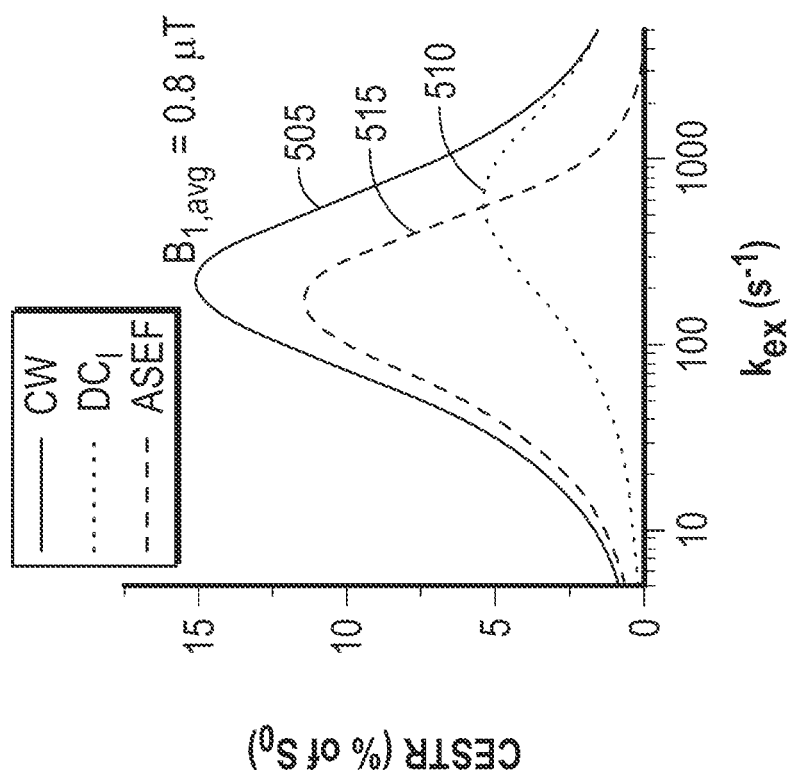
Figure 5D:
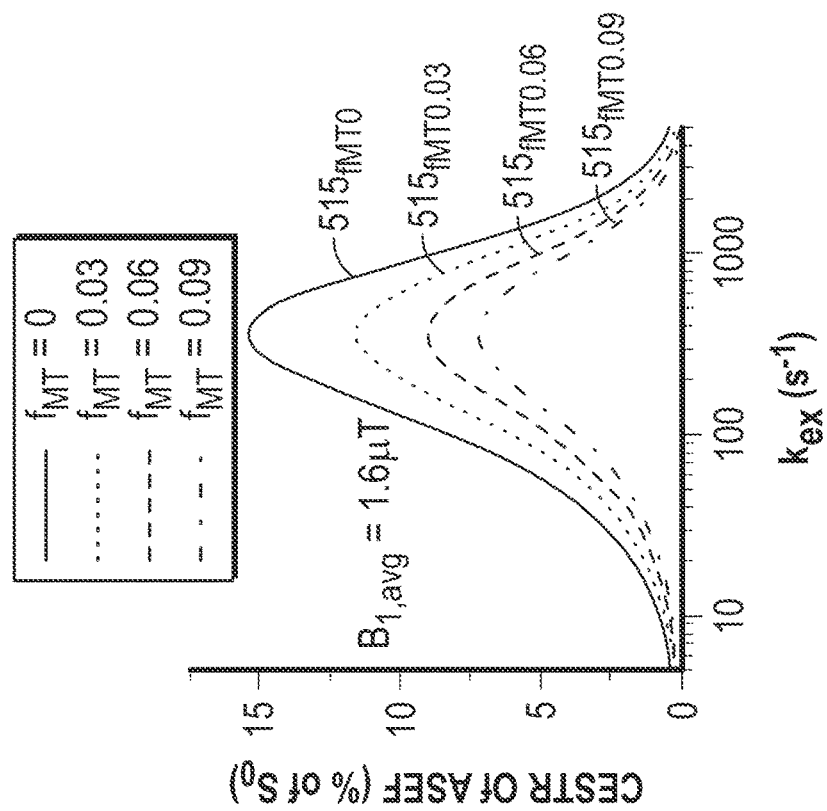
Figure 5C:
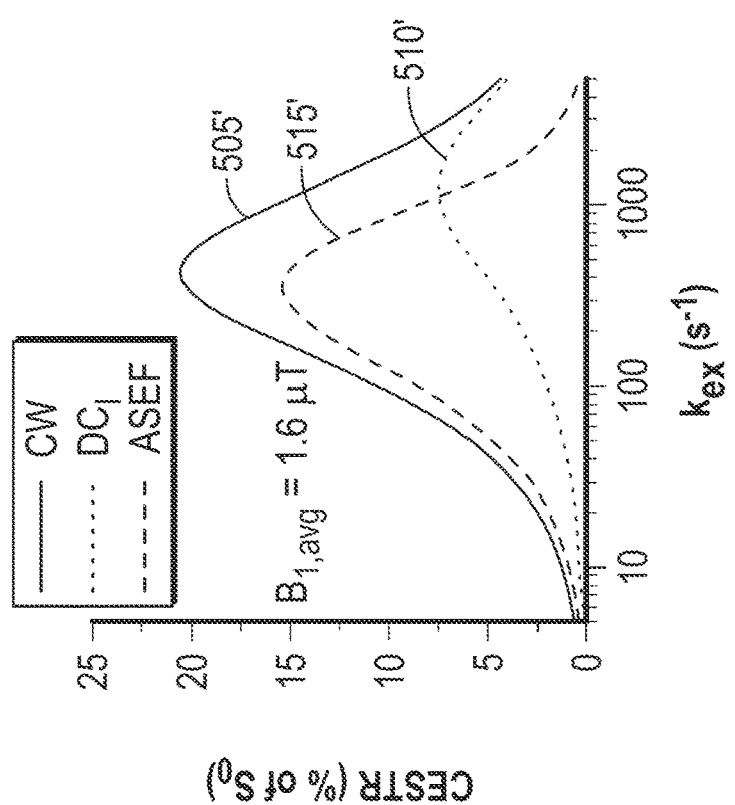

FIGS. 5A-D illustrate chemical exchange (CE) contrasts as a function of chemical exchange rate ($k_{ex}$) per second ($s^{-1}$) simulated for CW and pulsed train saturation according to one particular, non-limiting exemplary embodiment of the disclosed concept. FIGS. 5A-B illustrate CE contrasts of CEST signals for $B_{1,ave}$ is 0.8 µT, and FIGS. 5C-D illustrate CE contrasts of CEST signals for $B_{1,ave}$ is 1.6 µT. FIG. 5A shows the CEST contrast from CW (solid graph) 505, a low DC pulse train ($DC_l$, dotted) 510, and ASEF (dashed) 515. The CEST contrast of the pulse train is like that of CW at fast exchange rates (e.g., >2000 $s^{-1}$), but is much smaller at slower exchange rates. As a result, the sensitivity of ASEF signal is only slightly lower than CW 305 for slow exchange rates but is suppressed at $k_{ex}$>2000 $s^{-1}$, which is in good agreement with Eqs. [10] and [11]. The CW 505 and $DC_l$ 510 are similar at high exchange rates but show a large difference at slow exchange rates. The difference between the CEST contrast from CW 505 and $DC_l$ 510, i.e., the ASEF signal 515, peaks at $k_{ex}$~180 $s^{-1}$, slower than the peak of CW contrast at 267 $s^{-1}$, and maintains good sensitivity at slow exchange rate but diminishes at fast exchange rates. FIG. 5B shows simulated CE contrasts of ASEF at CW 515$_{cw}$ and $DC_l$ at 8% 510$_{DC8}$, 15% 510$_{DC15}$ and 30% 515$_{DC30}$. When the DC of the pulse train increases, the magnitude of ASEF signal decreases while the peak remains at the same exchange rate. FIG. 5C shows that at a higher average saturation power, both the exchange rate filtering regime and the peaks of both CW 505 and ASEF 515 contrast shift to higher exchange rate. With a higher $B_{1,avg}$=1.6 µT, the ASEF signal peak shifts to $k_{ex}$~360 $s^{-1}$, about twice that of peak position for the 0.8 µT, and CE contrast is suppressed for $k_{ex}$>4000 $s^{-1}$. FIG. 5D shows that the ASEF signals decrease with increasing concentration of the MT pool ($f_{MT}$ at zero 515$_{fMT0}$, 0.03 515$_{fMT0.03}$ 0.06 515$_{fMT0.06}$, 0.09 515$_{fMT0.09}$). While the CEST signal sensitivity reduces, the exchange rate filtering stays the same. In examining the signal properties of ASEF, environmental and experimental parameters were varied. It has been shown that ASEF signal is nearly proportional to $T_1$ of water, but only slightly affected by both the $T_2$ of water and the chemical shift due to variation in the direct water saturation effect is slightly affected by the $T_2$ of the labile proton. With a higher $B_{1,avg}$=1.6 µT, the ASEF signal peak shifts to $k_{ex}$ at approximately 360 $s^{-1}$, about twice that of the peak position for 0.8 µT, and the CE contrast is suppressed for $k_{ex}$>4000 $s^{-1}$. ASEF signal magnitude is only slightly affected by $t_p$ value but decreases significantly with increasing concentration of the MT pool. As such, the exchange rate filtering regime is only determined by $B_{1,avg}$ and would not be affected by a small fudge factor ff less than 15%.

Figure 6B:
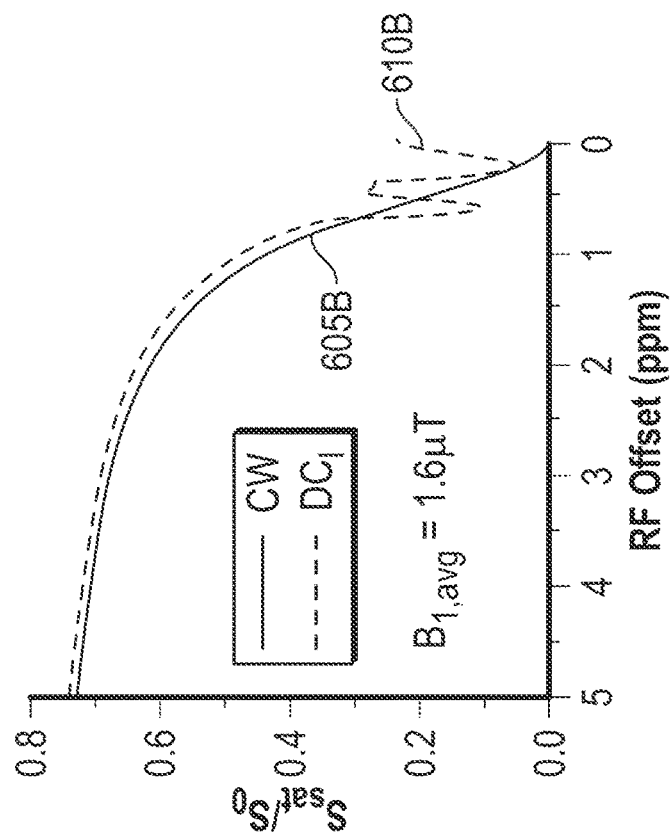
FIGS. 6A-E illustrate simulated baseline Z-spectra of continuous wave (CW) and low duty cycle (DC$_l$) pulse-pair demonstrating fudge factor corrections for improving ASEF accuracy according to one particular, non-limiting exemplary embodiment of the disclosed concept.
Figure 6A:
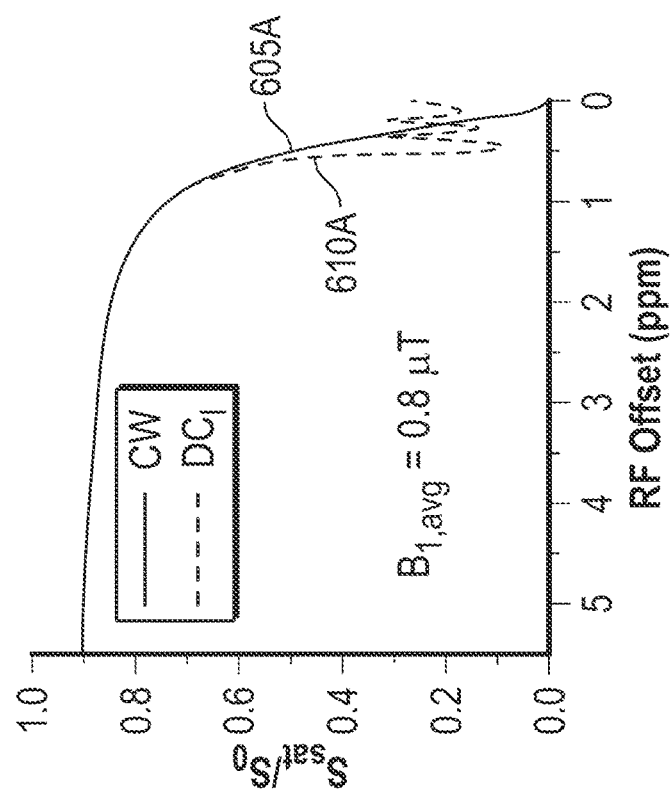
Figure 6D:
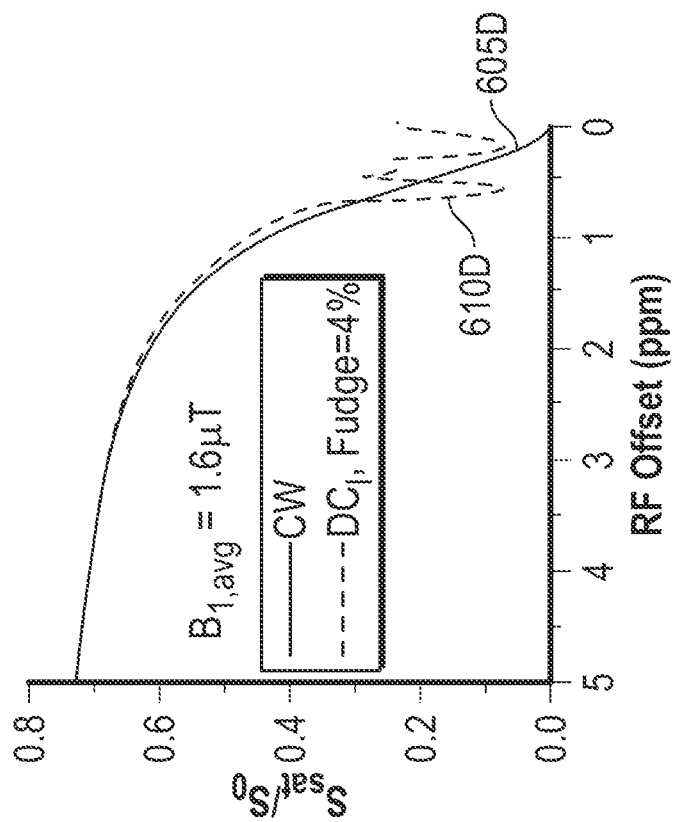
Figure 6C:
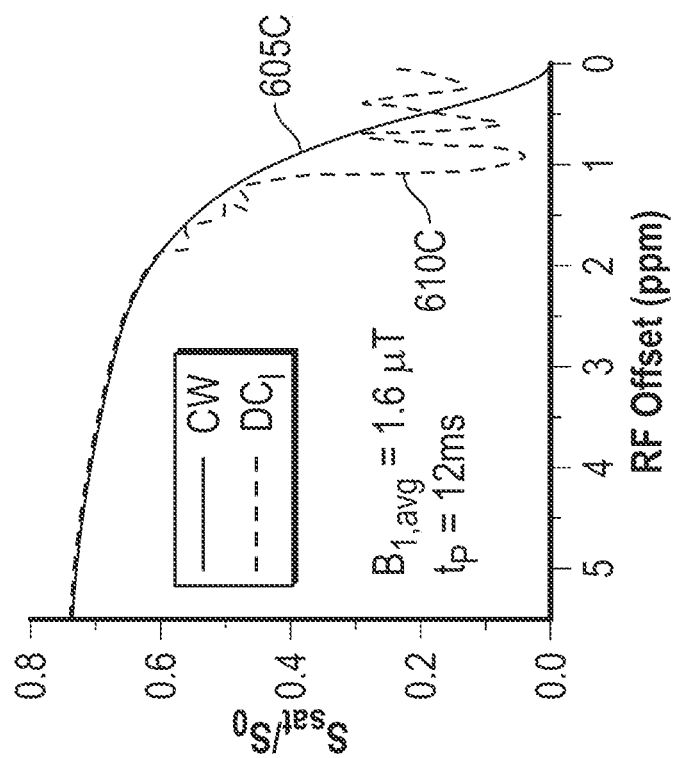
Figure 6E:
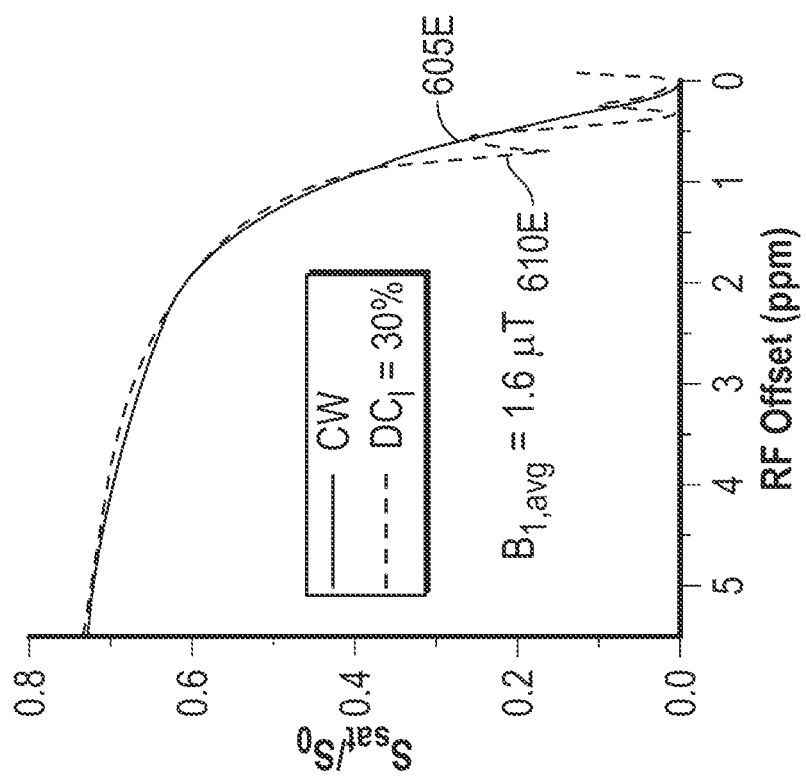

FIGS. 6A-E illustrate simulated baseline Z-spectra of continuous wave (CW) and low duty cycle ($DC_l$) pulse-pair demonstrating fudge factor corrections for improving ASEF accuracy according to one particular, non-limiting exemplary embodiment of the disclosed concept. The Z-spectra shows that a ratio of sensitivity of saturated CEST signal $S_{sat}$ and steady state CEST signal $S_0$ ($S_{sat}/S_0$) varies in accordance with radio frequency offset parts per million (ppm). In the presence of a semisolid macromolecule pool, the baseline MT signal is highly dependent on the pulse parameters. FIG. 6A shows that for $B_{1,avg}$=0.8 µT, the Z-spectra match well at offsets greater than 1 ppm, and the difference is only 0.1% to 0.25%. At smaller offsets, the Z-spectrum of the pulse pair (CW 605A and $DC_l$ 610A) shows a clear difference because of the side band associated with the low DC pulse train. As such, the mismatch of the MT signal between CW and pulse train saturation is larger for longer $t_p$ and lower DC. FIG. 6B shows for $B_{1,avg}$=1.6 µT, there is a small difference of 1.2% to 2% between the Z-spectra of CW 605B and pulse train 610B saturation in the offset range of 5 to 2 ppm. The mismatch of the MT signal is also highly power-dependent and increases at higher $B_{1,avg}$. That is, for higher power of $B_{1,avg}$=1.6 µT, the mismatch increases to 1.2 to 2% in the offset range of 5 to 2 ppm. These results shown in FIGS. 6A-B agree well with the expectation of Eqs. [15] and [16]. Thus, a short $t_p$, larger DC for the low DC pulse train, and more importantly, a lower $B_{1,avg}$ is preferred to minimize the MT mismatch. FIG. 6C shows that the difference in FIG. 6B can be reduced to 0.4-0.7% (the mismatch between the Z-spectra of CW 605C and $DC_l$ 610C) with a shorter pulse duration $t_p$ of 12 ms. However, there is a larger direct saturation signal for the pulse train due to the broader bandwidth associated with short $t_p$. That is, the difference in direct saturation is more significant with a shorter $t_p$ and extends to approximately 2 ppm because a shorter $t_p$ has a broader bandwidth. FIG. 6D shows that, alternatively, the mismatch (mismatch between the Z-spectra of CW 605D and $DC_l$ 610D) may be reduced to less than 0.4% with a small fudge factor of 4.1% for the pulse train 310. FIG. 6E shows the Z-spectra difference between Z-spectra of CW 605E and DC=30% 610E can be suppressed to less than 0.6% with a higher DC (e.g., DC=30%).

Figure 7A:
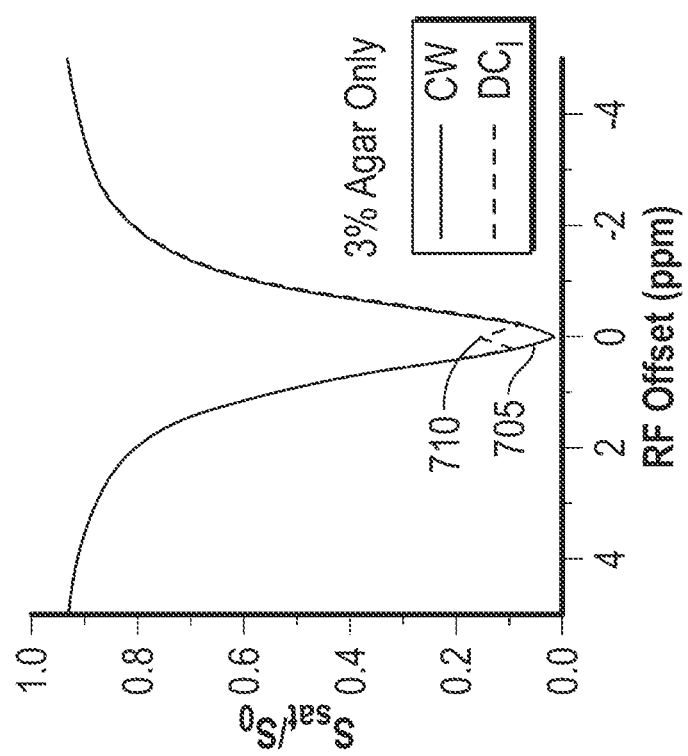
Figure 7D:
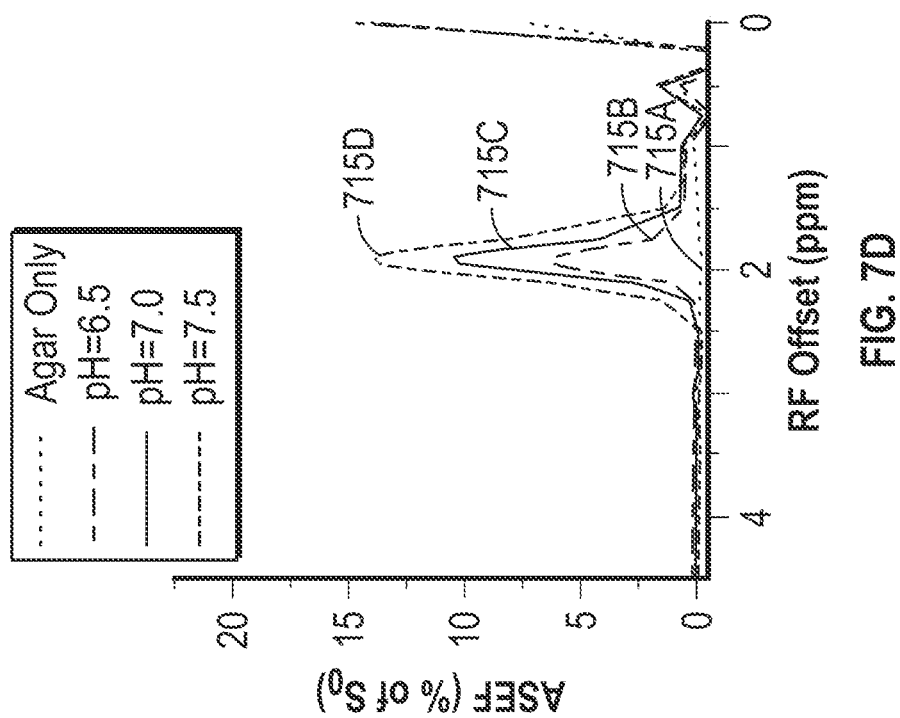

FIGS. 7A-D illustrate CW and ASEF-CEST results of creatine in agar according to one particular, non-limiting exemplary embodiment of the disclosed concept. FIGS. 7A-D show that ASEF is capable of providing facile measurements of CE comparable to that of methods in the prior art. FIG. 7A shows Z-spectra measured with $B_{1,avg}$=1 µT by CW 705 and $DC_l$ pulse train 710 for 3% agar nearly overlaps for all frequencies except those very close to water, indicating very good match of the MT effect. A fudge factor of 6.39% was applied to the $DC_l$ pulse train. FIG. 7B shows that with addition of 50 mM creatine, the CEST signal is shown as a dip at 1.9 ppm which is much larger for saturation by CW 705' than $DC_l$ pulse train 710'. The CEST contrast of these phantoms can be evaluated by $MTR_{asym}$ using the conventional asymmetry analysis. FIG. 7C shows that the CEST effect of these agar phantoms (agar only phantom 725, 6.5 pH phantom 730A, 7.0 pH phantom 730B, and 7.5 pH phantom 730C) can be measured by the $MTR_{asym}$ because the Z-spectra are nearly symmetric about the water, except a small residue hydroxyl signal at approximately 1 ppm as shown in the agar only phantom (dotted) 725. In FIG. 7D, the ASEF spectra (Agar only phantom spectra 715A, 6.5 pH phantom spectra 715B, 7.0 pH phantom spectra 715C, 7.5 pH phantom spectra 715D) show a smaller signal magnitude than that of $MTR_{asym}$, but no asymmetry analysis is needed, and can be measured at the same frequency offset of 1.9 ppm.

Figure 8A:
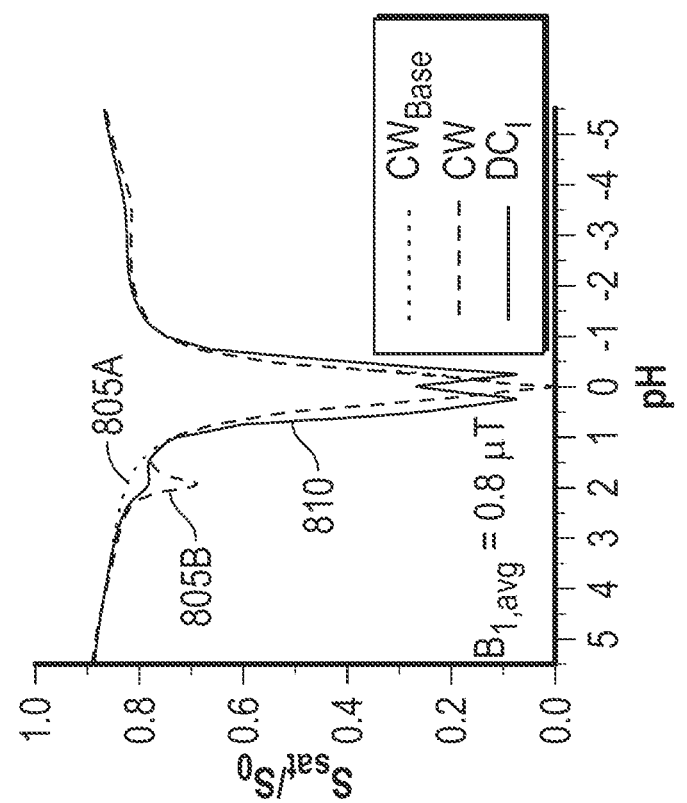
FIGS. 8A-H show CW and ASEF-CEST results of creatine in heat-denatured BSA according to one particular, non-limiting exemplary embodiment of the disclosed concept.
Figure 8C:
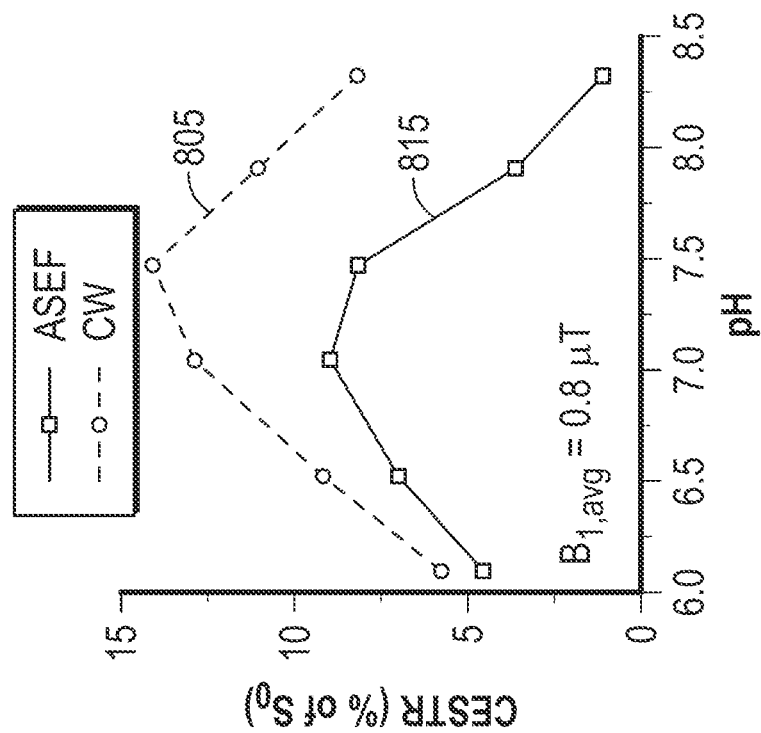
Figure 8B:
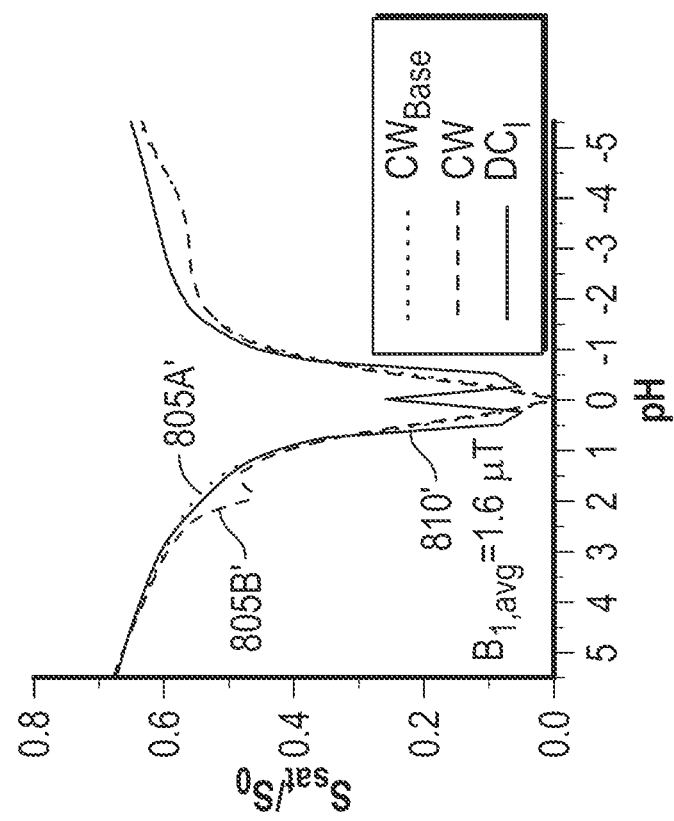
Figure 8D:
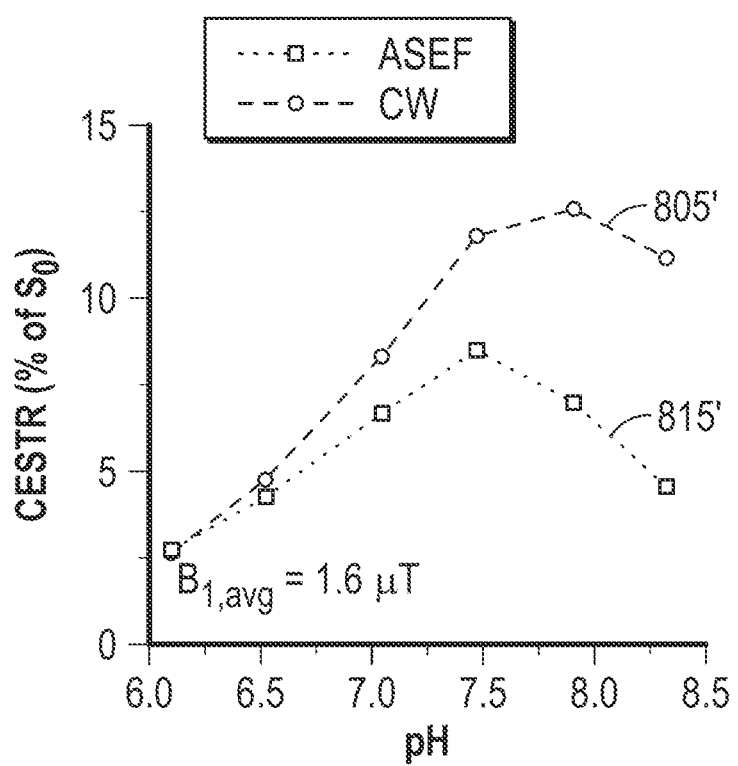
Figure 8E:
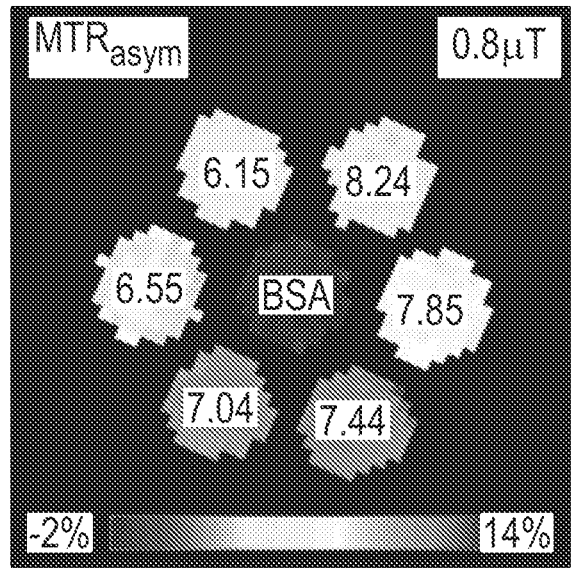
Figure 8F:
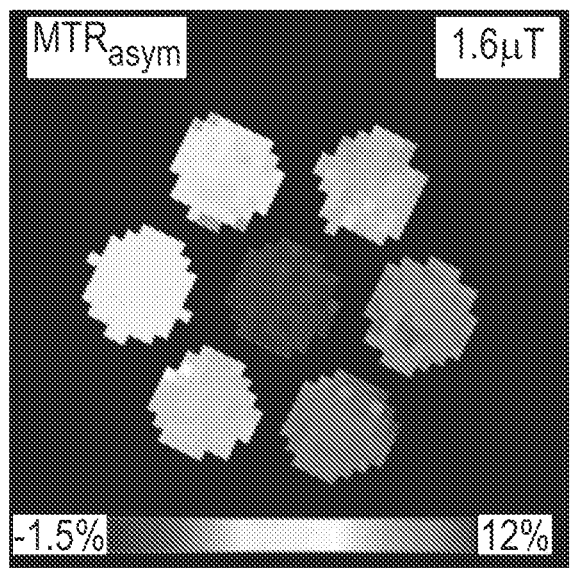
Figure 8G:
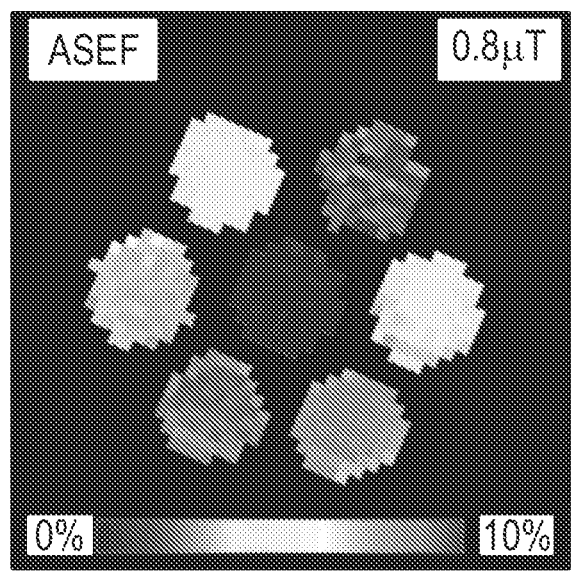
Figure 8H:
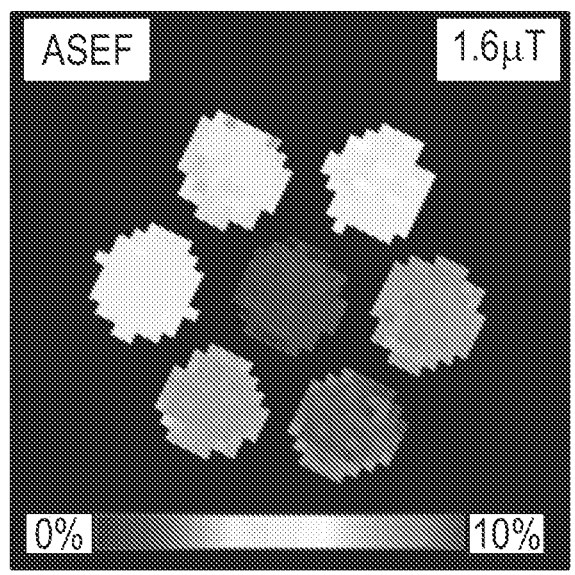

FIGS. 8A-H show CW and ASEF-CEST results of creatine in heat-denatured BSA according to one particular, non-limiting exemplary embodiment of the disclosed concept. FIGS. 8A-H demonstrate that ASEF is capable of filtering out CEST signals with high exchange rates (or pH) depending on the average power using CW and ASEF-CEST results of creatine in heat-denatured BSA, and minimizes the MT effect. Based on a pilot study, a fudge factor of 5.85% was applied to the $DC_l$ pulse train for the 1.6 µT spectra and 2.39% for the 0.8 µT spectra, respectively. With both 0.8 µT (FIG. 8A) and 1.6 µT (FIG. 8B), the Z-spectra of pH=7.04 phantom show a large difference in the 1.9 ppm dip for CW 805A' than DC pulse train 810' saturations, similar to FIGS. 7A-D. The match of Z-spectra between CW saturation ($CW_{base}$ 805A and CW 805B) and $DC_l$ 810 is good at offsets greater than 3.5 ppm for both $B_{1,\,avg}$=0.8 µT with a limited fudge factor of 2.39% as shown in FIG. 8A, and $B_{1,\,avg}$=1.6 µT with a fudge factor of 5.85% as shown CW 805A', CW 805B', $DC_l$ 810' in FIG. 8B. This shows that the MT effect can be effectively minimized by the ASEF. On the other hand, the BSA has an asymmetric MT or residual NOE effects, as shown by a broad dip centered at ~−3.5 ppm, which is more significant for 1.6 µT. FIGS. 8C and 8D compare the pH-dependent sensitivity of CW with that of ASEF-CEST, where the exchange rates of the pH phantoms were obtained using $k_{ex}=10^{(pH-4.8)}$. FIG. 8C illustrates that for $B_{1,\,avg}$=0.8 µT, the CEST contrast shows a peak at pH=7.44 for CW 805 and 7.04 for ASEF 815. FIG. 8D illustrates that for $B_{1,\,avg}$=1.6 µT with a fudge factor of 5.85%, the CEST contrast shows a peak has been shifted from that in FIG. 8C to pH=7.85 for CW 805' and 7.44 for ASEF 815'. The ASEF signal is only slightly lower than that of CW at lower pH values, but the difference is much larger at a higher pH due to the filtering of fast exchange rates. The CEST contrast of CW saturation is calculated by subtracting the signals of phantoms with creatine from that of BSA only. The peak of CEST contrast is reached at $k_{ex}$≈300 s$^{-1}$ for CW and $k_{ex}$≈400 s$^{-1}$ for ASEF signal with $B_{1,avg}$=1.6 µT. Without using a reference signal from a separate phantom, the CEST sensitivity would necessarily be measured with $MTR_{asym}$. FIGS. 8E-F show that for CW saturation, the CEST contrast assessed by $MTR_{asym}$ has a negative baseline due to the intrinsic asymmetry of the MT contrast and the residue the nuclear Overhauser enhanced (NOE) signal, as seen in the center sample with BSA only. In contrast, the ASEF signal is minimal for the phantom of BSA only and is small for the phantom of pH=8.24 as shown in FIGS. 8G-H. FIGS. 8G-H show that with ASEF, the CEST contrast is smaller than that of the CW, but the negative baseline signal is eliminated, as shown in the BSA only sample. This indicates that signals from both the MT contrast and from fast chemical exchange can be effectively suppressed.

To sum, the present disclosure as discussed above shows that ASEF can suppress fast exchanging processes, with only a small loss of chemical exchange contrast for slow to intermediate exchange rates if the difference of DC is large. In the RF offset range of 2 to 5 ppm with an averaged saturation powers of 0.8 and 1.6 µT, there is a mismatch of ~0.1% and 2% in the MT signal between saturations by CW and a pulse train with DC=15% and a total pulse duration for the pair of pulses of 24 ms, respectively. This mismatch can be minimized by careful selection of the saturation power, the pulse duration, and DC differences or by applying a small fudge factor between the two irradiation powers. Phantom studies of creatine confirmed that ASEF can minimize the MT effect and reduce the sensitivity to fast exchange processes.

Figure 9:
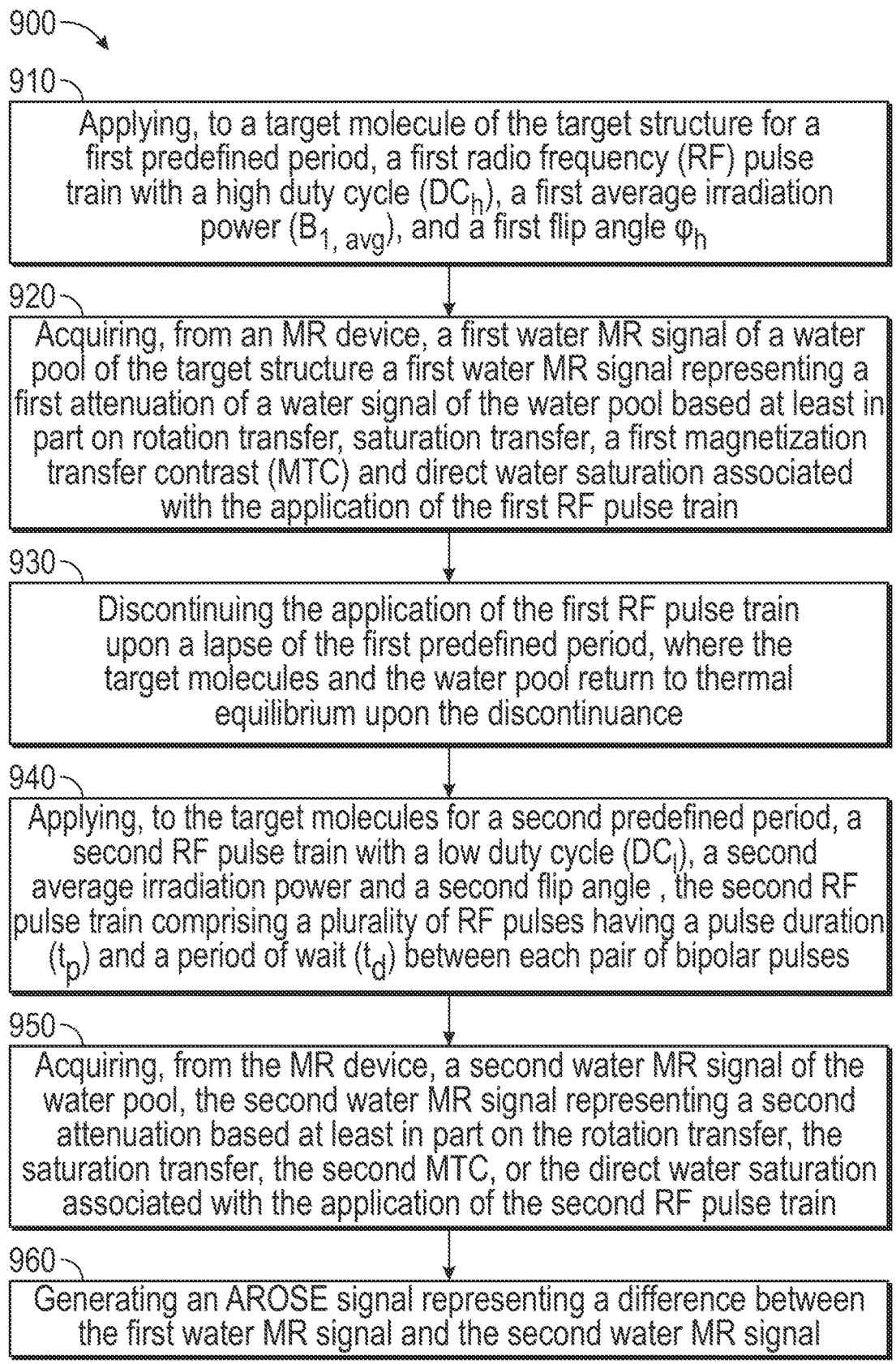
FIG. 9 is a flow chart of a method 900 of improving CEST signal using an adjustment of rotation and saturation effects (AROSE) system couplable to a magnetic resolution (MR) device according to one particular, non-limiting exemplary embodiment of the disclosed concept.

FIG. 9 is a flow chart of a method 900 of improving CEST signal using an adjustment of rotation and saturation effects (AROSE) system couplable to a magnetic resolution (MR) device according to one particular, non-limiting exemplary embodiment of the disclosed concept. The method 900 may be performed by the AROSE system or any component of a device 100 as described with reference to FIG. 1A.

At 910, the AROSE system applies to a target molecule of the target structure for a first predefined period, a first radio frequency (RF) pulse train with a high duty cycle ($DC_h$), a first average irradiation power ($B_{1,\,avg}$), and a first flip angle $\varphi_h$. A high duty cycle includes a continuous wave or the highest duty cycle that the MR device is capable of generating, and a low duty cycle is a duty cycle lower than the high duty cycle, e.g., without limitation 10%, 15%, 20%, 40% DC. The target structure includes the target molecules including exchangeable protons and a water pool including free water protons and semi-solid macromolecules. The application of the first RF pulse train changes a magnetization of the target molecules by at least one of rotation effect or saturation effect. The rotation effect includes rotating a spin system of the target molecules based on the first flip angle $\varphi_h$, transferring the rotation to the water pool via chemical exchange processes, and affecting spin system of the water pool based on the rotation transfer. The saturation effect includes saturation of the target molecules in which exchangeable protons have net-zero magnetization upon the application of the first RF pulse train, the saturation is transferred to the water pool via the chemical exchange processes including exchanging the net-zero magnetization exchangeable protons with a set of the free water protons, the application of the first RF pulse train also causes contamination including direct water saturation and a first magnetization transfer contrast (MTC) between the semi-solid molecules and another set of the free water protons. An MR signal of the water pool exhibits a first attenuation based at least in part on the rotation transfer and the saturation transfer, the first MTC and the direct water saturation. In some examples, the first RF pulse train is a continuous wave or the highest duty cycle which the MRI device is capable of generating. In some examples, peak to average power ratio (Crest factor) of the first RF pulse train is minimized to approach a Crest factor of a continuous wave, and the Crest factor of the first RF pulse train is lower than a Crest factor achieved by a series of simple 90 degrees pulses. In some examples, the first RF pulse train is the continuous wave providing a full saturation transfer effect and the highest sensitivity of the CEST imaging of the target molecules.

At 920, the AROSE system acquires, from an MR device, a first water MR signal of a water pool of the target structure a first water MR signal representing a first attenuation of a water signal of the water pool based at least in part on rotation transfer, saturation transfer, a first magnetization transfer contrast (MTC) and direct water saturation associated with the application of the first RF pulse train.

At 930, the AROSE system discontinues the application of the first RF pulse train upon a lapse of the first predefined period, where the target molecules and the water pool return to thermal equilibrium upon the discontinuance.

At 940, the AROSE system applies to the target molecules for a second predefined period, a second RF pulse train with a low duty cycle ($DC_l$), a second average irradiation power and a second flip angle, the second RF pulse train including a plurality of RF pulses having a pulse duration ($t_p$) and a period of wait ($t_d$) between each pair of bipolar pulses. The second RF pulse train changes the magnetization of the target molecules by the rotation effect and the saturation effect based upon the application of the second RF pulse train. The rotation effect includes rotating the spin system of some the target molecules, transferring the rotation to the water pool, and affecting the spin system of the water pool based on the rotation transfer. The saturation effect includes the saturation of the target molecules based on exchangeable protons having a net-zero magnetization upon the application of the second RF pulse train, the saturation is transferred to the water pool via chemical exchange processes exchanging the net-zero magnetized exchangeable protons with the set of the free water protons, the second RF pulse train also causes contamination including the direct water saturation and a second magnetization transfer contrast (MTC) between the semi-solid molecules and another set of the free water protons. The MR signal of the water pool exhibits a second attenuation based at least in part on the rotation transfer, the saturation transfer, the second MTC and the direct water saturation. In some examples, a number of RF pulses, the period of wait $t_d$ between the RF pulses, and a peak power of the RF pulses of the second RF pulse train are determined such that the second average irradiation power of the second RF pulse train is the same as the first average irradiation power of the first RF pulse train. In some examples, the AROSE system minimizes a mismatch between the first MTC and the second MTC based at least in part on having the same average irradiation power for the second RF pulse train as the first average irradiation power. In some examples, the AROSE system minimizes a mismatch between the first MTC and the second MTC based at least in part on selecting a short $t_P$ for the second RF pulse train, a small duty cycle difference between the high duty cycle $DC_h$ and the low duty cycle $DC_l$, and a low average irradiation power $B_{1, avg}$. In some examples, a fudge factor is added to the second RF pulse train to minimize a mismatch between the first MTC and the second MTC, the fudge factor including a percentage increase or decrease in the second average irradiation power $B_{1, avg}$. In some examples, a number of RF pulses, the period of wait $t_d$ between the RF pulses, and a peak power of the RF pulses of the second RF pulse train are determined such that a mismatch between the first MTC and the second MTC is minimized. In some examples, the specific frequency is the resonant frequency of the nuclei of the target molecules. In some examples, the target molecules are endogenous or exogenous molecules. In some examples, the endogenous or exogenous molecules are mobile molecules. In some examples, at least one of the first RF pulse train or the second RF pulse train includes RF pulses exhibiting Gaussian shape. In some examples, at least one of the first RF pulse train or the second RF pulse train includes RF pulses exhibiting Lorentzian shape. In some examples, the first RF pulse train includes Hanning windowed continuous wave pulses.

At 950, the AROSE system acquires, from the MR device, a second water MR signal of the water pool, the second water MR signal representing a second attenuation based at least in part on the rotation transfer, the saturation transfer, the second MTC, or the direct water saturation associated with the application of the second RF pulse train.

At 960, the AROSE system generates an AROSE signal representing a difference between the first water MR signal and the second water MR signal. In some examples, the AROSE signal shows the difference as follows: AROSE($\varphi_l$, $\varphi_h$)=S($DC_l$, $\varphi_l$)−S($DC_h$, $\varphi_h$) where S is a signal. In examples where the first RF pulse train is a continuous wave which only has saturation transfer effect and thus includes no flip angle, and thus the AROSE signal shows the difference as follows: AROSE$_\varphi$=S($DC_l$, $\varphi$)−S(CW) where $\varphi$ is the flip angle for the RF pulses of the second RF pulse train. In some examples, $\varphi$ is adjusted to increase specificity of the CEST imaging based at least in part on the chemical exchange processes associated with the target molecule. In some examples, the AROSE system is an exchange rate filter for both slow exchange rate and a fast exchange rate of the chemical exchange processes where $\varphi$ includes $\pi$ (AROSE$_\pi$). In some examples, the AROSE system filters a fast exchange rate of the chemical exchange process where $\varphi$ includes $2\pi$ (AROSE$_{2\pi}$). In some examples, the AROSE system filters a slow exchange rate of the chemical exchange processes where $\varphi$ includes $1.5\pi$ (AROSE$_{1.5\pi}$) or $3\pi$ (AROSE$_{3\pi}$). In some examples, variation of the low duty cycle affects sensitivity of the AROSE signal but has minimal effect on exchange rate filtering properties of the AROSE system and a higher duty cycle reduces sensitivity of the CEST imaging and reduces the direct water rotation. In some examples, at least one of the first RF pulse train and the second RF pulse train includes frequency-selective excitation RF pulses applied at the Larmor frequency of the nuclei in the target molecules.

In some examples, the method further includes discontinuing the application of the second RF pulse train upon a lapse of the first predefined period and the target molecules and the water pool return to thermal equilibrium upon the discontinuance; applying a third RF pulse train to the target molecules for a third predefined period, a third RF pulse train with a low duty cycle ($DC_l$), a third average irradiation power and a third flip angle $\varphi_{l3}$, the third RF pulse train including a plurality of RF pulses having a pulse duration ($t_P$) and a period of wait ($t_d$) between each pair of bipolar pulses, wherein the third RF pulse train the magnetization of the target molecules by the rotation effect and the saturation effect based upon the application of the third RF pulse train, the rotation and saturation of the target molecules are transferred to the water pool via the chemical exchange processes, the third RF pulse train also causes contamination including the direct water saturation and a second magnetization transfer contrast (MTC) between the semi-solid molecules and another set of the free water protons, and the MR signal of the water pool exhibits a third attenuation based at least in part on the rotation transfer, the saturation transfer, the third MTC and the direct water saturation; and acquiring a third water MR signal of the water pool, the third water MR signal representing the third attenuation. In some examples, the generating the AROSE signal includes generating the AROSE signal representing differences among the first water MR signal, the second water MR signal and the third water signal. In some examples, a number of RF pulses, the period of wait $t_d$ between the RF pulses, and a peak power of the RF pulses of the third RF pulse train are determined such that mismatches among the first MTC, the second MTC and the third MTC are minimized.

Figure 10B:
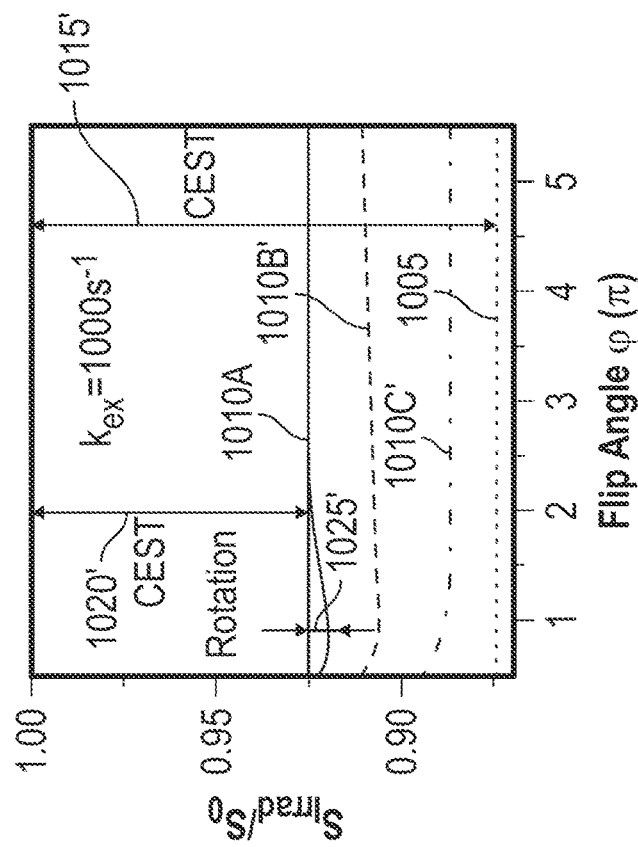
FIGS. 10A-C illustrate comparisons of the saturation transfer and rotation transfer effects for a slow exchange rate of 100 s-1 and an intermediate rate of 1000 s-1 according to one particular, non-limiting exemplary embodiment of the disclosed concept.
Figure 10A:
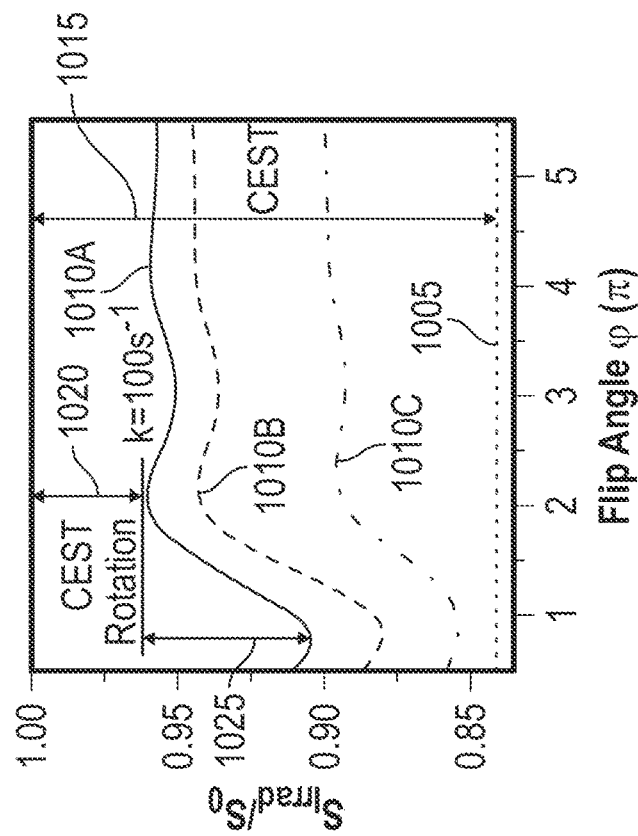
Figure 10C:
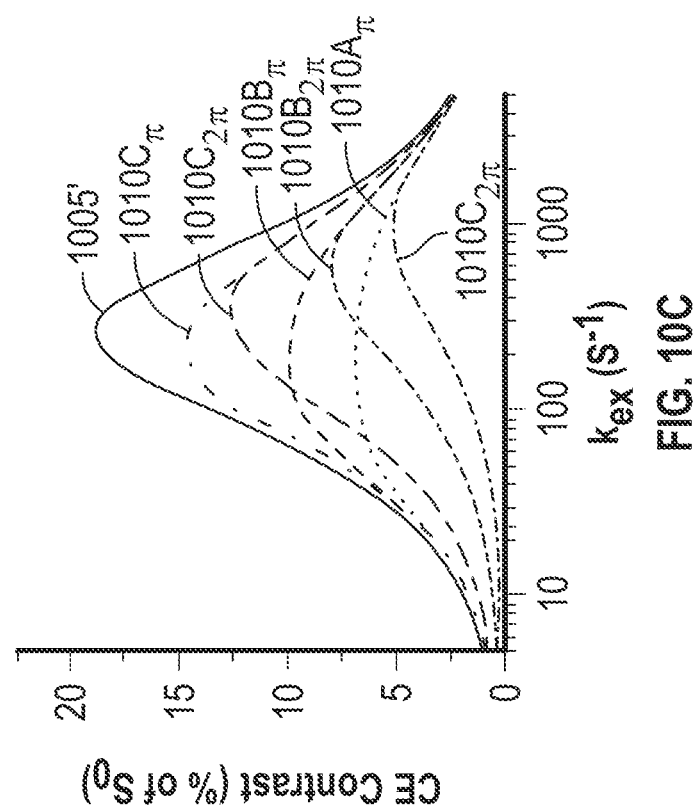

FIGS. 10A-C illustrate comparisons of the saturation transfer and rotation transfer effects for a slow exchange rate of 100 s-1 and an intermediate rate of 1000 s-1 according to one particular, non-limiting exemplary embodiment of the disclosed concept. FIGS. 10A-C show the disparity in the saturation transfer and rotation transfer effects utilized by the current invention for filtering purposes. FIGS. 10A-B assume no MTC effect. In contrast to CW irradiation 1005 which only has the saturation transfer effect 1015, the pulse-train irradiation (DC=10% 1010A, DC=25% 1010B, DC=75% 1010C) has the saturation transfer effect 1020 which is dependent on the duty cycle, and the rotation transfer effect 1025 which is dependent on the flip angle. The rotation transfer effect is significant at 100 s-1 (in FIG. 10A) but diminishes at 1000 s-1 (in FIG. 10B). The contributions from direct water saturation is about 2% of $S_0$ and are neglected in the labelling for simplicity. The direct saturation and rotation effects of water are neglected for simplicity in FIG. 10C. FIG. 10C shows also a comparison of the chemical exchange contrast as a function of $k_{ex}$ for CW 1005' and π pulse trains 1010A$_π$, 1010B$_π$, 1010C$_π$ and 2π pulse trains 1010A$_{2π}$, 1010B$_{2π}$, 1010C$_{2π}$ with varied duty cycles. The π and 2π pulse trains show a similar contrast at fast exchange rates greater than 1000 s-1. For the 2π pulse trains, the contrasts decrease quickly with DC at slow exchange rates ($k_{ex}$<1000 s-1).

For a slow exchange rate of 100 $s^{-1}$ (in FIG. 10A), significant rotation transfer effect can be seen as an oscillation with increased flip angle. Specifically, the saturation transfer effect 1020 or the CEST signal 1010A for DC=10% is demonstrated by the decay of $S_{irrad}/S_0$ signal at approximately 1010$_π$ 2π, whereas the rotation transfer 1025 can be demonstrated by the signal difference between π and 2π. An increase of the DC increases the CEST signal and also affects the rotation signal. For comparison, CW irradiation only shows the full saturation transfer effect 1015. For an intermediate exchange rate of 1000 $s^{-1}$ (in FIG. 10B), the rotation transfer effect becomes very small, therefore, the signal decay for a pulsed train is mainly due to the saturation transfer effect, which again increases with DC. FIG. 10C shows the chemical exchange contrast simulated for CW 1005' and pulsed irradiations with varied DC and flip angles of π and 2π (DC=10% with 2π pulse—1010A$_{2π}$, DC=10% with π pulse—1010A$_π$, DC=25% with 2π pulse—1010B$_{2π}$, DC=25% with π pulse—1010B$_π$, DC=75% with 2π pulse—1010C$_{2π}$, DC=75% with π pulse—1010C$_π$). For the whole $k_{ex}$ range, CW 1005' shows the highest CE contrast, higher DC gives larger CE contrast, and a π pulse train gives larger CE contrast than the 2π pulse train. The difference between π and 2π pulse trains is small at high exchange rates ($k_{ex}$ greater than 1000 $s^{-1}$), and more obvious at slower exchange rates.

Figure 11A:
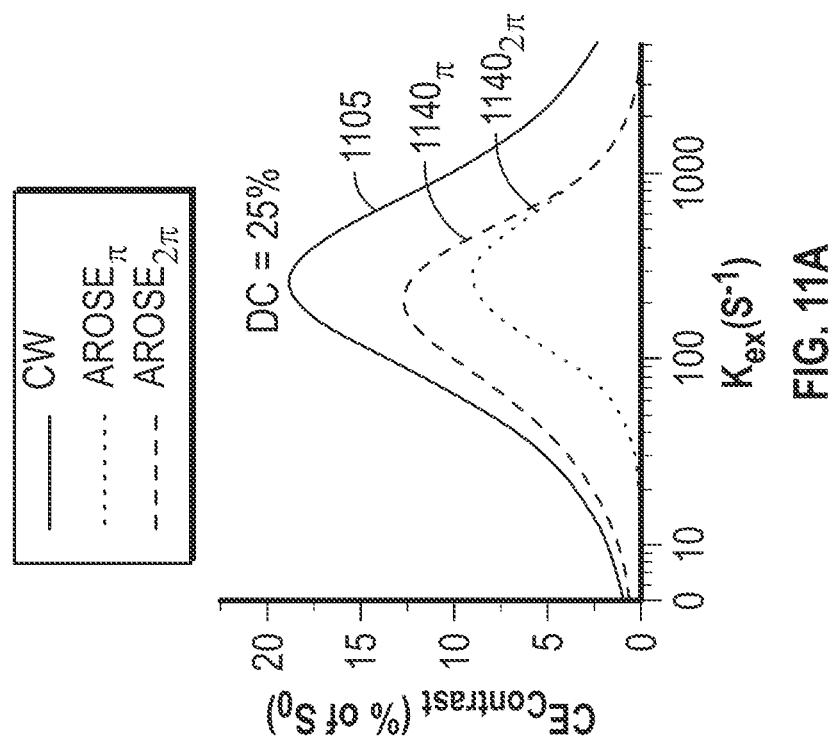
FIGS. 11A-C illustrate the contrasts of CW 1105 and AROSE 1140 according to one particular, non-limiting exemplary embodiment of the disclosed concept.
Figure 11C:
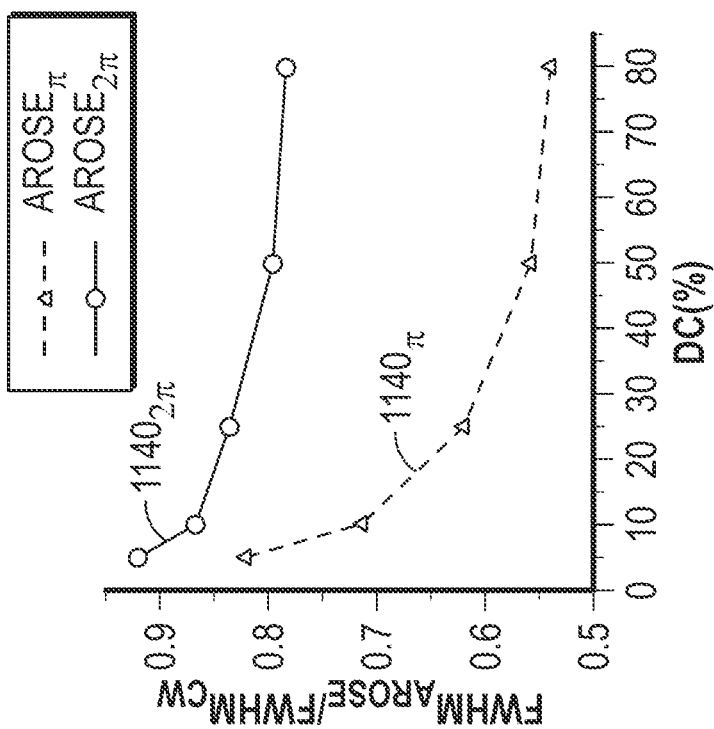
Figure 11B:
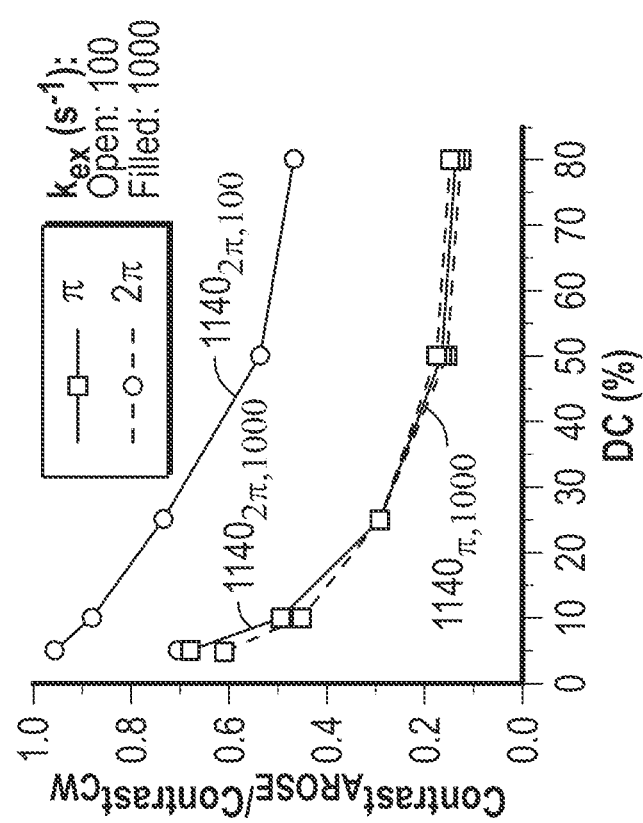

FIGS. 11A-C illustrate the contrasts of CW 1105 and AROSE 1140 according to one particular, non-limiting exemplary embodiment of the disclosed concept. FIGS. 11A-C show examples of the specific advantages in discrimination between exchange rates of the present disclosure. FIG. 11A illustrates that the contrasts of CW 1105, AROSE$_π$, 1140$_π$ and AROSE$_{2π}$ 1140$_{2π}$, with DC=25% show different exchange rate filtering effects. FIG. 11B illustrates that the ratio 1140$_{2π, 100}$, 1140$_{2π, 1000}$, 1140$_{π, 1000}$ of the peak contrasts of AROSE and CW irradiation decreases with increasing DC. FIG. 11C illustrates that the ratio 1140$_{2π}$, 1140$_π$ of the FWHM ($k_{ex}$) of AROSE and CW irradiation, which is an index of exchange rate filtering, also decreases with increasing DC. The AROSE data with DC=25% were obtained from FIG. 10C and FIGS. 11A-C showed different exchange rate filtering characteristics as well as the peak magnitude. In comparison to the CE contrast measured by CW 1105, the AROSE$_{2π}$ signal 1140$_{2π}$ shows filtering on fast exchange rate (e.g., $k_{ex}$>3000 $s^{-1}$). In contrast, AROSE$_π$ signal 1140$_π$ shows a large sensitivity reduction in the slow exchange regime, and thus importantly, is an exchange rate filter for both slow ($k_{ex}$<30 $s^{-1}$) and faster exchange rates ($k_{ex}$>3000 $s^{-1}$). The peak of AROSE$_π$ signal 1140$_π$ appears at a similar $k_{ex}$ (~260 $s^{-1}$) with that of the CW 1105, matching the nutation frequency of the 1 μT saturation pulse, whereas the peaks of AROSE$_{2π}$ signal 1140$_{2π}$ shift to lower $k_{ex}$ values. FIG. 11B shows that the normalized AROSE$_π$ and AROSE$_{2π}$ contrasts (by the CW contrast) decrease with increasing DC. The difference between AROSE$_π$ and AROSE$_{2π}$ contrasts is large for a slow exchange of 100 $s^{-1}$ and very small for an intermediate $k_{ex}$ of 1000 $s^{-1}$. To quantitatively evaluate the exchange-rate filtering effect, the FWHM of AROSE signals (e.g., from FIG. 11A for DC=25%) are normalized by the FWHM of CW signal (FIG. 11C), which shows a decrease with increasing DC. At DC=25%, the FWHM of AROSE$_π$ and AROSE$_{2π}$ is 62% and 83% of the FWHM for the CW CE signal, respectively.

Figure 12B:
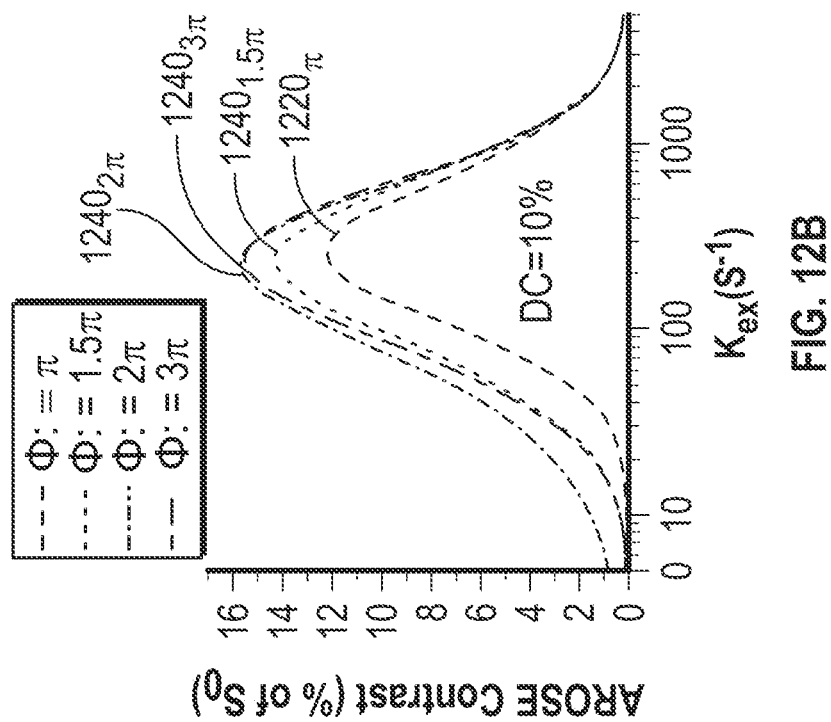
FIGS. 12A-C show pulse train irradiation, a change of the exchange rate filtering effect, and the ratio of the FWHM ($k_{ex}$) of AROSE according to one particular, non-limiting exemplary embodiment of the disclosed concept.
Figure 12A:
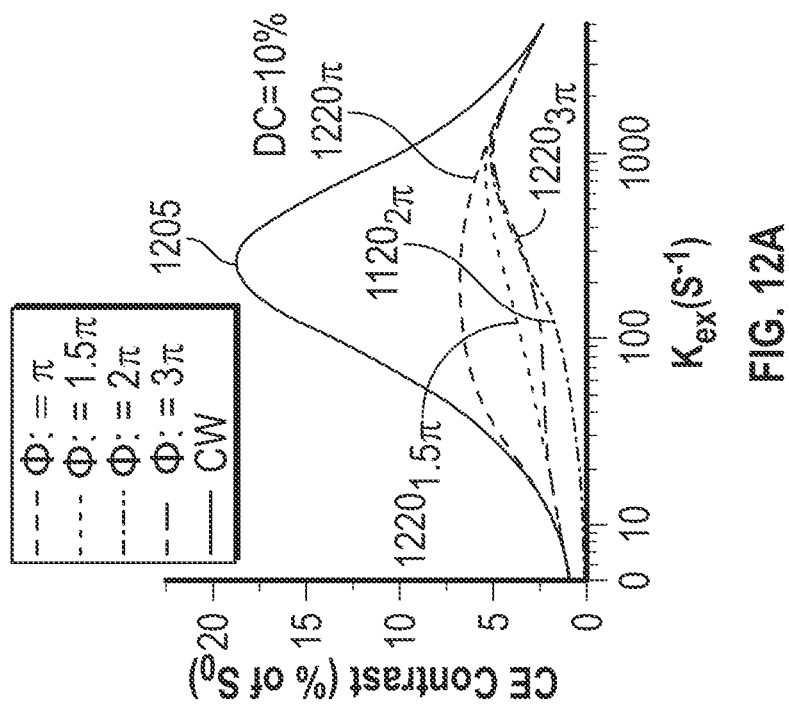
Figure 12C:
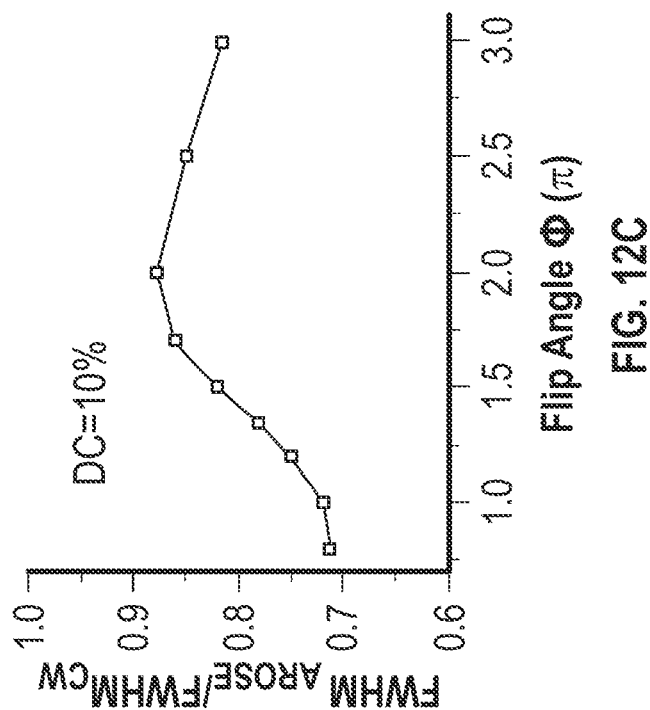

FIGS. 12A-C show pulse train irradiation, a change of the exchange rate filtering effect, and the ratio of the FWHM ($k_{ex}$) of AROSE according to one particular, non-limiting exemplary embodiment of the disclosed concept. FIGS. 12A-C describe the versatility in tuning to different exchange regimes by alteration of pulse train flip angles. FIG. 12A shows that pulse train irradiations with selected flip angles (CW 1205, a pulse train 1220$_π$ with φ=π, a pulse train 1220$_{1.5π}$ with φ=1.5π, a pulse train 1220$_{2π}$ with φ=2π, a pulse train 1220$_{3π}$ with φ=3π) show different CE contrast mainly at slow exchange rates. FIG. 12B illustrates that the AROSE signals with varied flip angles (AROSE signal 1240$_π$ with φ=π, AROSE signal 1240$_{1.5π}$ with φ=1.5π, AROSE signal 1240$_{2π}$ with φ=2π, AROSE signal 1240$_{3π}$ with φ=3π) show a change of the exchange rate filtering effect, mainly for the slower exchange rates. FIG. 12C illustrates that the ratio of the FWHM ($k_{ex}$) of AROSE and CW irradiation is the largest for 2π. DC=10% was assumed in FIGS. 12A-C. Besides π and 2π pulse trains, the rotation transfer effect for pulse trains with flip angles φ of 1.5π and 3π were shown in FIG. 12A for $B_{1, avg}$=1 μT with DC=10%. The AROSE signals with varied flip angles show a change of the exchange rate filtering, mainly for the slow exchange regime (FIG. 12B). The sensitivity and rate-filtering effect of AROSE$_φ$ fall between those of AROSE$_π$ and AROSE$_{2π}$. To quantitatively evaluate the exchange-rate filtering effect, the FWHM of AROSE signals are normalized by the FWHM of CW signal, which was calculated in FIG. 12C for several selected flip angles which has a peak at about 2π, and is the smallest for flip angle <π.

Figure 13A:
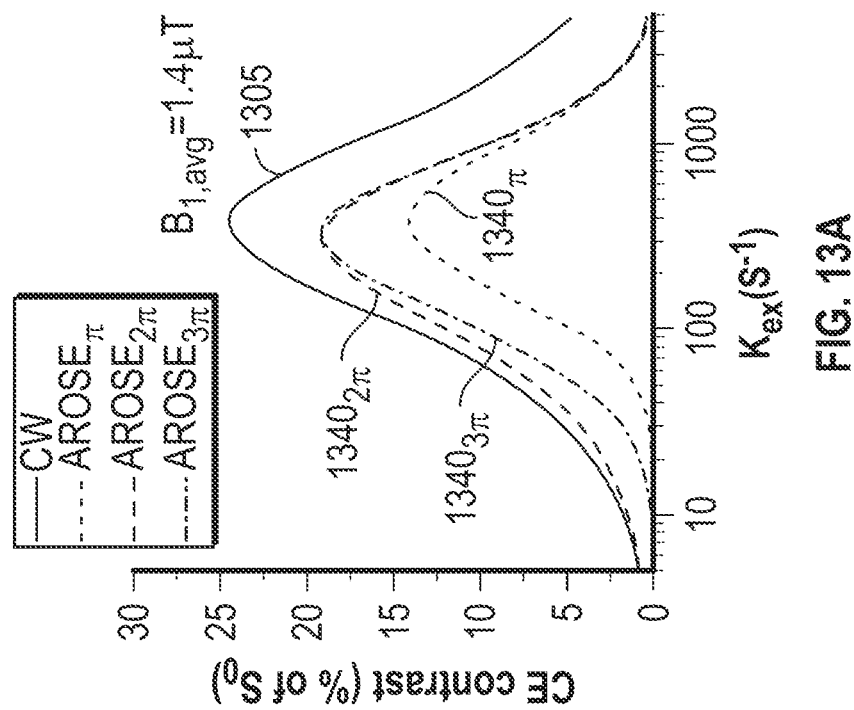
FIGS. 13A-D show changes of CE contrast magnitudes and shifts of the respective peaks according to one particular, non-limiting exemplary embodiment of the disclosed concept.
Figure 13C:
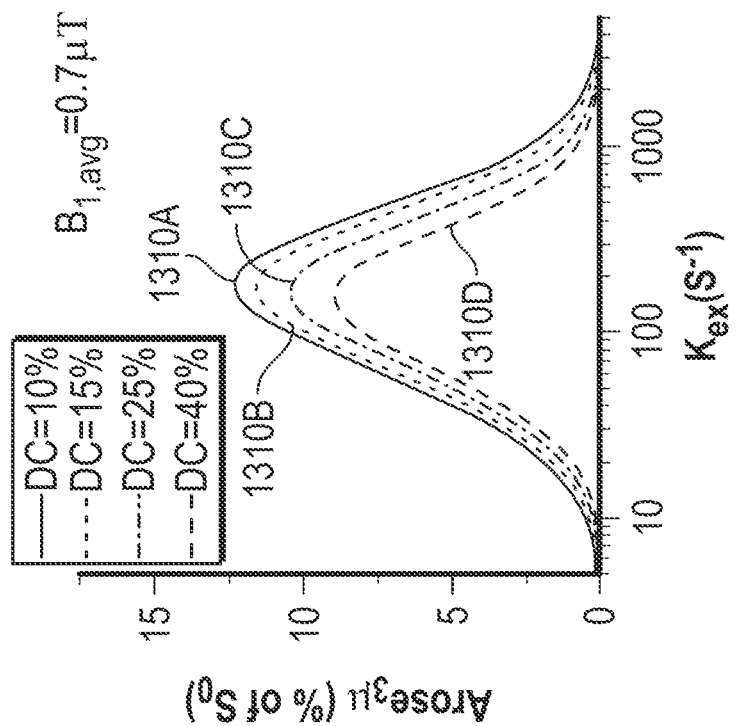
Figure 13B:
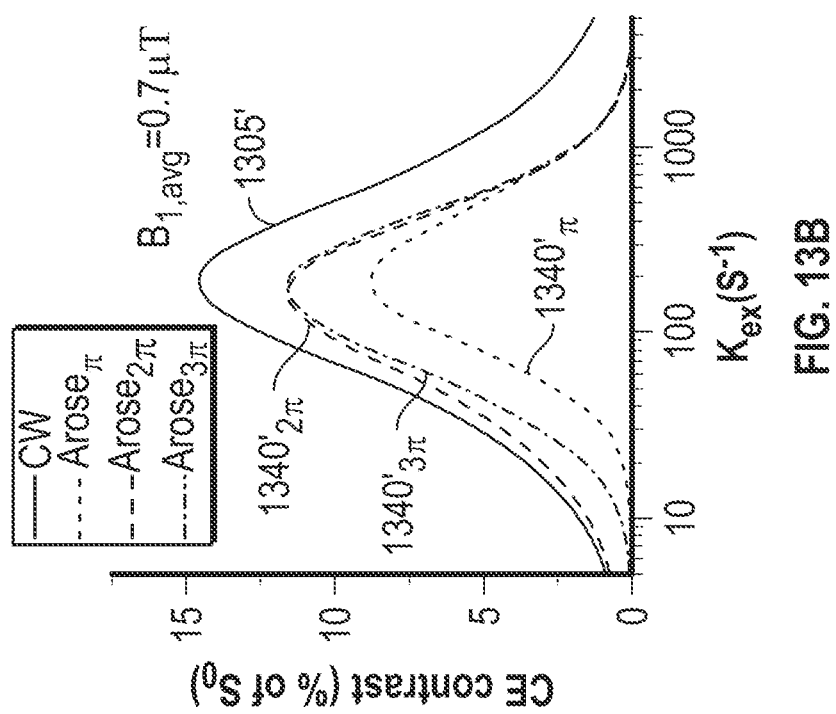
Figure 13D:
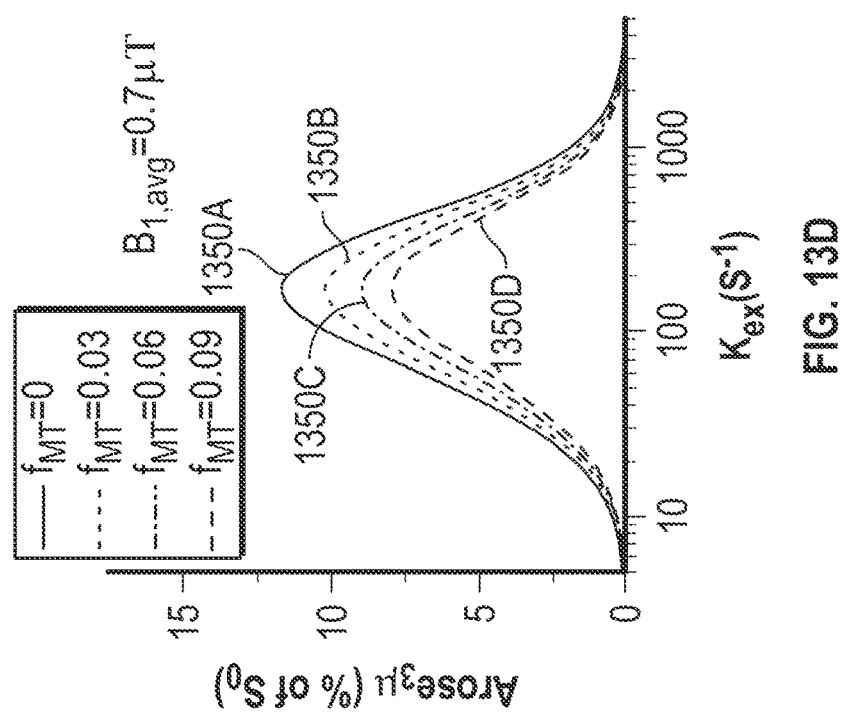

FIGS. 13A-D show changes of CE contrast magnitudes and shifts of the respective peaks according to one particular, non-limiting exemplary embodiment of the disclosed concept. FIGS. 13A-B illustrate that a different $B_{1, avg}$ of AROSE 1340$_π$, 1340$_{2π}$, 1340$_{3π}$ and CW irradiation 1305 leads to a change of CE contrast magnitude and a shift of the respective peaks. FIG. 13C illustrates that the AROSE contrast decreases with increasing DC (DC=10%—1310A, DC=15%—1310B, DC=25%—1310C, DC=40%—1310D). FIG. 13D illustrates that the addition of an MTC pool ($f_{MT}$=0—1350A, $f_{MT}$=0.03—1350B, $f_{MT}$=0.06—1350C, $f_{MT}$=0.09—1350D) decreases the magnitude of these contrasts but does not change the exchange rate-filtering. FIGS. 13A-B show the power dependence of the AROSE contrasts. A $B_{1, avg}$ of 1.4 μT or 0.7 μT leads to a different AROSE and CE contrast magnitude. Moreover, the respective peaks frequency and the exchange-rate filtering domains are nearly proportional to the $B_{1, avg}$, e.g., the peak of AROSE$_π$ contrast is at 190 $s^{-1}$ for 0.7 μT and 390 $s^{-1}$ for 1.4 μT. A variation of the duty cycle of the DC$_I$ pulse train affects the sensitivity of AROSE signal but not on the exchange rate filtering properties, as shown by the example of AROSE$_{3π}$ curves (FIG. 13C). Similarly, the inclusion of an MTC pool decreases the magnitude of these contrasts but has very small effects on the exchange-rate filtering characteristics (FIG. 13D).

Figure 14A:
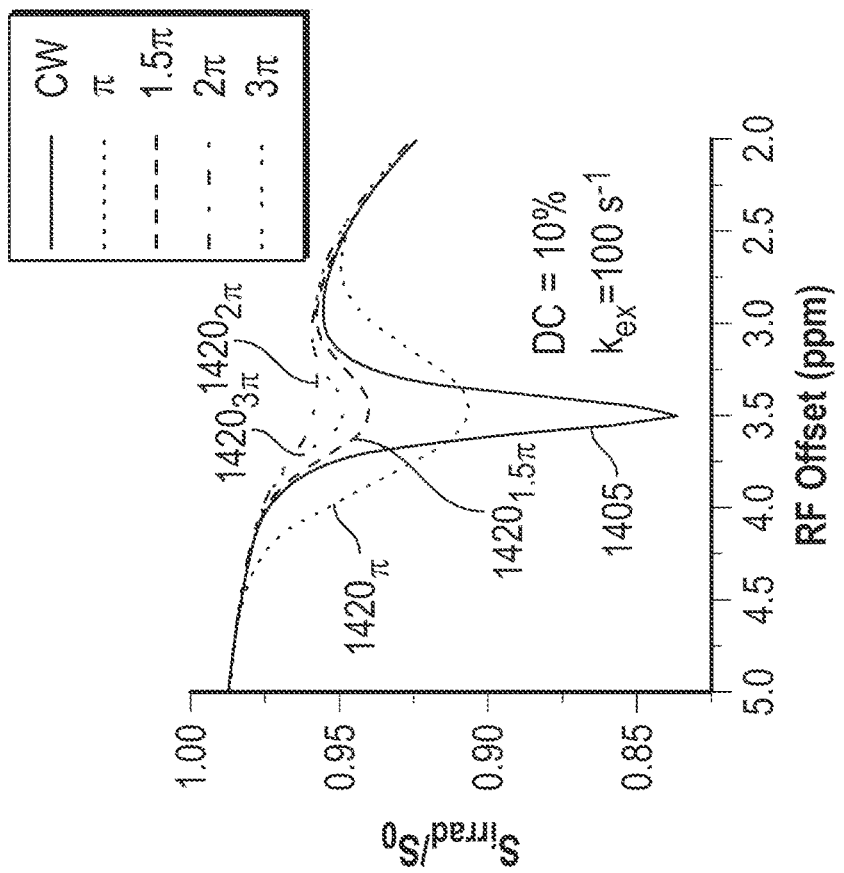
FIGS. 14A-D illustrate simulations of the Larmor frequency-specificity of AROSE signal according to one particular, non-limiting exemplary embodiment of the disclosed concept.
Figure 14C:
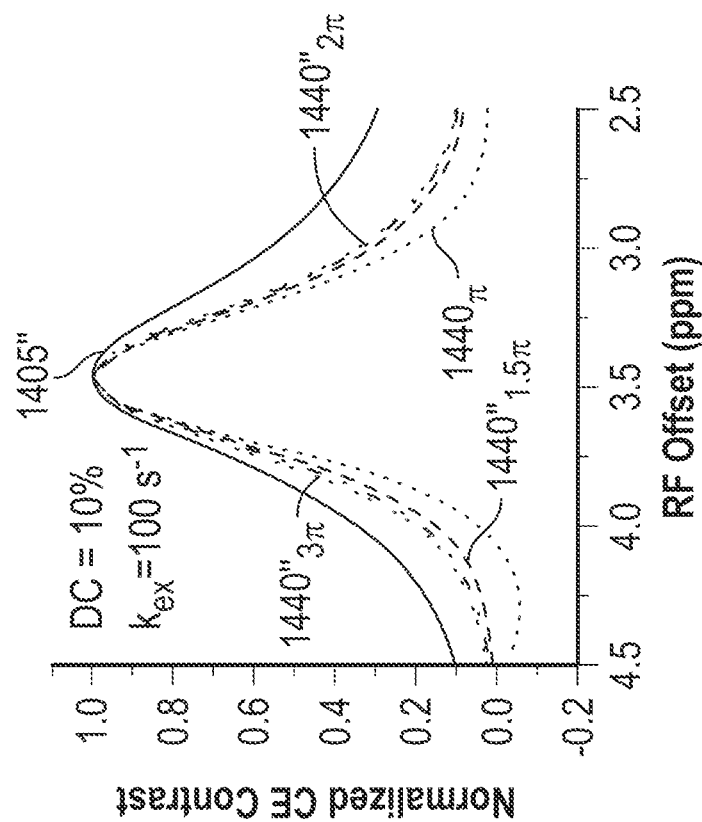
Figure 14B:
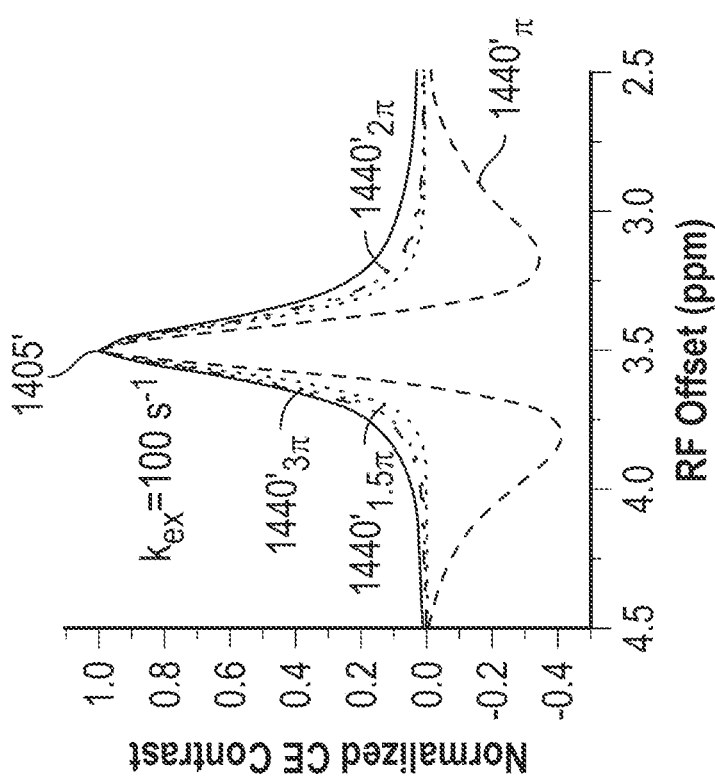
Figure 14D:
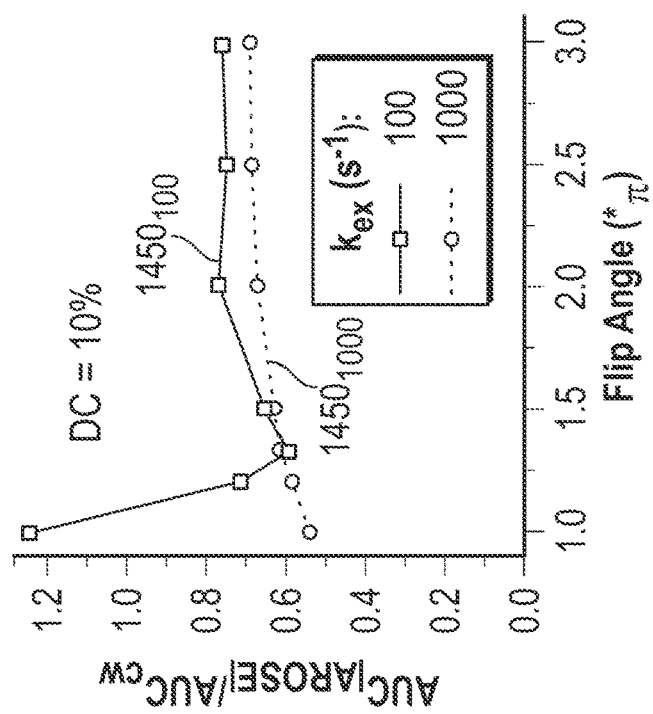

FIGS. 14A-D illustrate simulations of the Larmor frequency-specificity of AROSE signal according to one particular, non-limiting exemplary embodiment of the disclosed concept. Besides exchange rate-filtering, another important index for CE signal specificity is the selectivity on Larmor frequency, which can indicate the contamination from other labile protons with close Larmor frequencies. FIGS. 14A-D show the simulated results for $B_{1,\ avg}=1$ μT and DC=10%. For a slow exchange of 100 $s^{-1}$ (FIG. 14A), the line shape of the CE signal varies with the flip angle of pulse trains. The CE contrast appears as a sharp dip for CW irradiation 1405, but the dip is much smaller for 2π and 3π pulse trains $1420_{2\pi}$, $1420_{3\pi}$. On the other hand, the dip becomes much broader for π pulse trains $1420_\pi$ because of the broader bandwidth associated with a shorter pulse duration. FIGS. 14A-D demonstrate robustness of the observed signal. FIG. 14A illustrates that pulse-train irradiation (CW 1405, pulse train $1420_\pi$ with φ=π, pulse train $1420_{1.5\pi}$ with φ=1.5π, pulse train $1420_{2\pi}$ with φ=2π–, pulse train $1420_{3\pi}$ with φ=3π) shows CE contrast with magnitude and linewidth which is dependent on the flip angle. FIG. 14B compares the line shapes for normalized CW 1405' versus AROSE signals for $k_{ex}=100\ s^{-1}$ $1440'_\pi$, $1440'_{1.5\pi}$, $1440'_{2\pi}$, $1440'_{3\pi}$. The linewidths of most AROSE signals are narrower than that of the CW curve, except AROSE$_\pi$ which shows a large undershoot within a ±1 ppm range from the peak. Normalized AROSE signals $1440''_\pi$, $1440''_{1.5\pi}$, $1440''_{2\pi}$, $1440''_{3\pi}$) show the dependence of line shapes on the flip angle with $k_{ex}=100\ s^{-1}$ as shown in FIG. 14C. For intermediate exchange rate of 1000 $s^{-1}$ (FIG. 14C), the linewidths of all signals are much broader than those in FIG. 14B. The AROSE signals still show a narrower linewidth than CW, and the undershoot in AROSE$_\pi$ is much smaller than that for $k_{ex}=100\ s^{-1}$. FIG. 14D illustrates that the frequency-specificity of AROSE signal is evaluated by the area under the curves (AUCs) $1450_{100}$, $1450_{1000}$ for the normalized |AROSE|. To quantitatively compare the frequency-specificity, the ratio of the AUCs for normalized |AROSE| and CW spectra are compared as a function of a flip angle in FIG. 14D. The ratio is similar for slow and intermediate exchange rates with a flip angle between 1.33π to 1.5π(~0.6) but becomes more different at other flip angles.

Figure 15A:
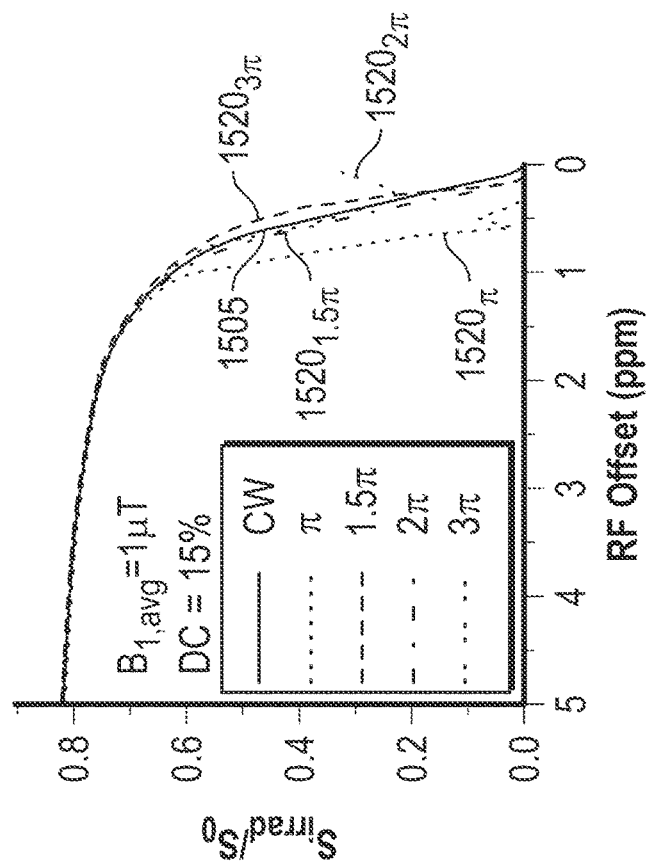
FIGS. 15A-D illustrate comparison of the simulated Z-spectra under CW and pulse-train saturation presenting possible error due to direct rotation according to one particular, non-limiting exemplary embodiment of the disclosed concept.
Figure 15C:
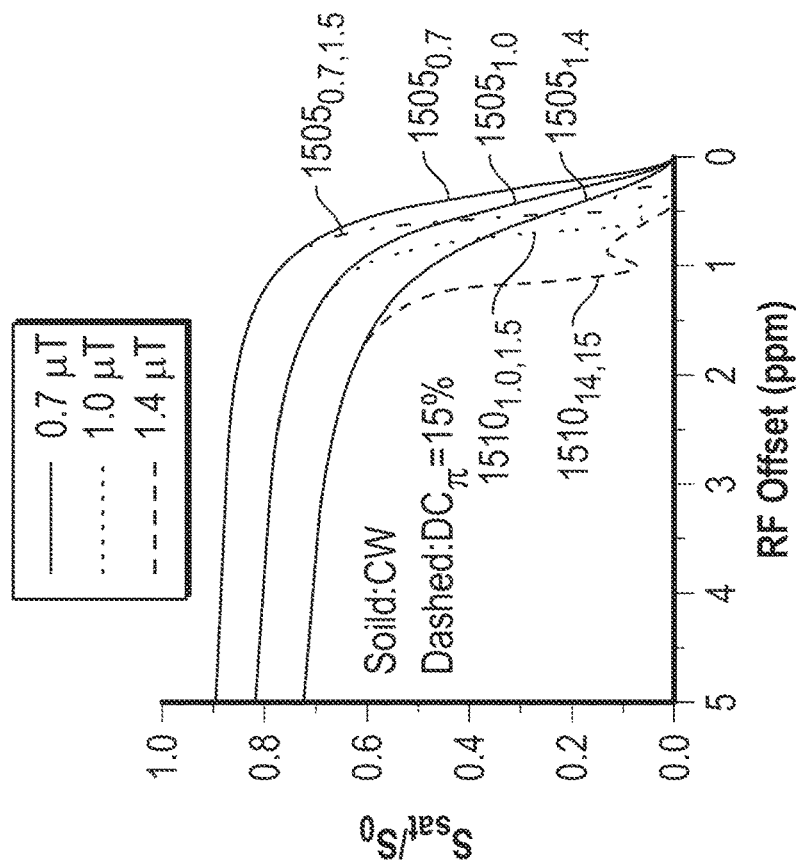
Figure 15B:
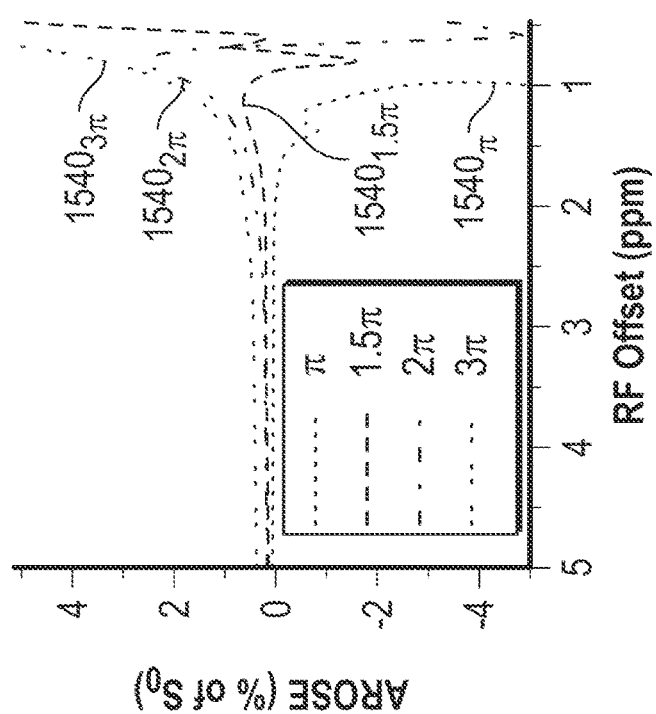
Figure 15D:
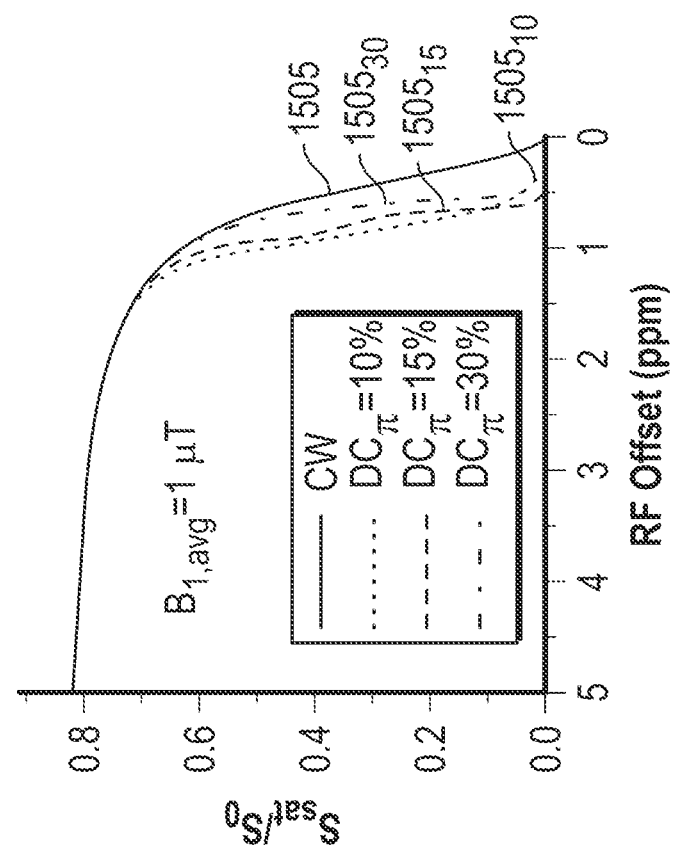

FIGS. 15A-D illustrate comparisons of the simulated Z-spectra under CW and pulse-train saturation presenting possible error due to direct rotation according to one particular, non-limiting exemplary embodiment of the disclosed concept. FIG. 15A illustrates that the Z-spectra match well for larger offsets, but at offsets close to water, the data from pulse-train irradiations ($1520_\pi$, $1520_{1.5\pi}$, $1520_{2\pi}$, $1520_{3\pi}$) show a significant direct rotation effect, which is more severe for the π-pulse train due to its broad bandwidth. FIG. 15B illustrates that the resultant baseline AROSE signals ($1540_\pi$, $1540_{1.5\pi}$, $1540_{2\pi}$, $1540_{3\pi}$) show a small residue MT signal, and a much more significant residue signal at offsets less than 1.5 ppm. FIG. 15C illustrates that the direct rotation effect is also reduced for lower averaged powers (CW $1505_{0.7}$ with $B_{1,avg}=0.7$ μT, $1505_{1.0}$ with $B_{1,avg}=1.0$ μT, $1505_{1.4}$ with $B_{1,avg}=1.4$ μT, DC=15% pulse train $1510_{0.7}$ with $B_{1,avg}=0.7$ μT, $1510_{1.0}$ with $B_{1,avg}=1.0$ μT, $1510_{1.4}$ with $B_{1,avg}=1.4$ μT). FIG. 15D illustrates that the direct rotation effect is reduced for higher DC values (DC=10% pulse train $1510_{10}$, DC=15% pulse train $1510_{15}$, DC=30% pulse train $1510_{30}$). That is, the direct rotation effect is more severe for higher averaged powers and for smaller DC values. FIGS. 15A-D compare the simulated Z-spectra under CW 1505 and a few pulse-train irradiations 1510 in the presence of an MTC pool for $B_{1,\ avg}$ of 1 μT. The Z-spectra match well at larger offsets, indicating that the MTC contributions are very close for these irradiation schemes. However, at offsets close to water, the Z-spectra of pulse-train irradiation showed a significant direct rotation effect, which is the strongest for the π pulse train due to its broadest bandwidth (FIG. 15A). At large offsets, the baseline AROSE signal is negligible for π pulse train but increases with the flip angle and approaches 0.37% to 0.6% between 5 to 2 ppm for the 3π pulse train, which is similar to the results of ASEF with a larger pulse duration and can be minimized by using a small fudge factor on the $B_{1,\ avg}$ of the DC$_l$ pulse train. The baseline AROSE signal becomes much larger at offset frequencies less than 1.5 ppm due to the direct rotation effect (FIG. 15B). As clearly seen for a π pulse train, the direct rotation effect is more severe with a higher $B_{1,\ avg}$ (FIG. 15C), or with a smaller DC value (FIG. 15D).

Figure 16A:
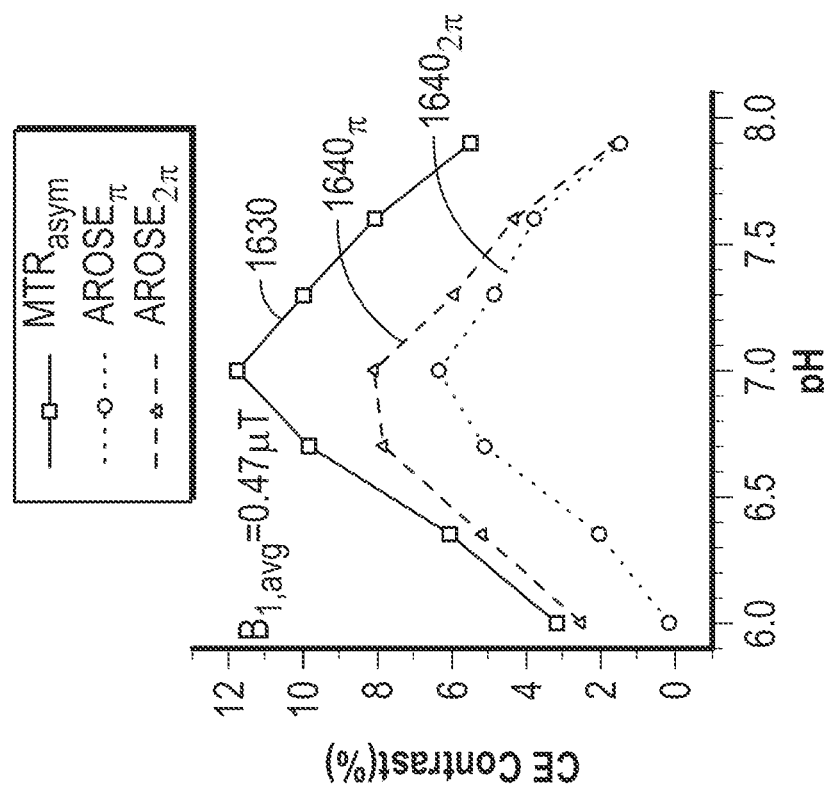
FIGS. 16A-C illustrate using creatine phantoms with varied pH according to one particular, non-limiting exemplary embodiment of the disclosed concept.
Figure 16B:
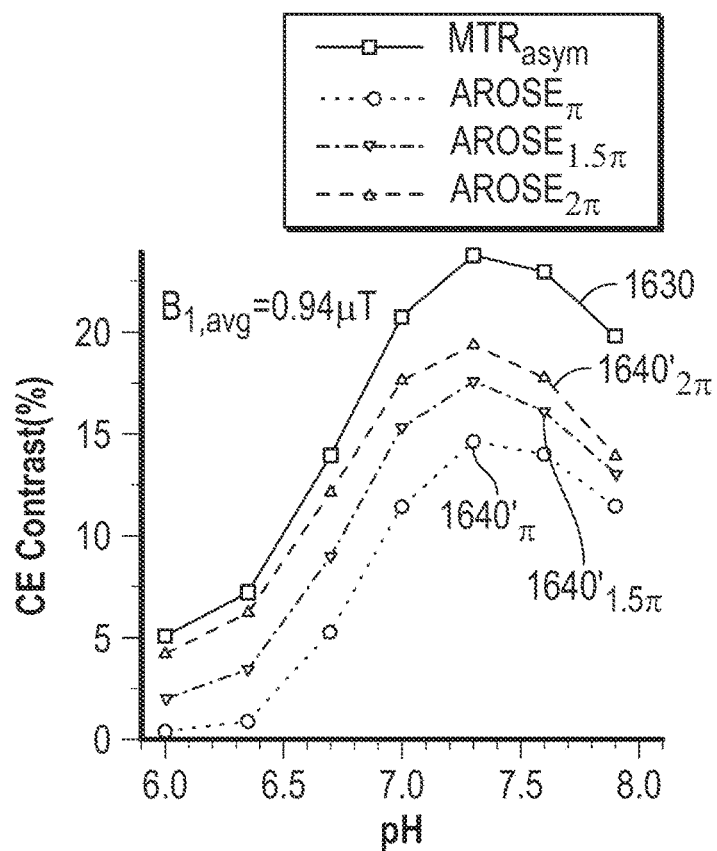
Figure 16C:
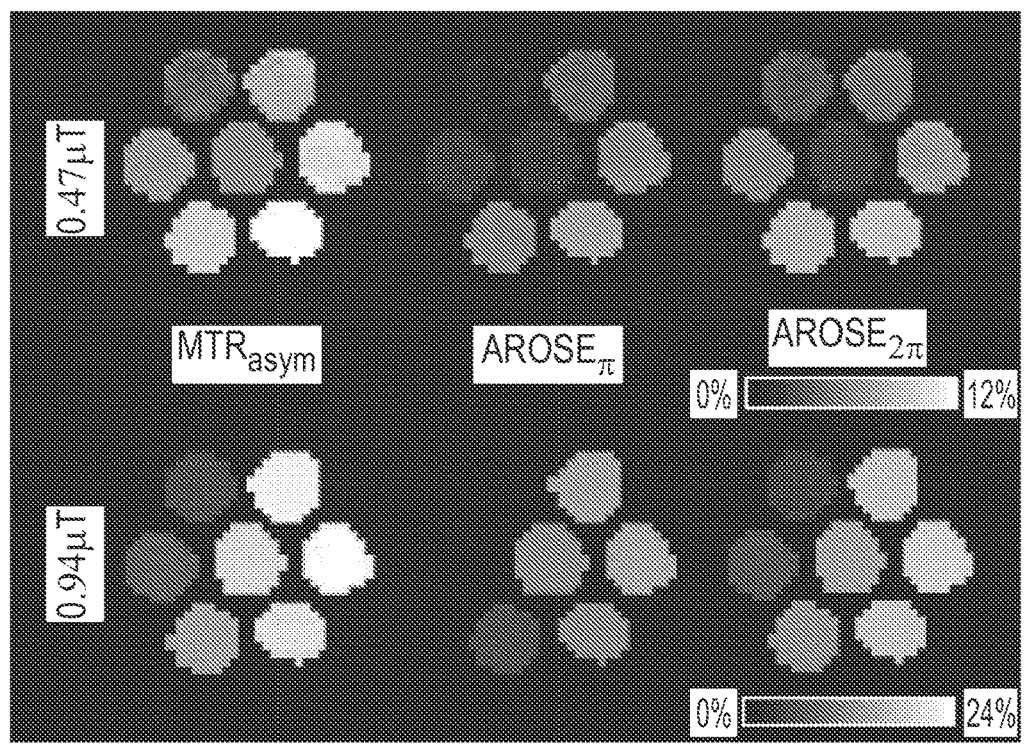

FIGS. 16A-C illustrate exchange rate filterings using creatine phantoms with varied pH according to one particular, non-limiting exemplary embodiment of the disclosed concept. FIG. 16A shows that creatine phantoms with varied pH show a different exchange rate filtering for CW and AROSE scheme $1640_\pi$, $1640_{2\pi}$ in data-plot with averaged irradiation frequency of 20 Hz and $B_{1,\ avg}$ of 0.47 μT. FIG. 16B shows that creatine phantoms with varied pH show different exchange rate filtering for CW and AROSE scheme $1640'_\pi$, $1640_{1.5\pi}$, $1640'_{2\pi}$ in data-plot with averaged irradiation frequency of 40 Hz and $B_{1,avg}$ of 0.94 μT. FIG. 16B shows that creatine phantoms with varied pH show different exchange rate filtering for CW and AROSE scheme in MTR$_{asym}$ and AROSE maps. In creatine phantoms with varied pH, the CE contrasts were measured by CW and pulse train irradiation with $B_{1,\ avg}$ of 0.47 μT (FIG. 16A). Compared to the CW contrast measured by MTR$_{asym}$ 1630, the AROSE$_{2\pi}$ $1640_{2\pi}$ signal is similar in magnitude at lower pH of 6.0 and 6.3 but is much smaller at higher pH greater than 7.5. AROSE$_\pi$ $1640_\pi$ signal is close to AROSE$_{2\pi}$ at higher pH but is much smaller at lower pH. AROSE signals with more flip angles were measured for $B_{1,\ avg}$ of 0.94 μT and shown in FIG. 16B, and the results agree well with the simulations. Overall, all AROSE signals can provide a filter for fast exchange rates and AROSE with φ≠2π can additionally provide filtering for slower exchange rates. FIG. 16C compares the maps of the MTR$_{asym}$ and the AROSE signals, showing effective filtering of high pH samples with AROSE$_{2\pi}$ and filtering of both high and low pH samples for AROSE$_\pi$.

Figure 17D:
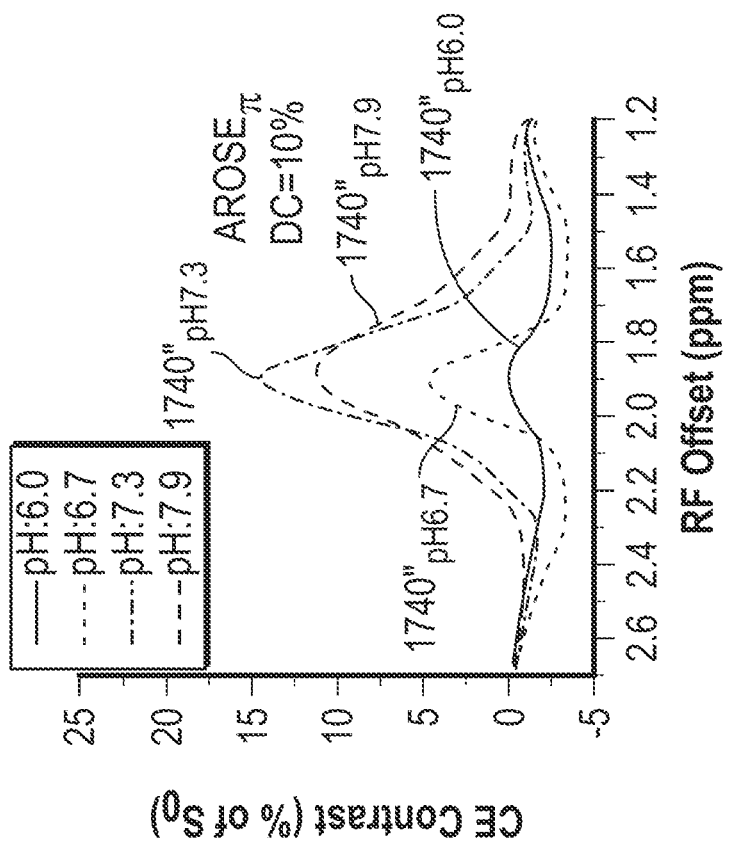
Figure 17C:
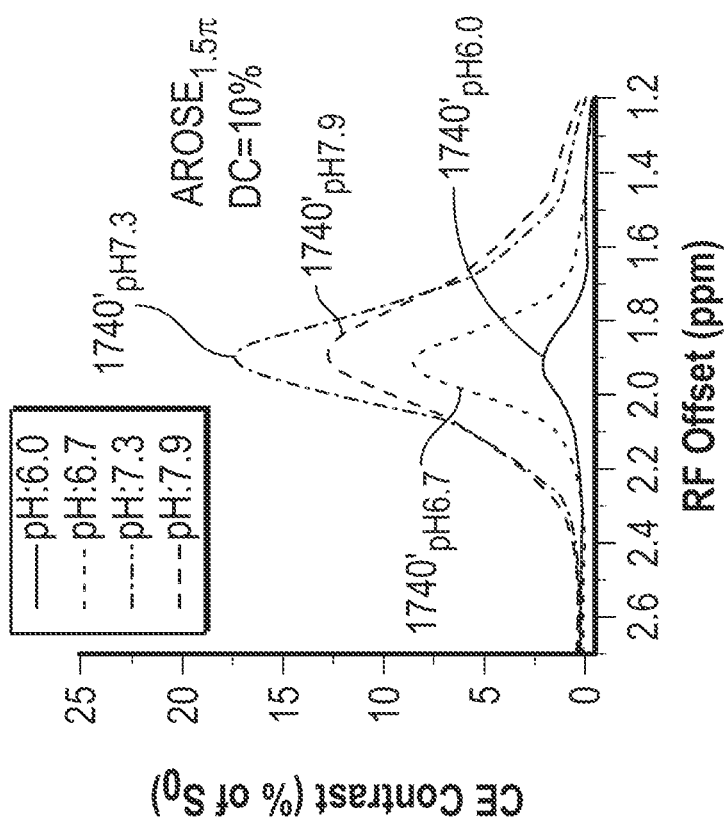
Figure 18B:
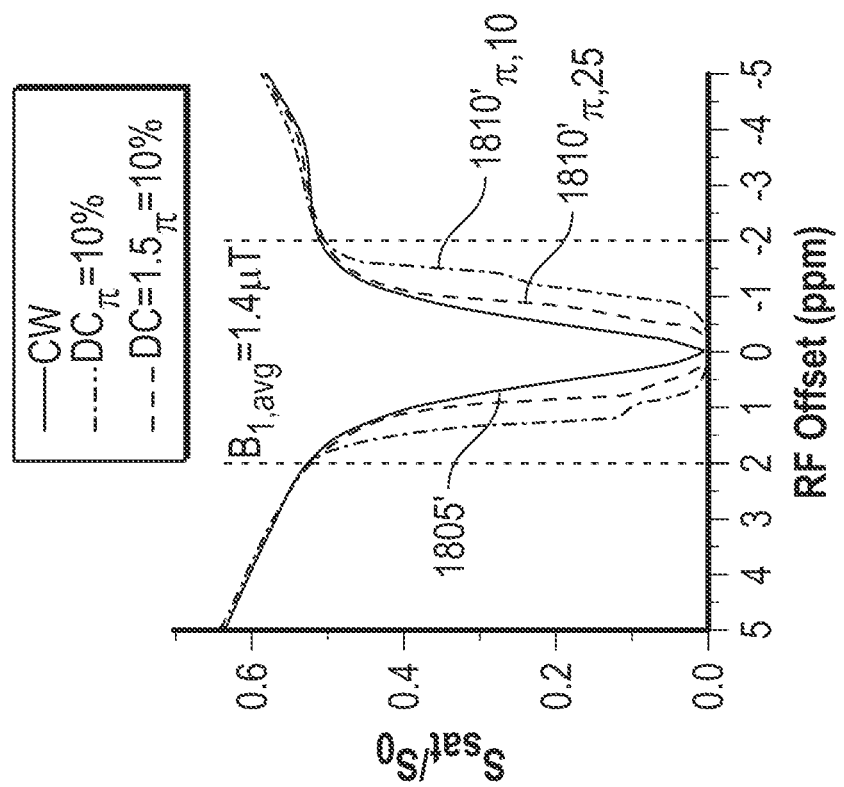
FIGS. 18A-D illustrate comparisons of the Z-spectra of a 12% heated BSA phantom according to one particular, non-limiting exemplary embodiment of the disclosed concept.
Figure 18A:
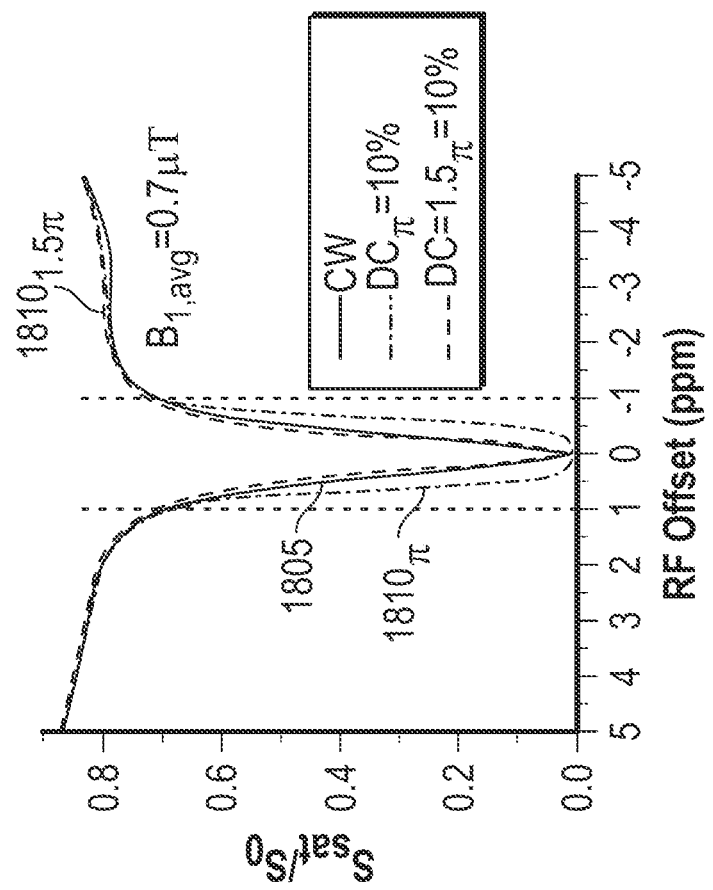
Figure 18D:
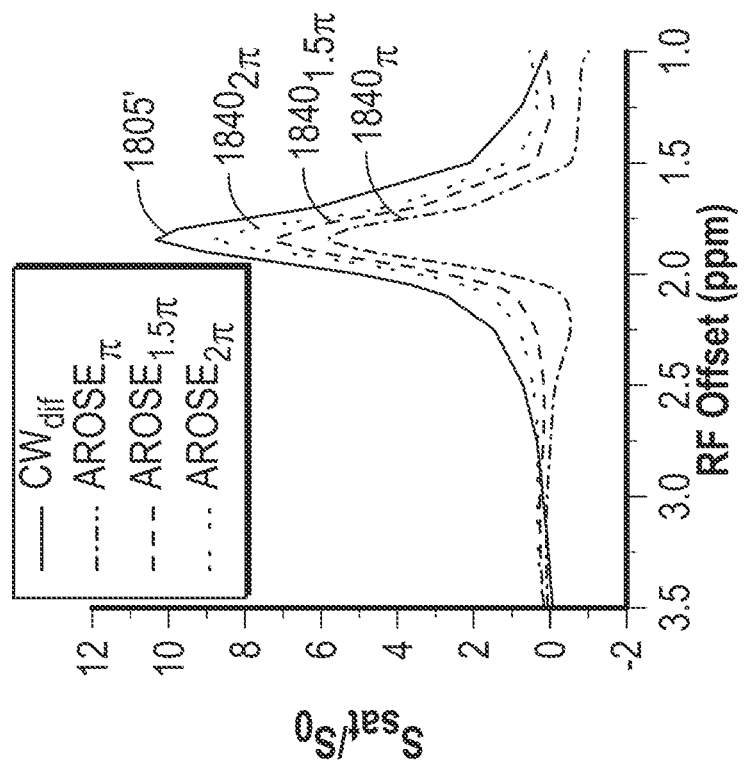
Figure 18C:
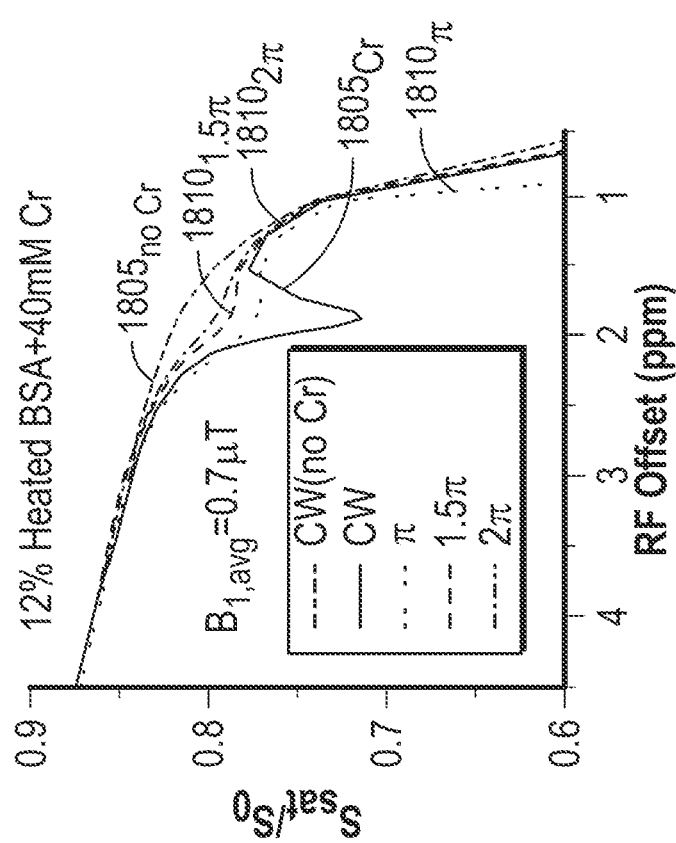

FIGS. 17A-D illustrate frequency-specificity of creatine phantoms of varied pH measured with $B_{1,avg}$ of 0.94 μT and DC=10% according to one particular, non-limiting exemplary embodiment of the disclosed concept. The line shapes of MTR$_{asym}$ (CW MTR$_{asym}$ $1705_{pH6.0}$, $1705_{pH6.7}$, $1705_{pH7.3}$, $1705_{pH7.9}$ as shown in FIG. 17A) and AROSE signals with flip angles of 2π ($1740_{pH6.0}$, $1740_{pH6.7}$, $1740_{pH7.3}$, $1640_{pH7.9}$ as shown in FIG. 17B), 1.5π ($1740'_{pH6.0}$, $1740'_{pH6.7}$, $1740'_{pH7.3}$, $1740'_{pH7.9}$ as shown in FIG. 17C), and π ($1740''_{pH6.0}$, $1740''_{pH6.7}$, $1740''_{pH7.3}$, $1740''_{pH7.9}$ as shown in FIG. 17D) show that the line width decreases with lower flip angle, except for AROSE$_\pi$ which shows a significant undershoot for low pH phantoms. The MTR$_{asym}$ peaks at 1.9 ppm, and the linewidth increases with pH (FIG. 16A). AROSE$_{2\pi}$ shows a reduced peak magnitude (more so for higher pH phantoms) but also a narrower linewidth. For example, the signals at 0.5 ppm from the peak (1.4 and 2.4 ppm) are much smaller compared to MTR$_{asym}$. AROSE$_{1.5\pi}$ reduces the peak magnitude of both low and high pH phantoms and reduces the linewidth further. For AROSE$_\pi$, the peak signal of pH=6.0 phantom is close to zero due to the exchange rate filtering, but broad undershoot can clearly be seen as in the simulation data, in agreement with simulation results FIGS. 18A-D illustrate comparisons of the Z-spectra of a 12% heated BSA phantom according to one particular, non-limiting exemplary embodiment of the disclosed concept. FIG. 18A shows a comparison of the Z-spectra (for $B_{1,avg}$=0.7 µT, CW 1805, DC=10% with $\varphi=\pi$—1810$_\pi$, with $\varphi=1.5\pi$—1810$_{1.5\pi}$) of a 12% heated BSA phantom for $\omega_{1,avg.}$ of 30 Hz. FIG. 18B shows a comparison of the Z-spectra (for $B_{1,avg}$=1.4 µT, CW 1805', DC=10% with $\omega=\pi$—1810'$_{\pi,10}$, DC=25% with $\omega=\pi$—1810'$_{\pi,25}$) of a 12% heated BSA phantom for $\omega_{1,\ avg.}$ of 60 Hz. FIGS. 18A-B show that the direct rotation effect is smaller for lower irradiation power, larger flip angle, and higher DC. FIG. 18C illustrates that with the addition of 40 mM creatine, for $B_{1,avg}$=0.7 µT the CE signal can be evaluated in the Z-spectra with different magnitude and linewidth. FIG. 18D illustrates that compared to the $CW_{diff}$1805', the AROSE signals (1840$_\pi$, 1840$_{1.5\pi}$, 1840$_{2\pi}$) show a much narrower linewidth with only a slight loss of peak CE sensitivity. The deviation of 1.5π pulse train from CW is much smaller, indicating a much smaller direct rotation effect. At $B_{1,\ avg}$=1.4 µT (FIG. 18B), the direct rotation effect of the n-pulse train extends to a broader range of ±2 ppm for DC=10%, which is reduced when a higher DC=25% is used. In FIG. 18C, 12% heated BSA with 40 mM of creatine is measured by CW 1805$_{Cr}$ and pulse trains 1810$_\pi$, 1810$_{1.5\pi}$, 1810$_{2\pi}$ with flip angles of π, 1.5π, and 2π and DC=10%, showing different line shapes for the CE effect centered at 1.9 ppm. The dotted curve is the CW Z-spectrum 1805$_{no\ Cr}$ of 12% heated BSA only and is the baseline for the evaluation of the CE contrast. Its difference with the solid curve, i.e., the $CW_{diff}$ in FIG. 18D, indicates the maximum CE contrast achievable with all these irradiation schemes. The baseline signal without CE is not required for AROSE because the $DC_1$ data is served as the baseline. The calculated AROSE signal shows a lower peak magnitude with smaller flip angles as well as a narrower linewidth, except for AROSE$_\pi$ which shows negative undershoots as expected from simulation results.

In summary, the present disclosure shows that the AROSE approach not only provides adjustable filters which can minimize the MTC effect, but also improves exchange rate filtering and/or frequency-specificity for chemical exchange sensitive imaging with a relatively small reduction in the peak CE sensitivity. Therefore, AROSE may be a highly useful tool for CEST study in the slow to intermediate exchange regime.

FIGS. 19A-22 describe a fudge factor matching and a base line correction used to minimize the MT mismatch in accordance with non-limiting example embodiments of the disclosed concept. As described previously, while the effectiveness of the exchange filtering effect has been confirmed as shown above, a small mismatch of MT effect exists when saturation pulses with the same average $B_1$ power but different duty cycles are used. This disparity grows more apparent with a higher difference between the duty cycle (DC) of the two saturation pulse trains and with a higher average $B_1$ power used for saturation. In addition to this intrinsic mismatch, there is also a possibility of imperfections in MR hardware in RF power linearity and instability of delivering a sustained long RF irradiation, which can contribute to an imbalance of the background MT signals for the two irradiation schemes. An empirical correction procedure can be used in ensuring proper MT filtering and compensate for the baseline MT mismatch. FIGS. 19A-22 illustrate an example empirical procedure performed using nicotinamide phantoms and stroke rodents for in vivo investigation. Nicotinamide phantoms in denatured protein was used to investigate the effect of different average saturation powers and MT pool fractions on fudge factors used for correction as well as the ASEFR signal and baseline, and in vivo studies in stroke rodents were used to further investigate the sensitivity and fidelity of ASEFR spectra. Thus, the procedure first evaluates the effects of the average saturation power and semi-solid pool MT fraction on the fudge factor (ff) matching using Nicotinamide phantoms in heat denatured BSA, and then evaluate the potential of ASEF imaging in vivo by examining the fudge factor matching, the baseline MT signal, and the contrast of ASEF imaging of stroke rats induced by Middle Cerebral Artery Occlusion (MCAO). As previously mentioned, Bruker Biospec® 9.4 T magnet is used for the empirical procedures. The magnetic field homogeneity can be optimized by localized shimming over the volume of interest. The CEST pulse sequence consists of a saturation preparation module followed by a spin echo EPI (echo planar imaging). Saturation preparation schemes consist of either a single CW block pulse or a train of binomial pairs of Gaussian pulses with a kurtosis of 4.

The empirical procedures used a set of four phantoms prepared in 1× phosphate buffered saline (PBS) and titrated to pH of 7.4: 12% (w/v) Bovine Serum Albumin (BSA); 10% BSA with 150 mM Nicotinamide (Nic); 12% BSA with 150 mM Nic; and 15% (w/v) BSA with 150 mM Nic. These phantoms were then transferred into syringes, heated in a water bath at 95° C. for 20 minutes to denature the BSA within the phantoms, and allowed to cool before imaging at room temperature. Imaging was performed in a 4.0-cm inner-diameter volume coil used for excitation and reception with a 6-s saturation preparation. Average $B_1$ powers of 0.60, 0.72, 0.86, 1.03, 1.25, 1.50 and 1.80 µT were applied, comprising either a single CW block pulse or a train of 37 binomial pairs with durations of 24 ms and pulse intervals of 138.1 ms, yielding a duty cycle (DC) of about 15%. The imaging parameters for the single slice EPI read out were matrix size=64×64, field of view=50×50 mm, slice thickness=5 mm, TR=11 s and TE=20 ms. $T_1$ mapping was performed with an inversion recovery EPI sequence. $B_0$ maps were obtained using the WASSR (water saturation shift referencing) method for region of interest (ROI) selection of pixels with a low $B_0$ inhomogeneity. $B_1$ mapping was obtained by measuring signal nutation.

For further in vivo investigation, six male Sprague-Dawley rats (253-351 g) were studied. The rodents were anesthetized with isoflurane (5% for induction and 2% during surgery) in a mixture of O2 and air gases maintaining total O2 concentration at ~30% throughout the procedure. Prior to imaging, MCAO was performed to induce permanent ischemia in the left hemisphere. During imaging, isoflurane was reduced to 1.4-1.5% maintaining end-tidal $CO_2$ at 3-4%, while the rectal temperature was controlled at 37.2±0.5° C. using a feedback-controlled heating pad. Imaging was performed at 3-4 hours post-operation with an 86-mm inner-diameter volume coil for excitation and a 20-mm single loop coil for reception. A 4-s saturation preparation with average $B_1$ of 0.80 µT was applied at 36 offsets between 0 and 6 ppm in either a single CW block pulse or a train of 25 binomial pairs with durations of 24 ms and pulse intervals of 136 ms (DC=15%). The two slice EPI readout was performed with the following imaging parameters: matrix size=80×80, field of view=32×32 mm, slice thickness=2 mm, TR=7 s and TE=20 ms. To detect the ischemic lesion, ADC (apparent diffusion coefficient) maps were acquired using a spin-echo EPI sequence, with a low b-value of 5 s/mm² applied on a single axis and high b-value of 1200 s/mm₂ applied along six different directions.

In order to compensate for the disparity of attenuation between the CW and the pulse train caused by machine limitations and the intrinsic residual difference in background MT, an empirical fudge factor was determined as a scalar for the amplitude of RF irradiation in order to match the MT effects at an offset with minimal CEST effect. For this matching, CEST signals were measured at a reference frequency (e.g., 5.5 ppm) using both the CW and the binomial pair pulse train. The power of the CW pulse was fixed to $B_{1,avg}$ while the average power of the binomial pair pulse train was modulated around $B_{1,avg}$ with a fudge factor varying between −3 and 8% in increments of 0.4%. An ROI was then drawn in the 12% BSA only phantom, or the normal tissue contralateral to the ischemic lesion in vivo, and the averaged signal in the ROI for the pulse train was linearly interpolated to determine the fudge factor that achieves equality with the ROI averaged signal of the CW saturation scheme. If there is no equality between the two datasets, the range of the fudge factor ff was shifted or expanded so that a matching ff could be found within the bounds of the fudge factor imaged.

For Z-spectra analyses, ROIs were used. In the phantoms, an ROI with minimal $B_0$ inhomogeneity (<0.05 ppm) was selected from each sample; while in MCAO animal studies, ROIs were drawn on ADC maps encompassing the entirety of the infarcted region and then reflected over the center of the brain to determine a region for the contralateral side. The raw ASEFR, $ASEFR_\Omega^{raw}$, was calculated from the difference between the CW and pulse train saturations as follows:

$$ASEFR_\Omega^{raw} = (S_\Omega^{pulsed} - S_\Omega^{CW})/S_0 \qquad \text{[Equation 19]}$$

where $\Omega$ is the frequency offset, and $S_0$ images were acquired at 300 ppm. In order to correct for baseline, the raw ASEFR, $ASEFR_\Omega^{raw}$, from 5.5 ppm were subtracted from all offsets.

Using the four phantoms (a 12% BSA only phantom, a 10% BSA and Nicotinamide (Nic) phantom, a 12% BAS and Nic phantom, and a 15% BSA and Nic phantom), a fudge factor was determined at a $B_{1,avg}$ of 0.86 µT at 5.5 ppm. The CW pulse was imaged at a fixed power of 0.86 µT yielding a nearly-constant attenuated signal. The results showed that a higher concentration of denatured BSA has a larger MT pool fraction resulting in lower attenuated signal levels, whereas increasing the fudge factors for the binomial pulse train led to increasing attenuation. Linear interpolation was used to determine the fudge factor value at which the attenuation from the CW pulse was approximately equivalent to that of the pulse train. There was little difference in the fudge factors of the four phantoms even where there was a 50% increase in the BSA concentration contributing to the background MT. However, the fudge factor increased almost linearly with increasing $B_{1,avg}$ power. For example, the fudge factor increased from 0 to approximately 12 as the $B_{1,avg}$ power increased from 0.6 µT to 1.8 µT. The residual raw ASEFR at 5.5 ppm for the four phantoms was acquired. Since the fudge factor determination was performed at this frequency (5.5 ppm), most of the data points were within 0.3% of a zero baseline. As there may be variation across the image (e.g., caused by $B_1$-inhomogeneity or residual MT), a baseline correction was used to further suppress the ASE-$FR_{MT}$ and improve the specificity of the CEST signal. The CEST signal of the Nicotinamide phantoms (the 10% BSA and Nic phantom, the 12% BSA and Nic phantom, and the 15% BSA and Nic phantom) as measured by the ASEF at the amide frequency of 3.4 ppm was lower for the increasing BSA content because of their larger MT effect and shorter $T_1$ values. The residual signal for the phantom without Nicotinamide (the 12% BSA only phantom) was small, especially at lower $B_{1,avg}$ where the background residual signal is removed more effectively.

Fudge factor matching in vivo in an MCAO rat model was then examined. The lesions were visible in the left hemisphere of the ADC maps as an approximately 30% decrease in ADC. An ROI was selected from the lesion and the contralateral ROI was outlined. Fudge factor maps calculated across the rat brain showed some disparity between the lesion and the normal tissue. $B_{1,avg}$ maps showed the $B_1$-inhomogeneity had a magnitude of several percent, and was mainly in the vertical direction, suggesting that the differences in the fudge factors is not due to differences in $B_1$.

Figure 19B:
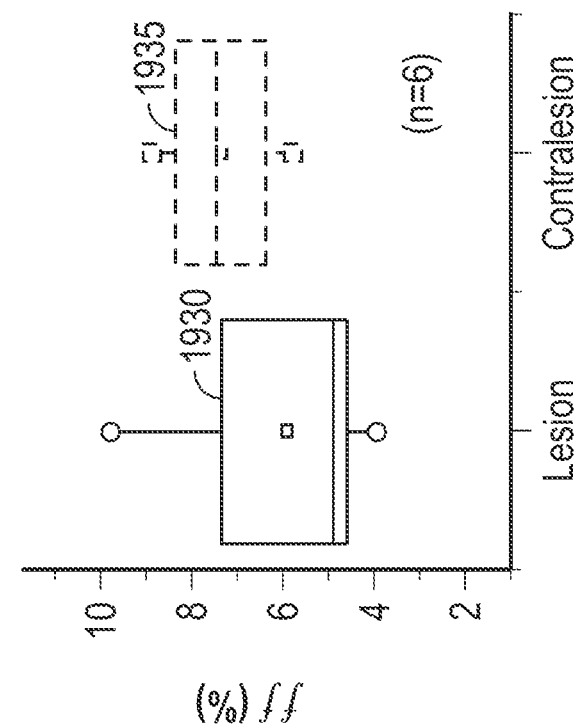
FIGS. 19A-B illustrate fudge factor matchings according to one particular, non-limiting exemplary embodiment of the disclosed concept.
Figure 19A:
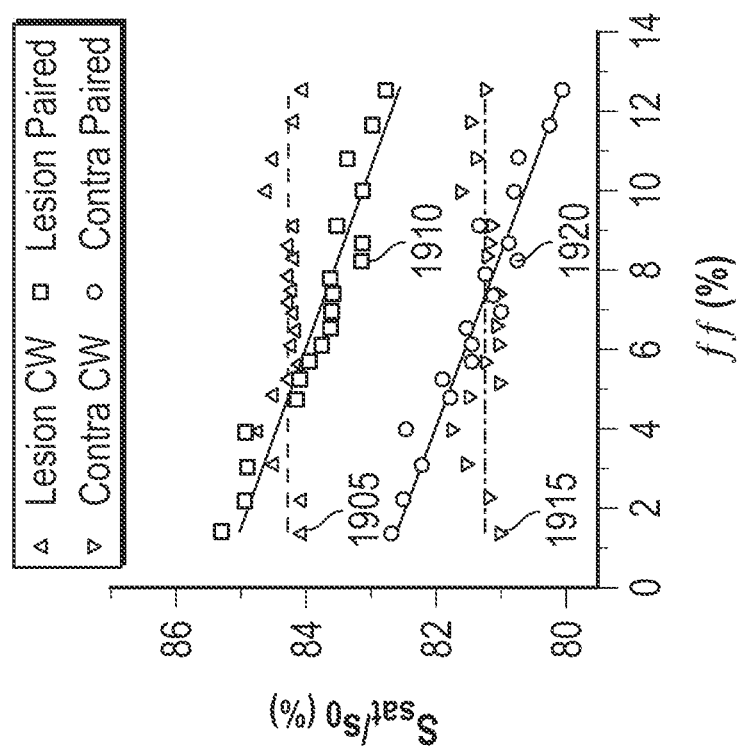

FIG. 19A shows that the fudge factor matching across the ROIs indicated a slightly lower fudge factor for the lesion (e.g., the legion 1905 at CW pulse train and the legion 1910 at paired pulse trains) than for the contralateral ROI (e.g., the contralateral ROI 1915 at CW pulse train and the contralateral ROI 1920 at paired pulse trains). FIG. 19B shows box and whisker plots of the fudge factors for the legion and contralateral ROIs across six MCAO rodents. In FIG. 19B, a box and whisker plot 1930 of the lesion ROI shows a much wider spread of values and inter-animal variation than a box and whisker plot 1935 of the contralateral ROI. The variability and the heterogeneity suggest that the fudge factor likely varies with ischemic tissue properties. Therefore, the fudge factors for the contralateral ROI were used for acquisition of the ASEF in vivo for consistency.

Figure 20B:
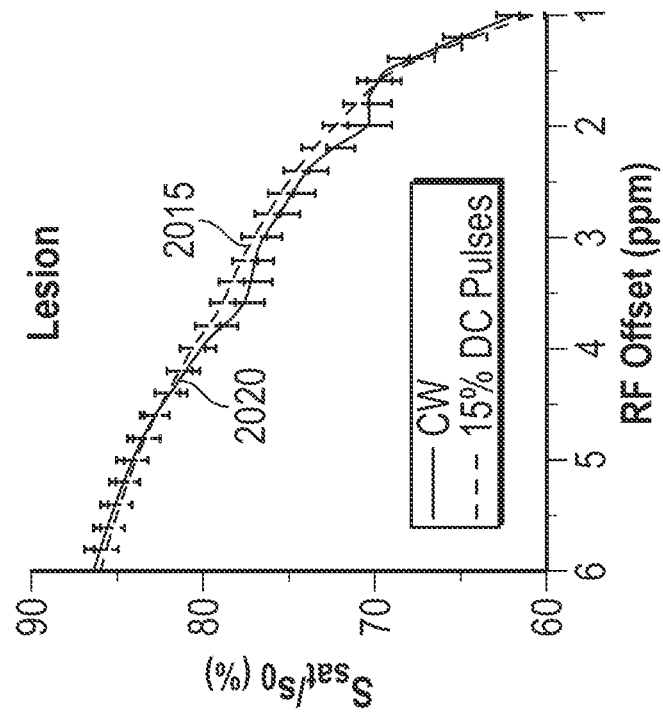
FIGS. 20A-D illustrate Z-spectra and ASEFR spectra of MCAO entities in vivo according to one particular, non-limiting exemplary embodiment of the disclosed concept.
Figure 20A:
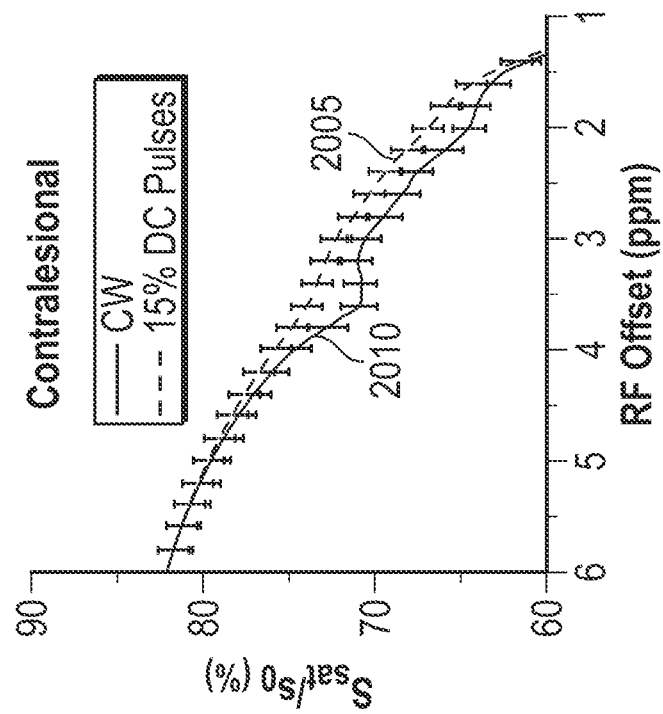
Figure 20D:
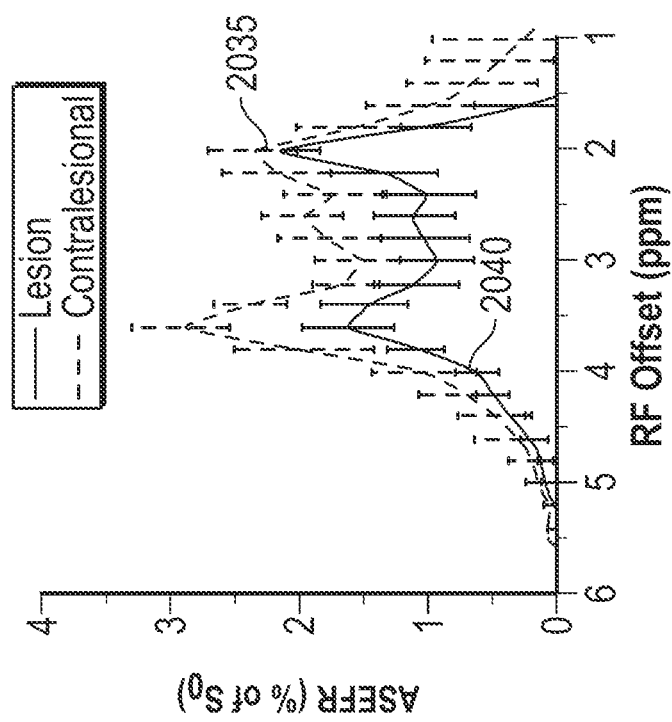
Figure 20C:
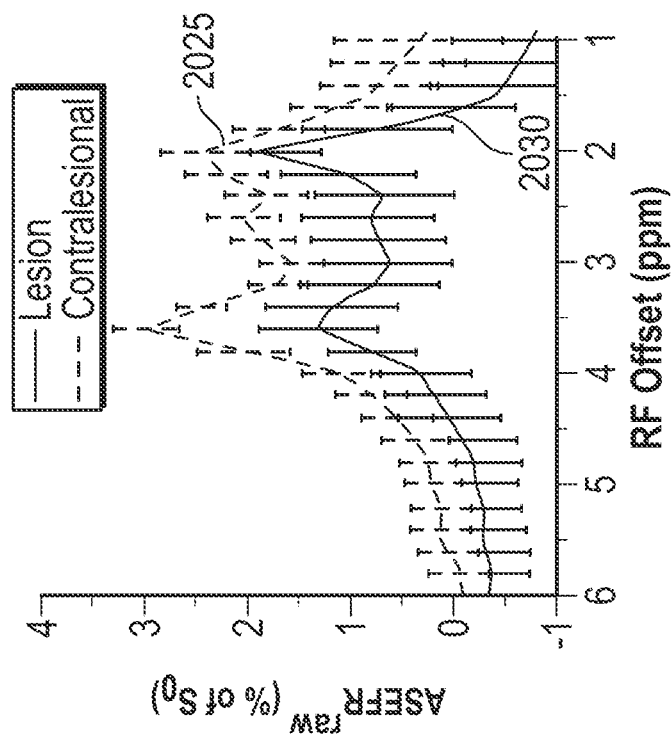

For the contralateral ROI, positive offsets of Z-spectra averaged over animals indicated a close matching between the CW saturated spectra and the low duty cycle pulsed spectra in offsets beyond chemical exchange resonances (e.g., >5 ppm). FIG. 20A illustrates average Z-spectra 2005 acquired using saturation by a CW and average Z-spectra 2010 acquired using 15% DC pulse trains in healthy contralesional tissue in MCAO rodents. FIG. 20A shows that there was a close matching between the contralateral 2005 at CW pulse train and contralateral 2010 at a 15% DC pulse train. In contrast, there is a clear disparity between the CW and pulsed Z-spectra around the amide (~3.6 ppm), the guanidyl (~2 ppm), and the PCr (2.6 ppm) frequencies, indicating that the low DC pulse train effectively reduced these CEST signals. FIG. 20B illustrates average Z-spectra 2015 acquired using saturation by CW and average Z-spectra 2020 acquired using saturation by 15% DC pulse trains in an infarcted lesion tissue in the MCAO rodents. FIG. 20B shows that in the lesion ROI, there is a small mismatch at large offsets (>5 ppm) for the average Z-spectra as the power determined by the fudge factor matching was taken from the contralateral ROI. Subtracting the CW from the pulsed spectra gives a raw ASEFR spectra for the lesion and contralateral tissue as shown in FIG. 20C. FIG. 20C illustrates ASEFR spectra 2030 for a lesion ROI and ASFER spectra 2025 for a contralesional ROI. Examining the raw ASEFR spectra shows disparate baselines around 5.5 ppm and observing the spectra closer over 5-6 ppm shows that the average baseline for the contralateral ROI is close to zero but is about −0.3% for the lesion ROI. Subtracting this 5.5 ppm baseline across voxels from the whole ASEFR spectra gives corrected ASFER spectra for both the contralateral and lesion ROIs. FIG. 20D shows ASFER spectra 2040 for the contralateral ROI and ASFER spectra 2035 for the lesion. The ASEFR for the amide resonance at 3.6 ppm was about 2.9% for the tissue contralateral to the lesion, whereas in the lesion it measured an average of 1.6%. At the guanidyl resonance of 2 ppm, the contralateral side displayed an average sensitivity of 2.3% while the lesion exhibited a signal of 2.2%. At 2.6 ppm, while the PCr-weighted signal was difficult to discern from the CW spectra alone, the ASEF measurement exhibits a small peak with a magnitude of about 1.9% for the contralateral tissue and 1.1% in the ischemic region.

Figures 21, 22:
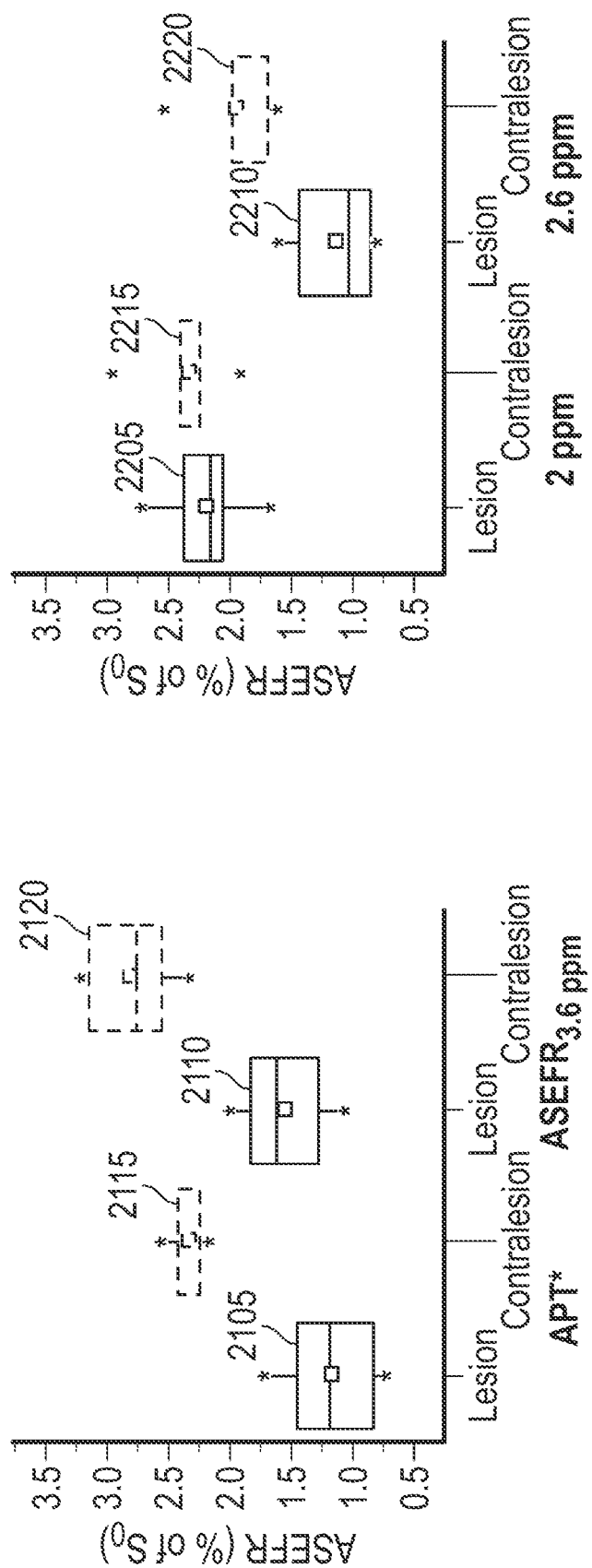
FIG. 21 illustrates comparisons of APT and ASEFR in the MCAO entities according to one particular, non-limiting exemplary embodiment of the disclosed concept.
FIG. 22 illustrates comparisons of APT and ASEFR in the MCAO entities according to one particular, non-limiting exemplary embodiment of the disclosed concept.

The sensitivity of the ASEF technique at the amide frequency (3.6 ppm) was compared to a simple 3-point measurement of APT (amide proton transfer). Both APT and the ASEFR at 3.6 ppm showed a good contrast between the ischemic tissue and the healthy tissue for both animals. FIG. 21 illustrates box and whisker plots of average APT and ASEFR at 3.6 ppm. FIG. 21 shows a box and whisker plot 2105 for average APT of the legion, a box and whisker plot 2110 for average ASEFR at 3.6 ppm of the legion, a box and whicker plot 2115 for the average APT of the contralesional ROI, and a box and whisker plot 2120 for the average ASEFR at 3.6 ppm of the contralesional ROI. In FIG. 21, box and whisker plots of both metrics show a similar breadth in the range of values for the ischemic lesion, while APT shows a much tighter distribution of values across animals for the normal tissue. APT averaged over the lesion was 1.21±0.4% and 2.43±0.1% for the contralateral tissue, while ASEFR at 3.6 ppm measured 1.6±0.4% in the lesion and 2.9±0.4% in the contralateral hemisphere. Comparatively, ASEFR at 3.6 ppm shows a higher magnitude than APT in both the healthy tissue and the ischemic lesion, but the contrast between the two types of tissues is nearly equal.

The ASEFR at the guanidyl resonance of 2.0 ppm and PCr resonance of 2.6 ppm were further examined. The representative maps showed a spatial inhomogeneity (particularly within the ischemic lesion) for ASEFR at 2 ppm, but the overall contrast between the lesion and the contralateral region was low. FIG. 22 illustrates a box and whisker plot 2205 for ASEFR at 2.0 ppm of the lesion, a box and whisker plot 2210 for ASEFR at 2.6 ppm of the lesion, a box and whisker plot 2215 for ASEFR at 2 ppm of the contralesional tissue, and a box and whisker plot 2020 for ASEFR at 2.6 ppm of the contralesional tissue. As shown in FIG. 21, the ASEFR at 2.6 ppm showed a strong contrast between the lesion and the contralateral tissue. Despite the spatial inhomogeneity, ASEFR at 2 ppm signals averaged over the lesion and contralateral tissue were similar. The ASEFR at 2.6 ppm showed a drop in the lesion as compared to the contralateral tissue resembling the drop in ASEFR at 3.6 ppm, though the contrast of ASEFR2.6 ppm is about 40% smaller than that of ASEFR at 3.6 ppm (0.8% versus 1.3%).

As discussed with reference to FIGS. 21-22, three potential contrasts were demonstrated at 3.6 ppm, 2.6 ppm and 2.0 ppm with a single set of ASEF parameters during the empirical procedure. Since the ASEF contrast is sensitive to the parameters such as the $B_{1,avg}$ saturation power and the difference in the duty cycle of the two pulse trains, ASEF parameters could be optimized individually to improve the quality of each CEST signal obtained. For example, the optimal amide CEST signal at 3.6 ppm was reported to be about 1 µT for 9.4 T19 or 2 µT for 3 T45, whereas the optimal PCr-CEST signal at 2.6 ppm was reported to be only around 0.5 to 0.7 µT31. Notably, the signal for 2.6 ppm (~1.9% in the contralateral tissue) is higher than expected from a brain PCr alone, indicating there may be other sources of contrast in ASEFR at 2.6 ppm, such as the slow NOE signal from aromatic protons.

The results of the empirical procedures as discussed above show that the fudge factor needed to correct the baseline MT mismatch is strongly dependent on the average saturation power but is relatively insensitive to the MT fraction. In vivo studies in stroke rodents show that the fudge factor required to correct the baseline MT mismatch is different for normal versus ischemic tissue. After correction of the mismatch, ASEFR achieved comparable contrast at 3.6 ppm between normal and ischemic tissue when compared to the APT approach. Moreover, contrasts for 2.0 ppm and 2.6 ppm were also ascertainable from the same spectra. Therefore, it has been shown that ASEF improves the CEST signal specificity of slow exchange labile protons such as amide and guanidyl with small loss to sensitivity, and thus, has a strong potential in the CEST imaging of various diseases. As such, ASEF imaging can probe various labile protons of interest including amide, PCr, and guanidyl groups. Compared to model-fitting methods such as Lorentzian fitting, the acquisition time burden for ASEF is significantly lessened. When compared to APT, ASEFR at 3.6 ppm exhibited a higher magnitude, but also a higher inter-animal variability. Although it may not provide an advantage in the contrast to noise ratio, ASEF can be applied to conditions where methods like 3-point measurement are difficult to implement due to the lack of a distinct peak, such as at lower magnetic fields. Besides the $B_{1,avg}$, the DC of the pulse train may also be adjusted to improve the sensitivity of these CEST signals. CEST signal at 2 ppm is dominated by guanidyl water proton exchange, and the power of 0.8 µT is likely suboptimal for normal physiological conditions with a relatively fast exchange rate of ~1000 s-1. The near-zero contrast between the ischemic and normal tissue can be explained by the $B_1$-tuning effect. Because the exchange rate filtering domain of ASEF is determined by $B_{1,avg}$, an adjustment of $B_{1,avg}$ to either a lower or higher value may change the ischemic contrast. While the simple subtracted signal for ASEF was primarily used in this procedure for sensitivity comparison, ASEF signals can readily be converted into relaxation rate related indices (e.g., $R_{ex}$), which can potentially be converted to quantitative physiological information such as metabolite concentration and/or tissue pH.

While it is important in reducing the background MT signal for ASEFR, the matching of the MT effect between the CW and pulsed trains using a fudge factor may introduce an additional factor of variability. In case that the MT mismatch may not be fully minimized by a single fudge factor, a baseline correction at 5.5 ppm to suppress the residual difference was used as previously mentioned. The results in FIG. 20C indicate that the baseline raw ASEFR is slightly dependent on the RF offset, therefore, a reference frequency must maintain minimal CEST effect, yet be as close as possible to the resonance frequency of the labile proton of interest to provide the best suppression of the background signal. Besides the intrinsic MT mismatch, other possible sources of background ASEFR signal may be due to hardware imperfectness, including RF power linearity and stability during a long saturation duration. These issue will more likely be site-dependent, and hardware improvement such as parallel RF transmission may reinforce dependability in power deposition. For experiments with similar settings (e.g., coil, weight of the subject), the fudge factor is expected to be similar. Thus, standardizing the fudge factor and relying more on the baseline correction may reduce variations across subjects with limited effect on the accuracy of ASEFR.

In sum, CEST imaging with ASEF can suppress fast exchanges and semi-solid MT background with only a small loss to sensitivity. It can probe slow exchange species such as amide, guanidyl and PCr groups and can be applied to the study of stroke, tumor, muscle pathology, etc. Its low requirement on a number of imaged signals also opens up possibilities for dynamic imaging. ASEF can be easily adapted to the standard CEST imaging pulse sequence which allows for seamless integration of a myriad of techniques currently being developed in the CEST field. ASEF can also be incorporated into multi-slices and/or 3D imaging sequences. ASEF can be applied to a broad range of in vivo CEST MRI applications involving slow or slow-to-intermediate exchange (e.g., without limitation, <2000 s$^{-1}$), such as the study of cytoplasmic proteins for tumor or neurodegenerative diseases via the amide proton transfer effect, Cr, and/or PCr in the muscle or brain, or pH variations in stroke and traumatic brain injuries.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for chemical exchange saturation transfer (CEST) magnetic resonance imaging (MRI) of a target structure using an average saturation efficiency filter (ASEF) executed on an MR device, comprising:
   a. applying a first radio frequency (RF) pulse train with a high duty cycle ($DC_h$) and a first average irradiation power ($B_{1, avg}$), wherein
      i. the target structure comprises target molecules including exchangeable protons and a water pool including free water protons and semi-solid macromolecules, the first RF pulse train being applied at a resonant frequency of the exchangeable protons of the target molecules for a first predefined period,
      ii. the exchangeable protons in the target molecules are saturated based on the application of the first RF pulse train,
      iii. a first saturation transfer of the target molecules to the water pool based on chemical exchange processes exchanging the saturated exchangeable protons with a set of the free water protons is made, and the first RF pulse train also causes direct water saturation and a magnetization transfer contrast (MTC) between the semi-solid macromolecules and another set of the free water protons; and
      iv. an MR signal of the water pool exhibits a first attenuation based at least in part on the first saturation transfer, the MTC and direct water saturation;
   b. discontinuing the application of the first RF pulse train upon a lapse of the first predefined period;
   c. acquiring a first water MR signal of the water pool from the MR device, the first water MR signal representing the first attenuation, the target molecules and the water pool returning to thermal equilibrium after the acquisition of the first water MR signal and the discontinuance;
   d. applying, to the exchangeable protons of the target molecules for a second predefined period, a second RF pulse train with a low duty cycle ($DC_l$) and a second average irradiation power, the second RF pulse train comprising a plurality of pairs of bipolar or composite pulses having a pulse duration ($t_P$), separated by a period of wait ($t_d$), wherein
      i. the second RF pulse train is applied at the same resonant frequency as the first RF pulse train, causing the exchangeable protons of the target molecules to be saturated as well as direct water saturation and MTC;
      ii. a second saturation transfer of the target molecules to the water pool is made based on the chemical exchange processes affected by the low duty cycle of the second RF pulse train,
      iii. the MR signal of the water pool exhibits a second attenuation based at least in part on the second saturation transfer, the MTC, and the direct water saturation;
   e. discontinuing the application of the second RF pulse train upon a lapse of the second predefined period;
   f. acquiring a second water MR signal of the water pool from the MR device, the second water MR signal representing the second attenuation; and
   g. generating an ASEF signal representing a difference between the first water MR signal and the second water MR signal.

2. The method of claim 1, wherein the difference between the first water MR signal and the second water MR signal taken by the ASEF signal is:

$$ASEFR = pk_{ex}T_1 S_{base}^2 \overline{\omega_1^2}^2 \frac{DC_h - DC_l}{\left(\overline{\omega_1^2} + DC_h \cdot k_{ex}^2\right)\left(\overline{\omega_1^2} + DC_l \cdot k_{ex}^2\right)}$$

where p is the relative population of the exchangeable protons, $k_{ex}$ is the chemical exchange rate, $T_1$ is a longitudinal relaxation time, $S_{base}$ is a baseline signal of the target structure, and $\omega_1$ is the saturation frequency.

3. The method of claim 2, wherein the first RF pulse train and the second RF pulse train have the same average saturation frequency $\overline{\omega_1^2}$.

4. The method of claim 1, wherein the ASEF signal shows that the ASEF filters fast chemical exchange processes comprising a chemical exchange rate $k_{ex}$ satisfying $DC_l \cdot k_{ex}^2 >> \overline{\omega_1^2}$ as follows:

$$ASEFR \propto \left(\frac{\overline{\omega_1^2}}{k_{ex}^2}\right)^2 \approx 0$$

where $\overline{\omega_1^2}$ is the average saturation frequency.

5. The method of claim 4, wherein the ASEF is a low-pass filter.

6. The method of claim 4, wherein the ASEF improves specificity of slow exchange processes and intermediate exchange processes of the chemical exchange processes by suppressing the fast exchange processes with a minimal loss of sensitivity.

7. The method of claim 1, wherein the first RF pulse train is a continuous wave or the highest duty cycle that the MRI device is capable of generating.

8. The method of claim 7, wherein the continuous wave provides the highest sensitivity of the CEST imaging of the target molecules.

9. The method of claim 1, wherein peak to average power ratio (Crest factor) of the first RF pulse train is minimized to approach a Crest factor of a continuous wave.

10. The method of claim 1, wherein a number of RF pulses of the second RF pulse train, and the period of wait ti between the RF pulses, and a peak power of the RF pulses are determined such that the second average irradiation power of the second RF pulse train is the same as the first average irradiation power.

11. The method of claim 10, wherein the ASEF minimizes a mismatch between the MTC of the first acquisition and the MTC of the second acquisition based at least in part on having the same average irradiation power for the second RF pulse train as the first average irradiation power of the first RF train.

12. The method of claim 1, wherein the mismatch between the MTC of the first acquisition and the MTC of the second acquisition of the ASEF method is reduced using parameters based at least in part on selecting one of (i) a shorter $t_P$ for the second RF pulse train, (ii) a smaller duty cycle difference between the high duty cycle $DC_h$ and the low duty cycle $DC_l$, or (iii) a lower average irradiation power $B_{1,\ avg}$.

13. The method of claim 1, wherein a fudge factor is added to the second RF pulse train to minimize a mismatch between the MTC of the first acquisition and the MTC of the second acquisition, the fudge factor comprising a percentage increase or decrease in at least one of the first average irradiation power $B_{1,\ avg}$ or the second average irradiation power $B_{1,\ avg}$.

14. The method of claim 13, wherein the fudge factor is determined at a specific frequency independent of the resonant frequency of the exchangeable protons results in the second attenuation at the specific frequency being equal to the first attenuation at the specific frequency.

15. The method of claim 1, wherein the bipolar pulses or composite pulses cancel out rotation effect and reduce $B_1$-inhomogeneity.

16. The method of claim 1, wherein the target molecules are endogenous or exogenous molecules.

17. The method of claim 16, wherein the endogenous or exogenous molecules are mobile molecules.

18. A device for chemical exchange saturation transfer (CEST) magnetic resonance imaging (MRI) of a target structure, comprising:
   a. an input apparatus configured to receive a user input comprising at least the target structure and information associated with generating a first radiofrequency (RF) pulse train and a second RF pulse train for the CEST MRI;
   b. a control system coupled to the input apparatus, comprising a processor, a memory including an average saturation efficiency filter (ASEF) executable on an MR device, the ASEF configured to:
      i. apply a first radio frequency (RF) pulse train with a high duty cycle ($DC_h$) and a first average irradiation power ($B_{1,\ avg}$), wherein the target structure comprises the target molecules including exchangeable protons and a water pool including free water protons and semi-solid macromolecules, the first RF pulse train being applied at a resonant frequency of the exchangeable protons for a first predefined period, the exchangeable protons in the target molecules are saturated based on the application of the first RF pulse train, a first saturation transfer of the target molecules to the water pool based on chemical exchange processes exchanging the saturated exchangeable protons with a set of the free water protons is made, and the first RF pulse train also causes direct water saturation and a magnetization transfer contrast (MTC) between the semi-solid macromolecules and another set of the free water protons; and an MR signal of the water pool exhibits a first attenuation based at least in part on the first saturation transfer, the MTC and direct water saturation;
      ii. discontinue the application of the first RF pulse train upon a lapse of the first predefined period;
      iii. acquire a first water MR signal of the water pool from the MR device, the first water MR signal representing the first attenuation, the target molecules and the water pool returning to thermal equilibrium after the acquisition of the first water MR signal and the discontinuance;
      iv. apply, to the exchangeable protons of the target molecules for a second predefined period, a second RF pulse train with a low duty cycle ($DC_l$) and a second average irradiation power, the second RF pulse train comprising a plurality of pairs of bipolar pulses having a pulse duration ($t_P$), separated by a period of wait ($t_d$), wherein the second RF pulse train is applied at the same resonant frequency as the first RF pulse train and the exchangeable protons of the target molecules are saturated; a second saturation transfer of the target molecules to the water pool based on the chemical exchange processes affected by the low duty cycle of the second RF pulse train is made, and the second RF pulse train causes direct water saturation and MTC, the MR signal of the water pool exhibits a second attenuation based at least in part on the second saturation transfer, the MTC, and the direct water saturation;
      v. discontinue the application of the second RF pulse train upon a lapse of the second predefined period;
      vi. acquire a second water MR signal of the water pool from the MR device, the second water MR signal representing the second attenuation; and
      vii. generate an ASEF signal representing a difference between the first water MR signal and the second water MR signal; and
   c. an output apparatus comprising a display and coupled to the ASEF system, the output apparatus configured to output at least the ASEF signal, the first water MR signal, and the second water MR signal on the display.

19. A method of chemical exchange saturation transfer (CEST) magnetic resonance imaging (MRI) using adjusting rotation and saturation effects (AROSE) system executable on an MR device, comprising:

a. applying a first radio frequency (RF) pulse train with a high duty cycle ($DC_h$), a first average irradiation power ($B_{1,\,avg}$), and a first flip angle $\varphi_h$, wherein
  i. the target structure comprises the target molecules including exchangeable protons and a water pool including free water protons and semi-solid macromolecules, the first RF pulse train being applied at a resonant frequency of the exchangeable protons for a first predefined period,
  ii. the application of the first RF pulse train changes a magnetization of the target molecules by at least one of a first rotation effect or a first saturation effect,
  iii. the first rotation effect comprises rotating a spin system of the target molecules based on the application of the first RF pulse train with a first flip angle $\varphi_h$, making a first rotation transfer to the water pool via chemical exchange processes, and affecting the spin system of the water pool based on the first rotation transfer,
  iv. the first saturation effect comprises a first saturation of the target molecules in which exchangeable protons upon the application of the first RF pulse train and a first saturation transfer of the target molecules to the water pool via the chemical exchange processes comprising exchanging the saturated exchangeable protons with a set of the free water protons, the application of the first RF pulse train causing contamination comprising direct water saturation and a magnetization transfer contrast (MTC) between the semi-solid molecules and another set of the free water protons, and
  v. an MR signal of the water pool exhibits a first attenuation based at least in part on the first rotation transfer and the first saturation transfer, the first MTC and the direct water saturation;
b. discontinuing the application of the first RF pulse train upon a lapse of the first predefined period;
c. acquiring a first water MR signal of the water pool from the MR device, the first water MR signal representing the first attenuation, the target molecules and the water pool returning to thermal equilibrium after the acquisition of the first water MR signal and the discontinuance;
d. applying, to the exchangeable protons of the target molecules for a second predefined period, a second RF pulse train with a low duty cycle ($DC_l$), a second average irradiation power and a second flip angle $\varphi_l$, the second RF pulse train comprising a plurality of RF pulses having a pulse duration ($t_P$) and a period of wait ($t_d$) between each pulse, wherein
  i. the second RF pulse train changes the magnetization of the target molecules by a second rotation effect and a second saturation effect based upon the application of the second RF pulse train,
  ii. the second rotation effect comprises rotating the spin system of the target molecules, making a second rotation transfer to the water pool, and affecting the spin system of the water pool based on the second rotation transfer, and
  iii. the second saturation effect comprises a second saturation of the target molecules based on exchangeable protons upon the application of the second RF pulse train and a second saturation transfer to the water pool via chemical exchange processes exchanging the saturated exchangeable protons with the set of the free water protons, the second RF pulse train also causing contamination comprising the direct water saturation and MTC between the semi-solid molecules and the another set of the free water protons, and
  iv. the MR signal of the water pool exhibits a second attenuation based at least in part on the second rotation transfer, the second saturation transfer, the MTC and the direct water saturation;
e. discontinuing the application of the second RF pulse train upon a lapse of the second predefined period;
f. acquiring a second water MR signal of the water pool, the second water MR signal representing the second attenuation; and
g. generating an AROSE signal representing a difference between the first water MR signal and the second water MR signal.

20. The method of claim 19, wherein the first RF pulse train is a continuous wave or the highest duty cycle that the MRI device is capable of generating.

21. The method of claim 20, wherein the AROSE signal shows the difference as follows:

$$AROSE(\varphi_l, \varphi_h) = S(DC_l, \varphi_l) - S(DC_h, \varphi_h)$$

where S is a signal.

22. The method of claim 20, wherein peak to average power ratio (Crest factor) of the first RF pulse train is minimized to approach a Crest factor of a continuous wave.

23. The method of claim 20, wherein the first RF pulse train is the continuous wave providing a full saturation transfer effect and the highest sensitivity of the CEST imaging of the target molecules.

24. The method of claim 20, wherein the continuous wave saturates the signal and comprises no flip angle, and the AROSE signal shows the difference as follows:

$$AROSE_\varphi = S(DC_l, \varphi) - S(CW)$$

where $\varphi$ is the flip angle $\varphi_l$ for the RF pulses of the second RF pulse train.

25. The method of claim 24, wherein $\varphi$ is adjusted to increase specificity of the CEST imaging based at least in part on the chemical exchange processes associated with the target molecule.

26. The method of claim 24, wherein the AROSE system is an exchange rate filter for both slow exchange rate and a fast exchange rate of the chemical exchange processes where $\varphi$ comprises $\pi$ ($AROSE_\pi$).

27. The method of claim 26, wherein the second RF pulse train in $AROSE_\pi$ results in a maximal rotation transfer effect and acts as a band-pass filter.

28. The method of claim 24, wherein the AROSE system filters a fast exchange rate of the chemical exchange process where $\varphi$ comprises $2\pi$ and the AROSE signal comprises $AROSE_{2\pi}$.

29. The method of claim 28, wherein the second RF pulse train in $AROSE_{2\pi}$ results in a minimal rotation transfer effect and acts as a low-pass filter.

30. The method of claim 24, wherein the AROSE system filters a slow exchange rate of the chemical exchange processes where $\varphi$ is any angle other than $2\pi$.

31. The method of claim 30, wherein the AROSE system filters a slow exchange rate of the chemical exchange processes where φ comprises 1.5π or 3π and respective AROSE signals comprise $AROSE_{1.5\pi}$ or $3\pi$ $AROSE_{3\pi}$.

32. The method of claim 19, wherein at least one of the first RF pulse train and the second RF pulse train comprises frequency-selective excitation RF pulses applied at the Larmor frequency of the nuclei in the target molecules.

33. The method of claim 19, wherein a number of RF pulses, the period of wait $t_d$ between the RF pulses, and a peak power of the RF pulses of the second RF pulse train are determined such that the second average irradiation power of the second RF pulse train is the same as the first average irradiation power of the first RF pulse train.

34. The method of claim 33, wherein the AROSE minimizes a mismatch between the MTC of the first acquisition and the MTC of the second acquisition based at least in part on having the same average irradiation power for the second RF pulse train as the first average irradiation power.

35. The method of claim 19, wherein the AROSE reduces a mismatch between the first MTC and the second MTC based at least in part on selecting one of (i) a shorter $t_P$ for the second RF pulse train, (ii) a smaller duty cycle difference between the high duty cycle $DC_h$ and the low duty cycle $DC_l$, or (iii) a lower average irradiation power $B_{1,\ avg}$.

36. The method of claim 19, wherein a fudge factor is added to the second RF pulse train to minimize a mismatch between the MTC of the first acquisition and the MTC of the second acquisition, the fudge factor comprising a percentage increase or decrease in at least one of the first average irradiation power $B_{1,\ avg}$ or the second average irradiation power $B_{1,\ avg}$.

37. The method of claim 19, wherein a number of RF pulses, the period of wait $T_D$ between the RF pulses, and a peak power of the RF pulses of the second RF pulse train are determined such that a mismatch between the MTC of the first acquisition and the MTC of the second acquisition is minimized.

38. The method of claim 19, wherein a number of RF pulses, the period of wait $T_D$ between the RF pulses, and a peak power of the RF pulses of the second RF pulse train are determined such that execution of the method of claim 19 at a specific frequency independent of the resonant frequency of the exchangeable protons results in the second attenuation at the specific frequency being equal to the first attenuation at the specific frequency.

39. The method of claim 19, wherein the target molecules are endogenous or exogenous molecules.

40. The method of claim 39, wherein the endogenous or exogenous molecules are mobile molecules.

41. The method of claim 19, further comprising:
applying a third RF pulse train to the exchangeable protons of the target molecules for a third predefined period, a third RF pulse train with a low duty cycle ($DC_l$), a third average irradiation power and a third flip angle $\varphi_{l3}$, the third RF pulse train comprising a plurality of RF pulses having a pulse duration ($t_P$) and a period of wait ($t_d$) between each pair of bipolar pulses, wherein the third RF pulse train causes the magnetization of the target molecules by a third rotation effect and a third saturation effect based upon the application of the third RF pulse train, a third rotation transfer and a third saturation transfer of the target molecules the water pool via the chemical exchange processes are made, and the third RF pulse train also causes contamination comprising the direct water saturation and MTC between the semi-solid molecules and the another set of the free water protons, and the MR signal of the water pool exhibits a third attenuation based at least in part on a third rotation transfer, the saturation transfer, the MTC and the direct water saturation;
discontinuing the application of the third RF pulse train upon a lapse of the third predefined period; and
acquiring a third water MR signal of the water pool, the third water MR signal representing the third attenuation.

42. The method of claim 41, wherein the generating the AROSE signal comprises:
generating the AROSE signal representing differences among the first water MR signal, the second water MR signal and the third water signal.

43. The method of claim 41, wherein a number of RF pulses, the period of wait $T_D$ between the RF pulses, and a peak power of the RF pulses of the third RF pulse train are determined such that mismatches among the MTC of the first acquisition, the MTC of the second acquisition and the MTC of the third acquisition are minimized.

44. A device for chemical exchange saturation transfer (CEST) magnetic resonance imaging (MRI) of a target structure, comprising:
a. an input apparatus configured to receive a user input comprising at least the target structure and information associated with generating a first radiofrequency (RF) pulse train and a second RF pulse train for the CEST MRI;
b. a control system coupled to the input apparatus for receiving the user input, comprising a processor, a memory including adjustment of rotation and saturation effects (AROSE) executable on an MR device, the AROSE configured to:
   i. apply a first radio frequency (RF) pulse train with a high duty cycle ($DC_h$), a first average irradiation power ($B_{1,\ avg}$), and a first flip angle $\varphi_h$, wherein the target structure comprises the target molecules including exchangeable protons and a water pool including free water protons and semi-solid macromolecules, the first RF pulse training being applied at a resonant frequency of the exchangeable protons for a first predefined period, the application of the first RF pulse train changes a magnetization of the target molecules by at least one of a first rotation effect or a first saturation effect, the first rotation effect comprises rotating a spin system of the target molecules based on the application of the first RF pulse train with a first flip angle $\varphi_h$, making a first rotation transfer to the water pool via chemical exchange processes, and affecting the spin system of the water pool based on the first rotation transfer, the first saturation effect comprises a first saturation of the target molecules in which exchangeable protons upon the application of the first RF pulse train are saturated and a first saturation transfer to the water pool via the chemical exchange processes comprising exchanging the saturated exchangeable protons with a set of the free water protons, the application of the first RF pulse train also causes contamination comprising direct water saturation and a magnetization transfer contrast (MTC) between the semi-solid molecules and another set of the free water protons, and an MR signal of the water pool exhibits a first attenuation based at least in part on the first rotation transfer and the first saturation transfer, the first MTC and the direct water saturation;
   ii. discontinue the application of the first RF pulse train upon a lapse of the first predefined period;

iii. acquire a first water MR signal of the water pool from the MR device, the first water MR signal representing the first attenuation, after which the target molecules and the water pool return to thermal equilibrium after the acquisition of the first water MR signal and the discontinuance;

iv. apply, to the exchangeable protons of the target molecules for a second predefined period, a second RF pulse train with a low duty cycle ($DC_l$), a second average irradiation power and a second flip angle $\varphi_l$, the second RF pulse train comprising a plurality of RF pulses having a pulse duration ($t_P$) and a period of wait ($t_d$) between each pulse, wherein the second RF pulse train changes the magnetization of the target molecules by a second rotation effect and a second saturation effect based upon the application of the second RF pulse train, the second rotation effect comprises rotating the spin system of the target molecules, making a second rotation transfer to the water pool, and affecting the spin system of the water pool based on the second rotation transfer, and the second saturation effect comprises a second saturation of the target molecules based on exchangeable protons upon the application of the second RF pulse train, a second saturation transfer to the water pool via chemical exchange processes exchanging the saturated exchangeable protons with the set of the free water protons, the second RF pulse train also causes contamination comprising the direct water saturation and a MTC between the semi-solid molecules and another set of the free water protons, and the MR signal of the water pool exhibits a second attenuation based at least in part on the second rotation transfer, the second saturation transfer, the MTC and the direct water saturation;

v. discontinue the application of the second RF pulse train upon a lapse of the second predefined period;

vi. acquire a second water MR signal of the water pool, the second water MR signal representing the second attenuation; and vii. generate an AROSE signal representing a difference between the first water MR signal and the second water MR signal; and c. an output apparatus comprising a display and coupled to the AROSE system, the output apparatus configured to output at least the AROSE signal, the first water MR signal, and the second water MR signal on the display.

\* \* \* \* \*